United States Patent
Cho et al.

(10) Patent No.: US 9,062,182 B2
(45) Date of Patent: Jun. 23, 2015

(54) TERMINAL MODIFIER FOR CONJUGATED DIENE POLYMERS

(71) Applicant: Korea Kumho Petrochemical Co., Ltd., Seoul (KR)

(72) Inventors: Hanjoung Cho, Daejeon (KR); Young Hoon Ko, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 14/153,354

(22) Filed: Jan. 13, 2014

(65) Prior Publication Data

US 2014/0200306 A1   Jul. 17, 2014

(30) Foreign Application Priority Data

Jan. 14, 2013   (KR) .................. 10-2013-0004061

(51) Int. Cl.
| | | |
|---|---|---|
| C08F 236/10 | (2006.01) |
| C07F 7/18 | (2006.01) |
| C08K 3/36 | (2006.01) |
| C08K 3/04 | (2006.01) |
| C08C 19/44 | (2006.01) |
| C08L 15/00 | (2006.01) |

(52) U.S. Cl.
CPC ... *C08K 3/36* (2013.01); *C08K 3/04* (2013.01); *C08C 19/44* (2013.01); *C08L 15/00* (2013.01)

(58) Field of Classification Search
USPC .......................... 524/572; 525/102; 556/413
See application file for complete search history.

(56) References Cited

U.S. PATENT DOCUMENTS

| 5,508,333 A * | 4/1996 | Shimizu ................... 524/424 |
| 2010/0152369 A1 * | 6/2010 | Shibata et al. ............. 524/572 |
| 2011/0207879 A1 | 8/2011 | Ito et al. |

* cited by examiner

*Primary Examiner* — Robert Harlan
(74) *Attorney, Agent, or Firm* — Mintz Levin Cohn Ferris Glovsky and Popeo, P.C.

(57) ABSTRACT

Disclosed is a terminal modifier for conjugated diene polymers. The terminal modifier has both at least two amine groups and at least one alkoxysilane group. A terminally modified conjugated diene polymer which is coupled at the terminus with the terminal modifier, and a polymer composition for use in tires, comprising the terminally modified, conjugated diene polymer are also provided. When applied to tire treads, the polymer composition comprising the terminally modified, conjugated diene polymer significantly increases the disperability and binding to rubber of silica, thereby greatly contributing to an improvement of the tire treads in dynamic properties including wet traction, rolling resistance, Mooney viscosity and processability.

14 Claims, No Drawings

TERMINAL MODIFIER FOR CONJUGATED DIENE POLYMERS

CROSS-REFERENCE TO RELATED APPLICATIONS

This application claims priority under 35 U.S.C. §119 to Korean Patent Application No. 10-2013-0004061, filed on Jan. 14, 2013, in the Korean Intellectual Property Office, the disclosure of which is incorporated herein by reference in its entirety.

BACKGROUND OF THE INVENTION

1. Field of the Invention

The present invention relates to a terminal modifier for conjugated diene polymers. More particularly, the present invention relates to a terminal modifier having both at least two amine groups and at least one alkoxysilane group, a terminally modified conjugated diene polymer which is coupled at the terminus with the terminal modifier, and a polymer composition for use in tires, comprising the terminally modified, conjugated diene polymer.

2. Description of the Related Art

Recently, with the growing concern with environment-friendly, energy-saving high-performance tires, extensive research has been directed toward high functionality rubber. Under development to meet this need are polymers that are improved in dynamic properties that have direct influences on the fuel efficiency of automobiles, like low rolling resistance and high wet traction.

Styrene-butadiene rubber (hereinafter referred to as "SBR") or butadiene rubber (hereinafter referred to as "BR"), both known for use in tire treads for automobiles, may be prepared by two basically different processes: from solution (SSBR, solution styrene-butadiene rubber) or as an emulsion (ESBR, emulsion styrene-butadiene rubber). The first process, SSBR, is characterized by the polymerization of butadiene and styrene in a hydrocarbon solvent with an organolithium catalyst while the other approach (ESBR) is of emulsion polymerization initiated by a free radical, followed by the coagulation of the resultant latex into solid rubber. The SSBR process enjoys the advantage of controlling, as needed to arbitrary extent, micromolecular structures such as the vinyl unit of conjugated dienes, and styrene block contents, etc., as well as coupling rates and coupling numbers, which may account predominantly for physical properties of the polymer. Further, the SSBR process is advantageous over the ESBR process in that products prepared by the SSBR process are far superior in terms of rolling resistance and wet traction to those prepared by the ESBR process. Thanks to these advantages, the SSBR is widely used for the production of polymers which meet requirements for environment-friendly and high-performance tires.

Besides the dynamic properties, a methodological advantage is observed in the SSBR process. For example, a functional group introduced as a terminal modifier allows for the control of cold flow at ordinary temperatures as well as enabling a reinforcing material, when mixed, to improve in processability and binding force, with consequent advance in dispersability. Particularly, a terminal modifier is configured to be compatible with carbon black and silica, usually used as reinforcing materials in tires, thereby making great contribution to improvement in wear resistance (tread wear) and rolling resistance in addition to wet traction.

There are many patents about SSBR processes that are configured to enhance the wet traction and rolling resistance of polymers by terminal modification.

U.S. Pat. No. 5,508,333 discloses a diene polymer which is modified at the terminus with an alkoxysilane containing an epoxy group and which has excellent dynamic and mechanical properties over conventional rubber. When applied to the terminus of the polymer, this terminal modifier forms a hydroxyl group. However, the terminal modifier, although modifying the terminus well, makes it impossible to control the extent of interpolymer coupling, which leads to a problem in controlling physical properties through coupling rate. In addition, this patent employs the reinforcing material carbon black, which causes environmental pollution, and the terminal modifier is only slightly miscible with silica, an environment-friendly reinforcement.

U.S. Patent Application Publication No. 20110207879 introduces a method characterized by the use of a diphenylethylene compound as a polymerization initiator so as to increase compatibility with carbon black and decrease rolling resistance. Since the diphenylethylene compound is not friendly to the environment, it is inappropriate for use in rubber for silica tires. Further, the initiator is inefficient in the polymerization of conjugate dienes, and is thus not economically beneficial, compared to general organolithium initiators.

U.S. Patent Application Publication No. 20100152369 describes the use of an alkoxysilane compound having a hydrolysable protecting group-substituted primary amine as a terminal modifier in the production of a conjugated diene polymer. For use in tire treads, a composition comprising the polymer modified with the terminal modifier, and silica can improve hysteresis loss, thus the physical properties of the tires. However, this method is poor in economy due to additional processes for the introduction and elimination of the protecting group, and the coupling rate is difficult to control with the method. In addition, cold flow, an important factor for storage stability, is measured to be high in the polymers, so that their shelf life is poor. Moreover, they still remain unsatisfactory for hysteresis and rolling resistance.

There is therefore an imperative need for novel, multifunctional conjugated diene polymers that overcome problems with conventional conjugated diene polymers, and that enhance mechanical and dynamic properties of rubber through an increase in compatibility with and dispersability of carbon black or silica, usual reinforcing agents in tires.

SUMMARY OF THE INVENTION

It is an object of the present invention to provide a novel alkoxysilane-based terminal modifier for conjugated dienes, having both at least two amine groups and at least one alkoxysilane group.

It is another object of the present invention to provide a novel, terminally modified, conjugated diene polymer to which the alkoxysilane-based terminal modifier is applied.

It is a further object of the present invention to provide a polymer composition for tires comprising the novel terminally modified conjugated diene polymer which guarantees excellent compatibility with and dispersability of inorganic reinforcing agents while improving processability upon compounding, thereby conferring excellent physical properties to the tires.

It is a still further object of the present invention to provide a tire, prepared from the polymer composition, showing excellence in wet traction, rolling resistance and fuel economy.

To accomplish the objects thereof, the present invention provides a terminal modifier for conjugated diene polymers, represented by the following Formula 1:

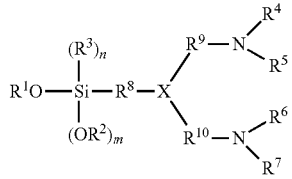

[Formula 1]

wherein X represents nitrogen (N), Si—$R^{11}$, Si—$R^{12}$—N$(R^{13})(R^{14})$, C—$R^{11}$, or C—$R^{12}$—N$(R^{13})(R^{14})$; $R^1$, $R^2$, and $R^3$, which may be the same or different, independently represent a monovalent, saturated or unsaturated hydrocarbon chain of 1 to 20 carbon atoms; $R^4$, $R^5$, $R^6$, $R^7$, $R^{11}$, $R^{13}$, and $R^{14}$, which may be the same or different, independently represent a hydrogen atom, or a monovalent, saturated or unsaturated hydrocarbon chain of 1 to 20 carbon atoms; $R^8$, $R^9$, $R^{10}$, and $R^{12}$, which may be the same or different, independently a bivalent saturated or unsaturated hydrocarbon chain of 1 to 20 carbon atoms; and m and n are respectively an integer of 0 to 2, satisfying the condition of m+n=2.

Also, contemplated in accordance with another aspect of the present invention is a terminally modified diene polymer with the terminal modifier of Formula 1 coupled to the terminus thereof.

Moreover, the present invention provides a polymer composition for tires, comprising the terminally modified, conjugated diene polymer and an inorganic reinforcing agent.

Highly miscible with the inorganic reinforcing agent carbon black or silica, the terminally modified conjugated diene copolymer of the present invention improves in processability. This is partially due to the fact that the amine group introduced into and distributed within the polymer has affinity for the inorganic reinforcing agent, thus increasing the compatibility of the diene polymer with the reinforcing agent.

Also, the terminal alkoxysilane group of the terminally modified conjugated diene polymers facilitates efficient coupling control, improving the cold flow of the polymers, so that they overcome the problem with long-term shelf life.

Since the amine groups and the alkoxysilane groups coexist at the terminus of the conjugated diene copolymers, a hydrogen bond forms between the amine and the silica, giving rise to a physical interaction between the polymers and the reinforcing agent and a chemical covalent bond between the alkoxysilane group and the reinforcing agent. Thanks to these physical and chemical attractions, the terminally modified conjugated diene copolymers of the present invention can improve the tire in dynamic properties including wet traction and rolling resistance as well as in wear resistance, and is applicable as a new material to environment-friendly tires.

DESCRIPTION OF THE PREFERRED EMBODIMENTS

The present invention pertains to the use of an alkoxysilane compound having at least two amine groups and at least one alkoxysilane group as a terminal modifier for conjugated diene polymers.

The terminal modifier of the present invention may be represented by the following Formula 1:

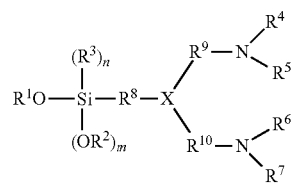

[Formula 1]

wherein X represents nitrogen (N), Si—$R^{11}$, Si—$R^{12}$—N$(R^{13})(R^{14})$, C—$R^{11}$, or C—$R^{12}$—N$(R^{13})(R^{14})$; $R^1$, $R^2$, and $R^3$, which may be the same or different, independently represent a monovalent, saturated or unsaturated hydrocarbon chain of 1 to 20 carbon atoms; $R^4$, $R^5$, $R^6$, $R^7$, $R^{11}$, $R^{13}$, and $R^{14}$, which may be the same or different, independently represent a hydrogen atom, or a monovalent, saturated or unsaturated hydrocarbon chain of 1 to 20 carbon atoms; $R^8$, $R^9$, $R^{10}$, and $R^{12}$, which may be the same or different, independently a bivalent saturated or unsaturated hydrocarbon chain of 1 to 20 carbon atoms; and m and n are respectively an integer of 0 to 2, satisfying the condition of m+n=2.

In detail, Formula 1 may be elucidated with the compounds of the following Formulas 1a, 1b and 1c:

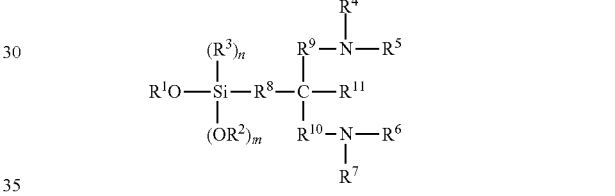

[Formula 1a]

(wherein $R^1$, $R^2$, $R^3$, $R^4$, $R^5$, $R^6$, $R^7$, $R^8$, $R^9$, $R^{10}$, $R^{11}$, m, and n are respectively as defined hereinbefore)

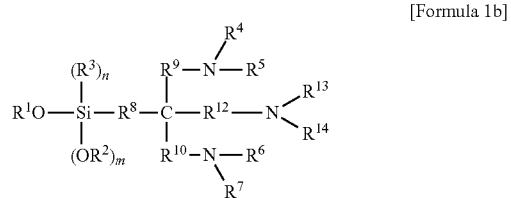

[Formula 1b]

(wherein $R^1$, $R^2$, $R^3$, $R^4$, $R^5$, $R^6$, $R^7$, $R^8$, $R^9$, $R^{10}$, $R^{12}$, $R^{13}$, $R^{14}$, m, and n are respectively as defined hereinbefore)

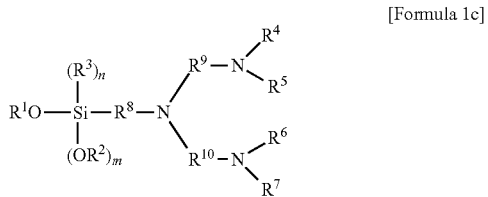

[Formula 1c]

(wherein $R^1$, $R^2$, $R^3$, $R^4$, $R^5$, $R^6$, $R^7$, $R^8$, $R^9$, $R^{10}$, m, and n are respectively as defined hereinbefore).

In an exemplary embodiment for the substituents of the terminal modifier, $R^1$, $R^2$, and $R^3$, which may be the same or different, independently represents a monovalent saturated or unsaturated hydrocarbon chain of 1 to 8 carbon atoms; $R^4$, $R^5$, $R^6$, $R^7$, $R^{11}$, $R^{13}$, and $R^{14}$, which may be the same or different, independently represent a monovalent saturated or unsaturated hydrocarbon chain of 1 to 8 carbon atoms; and $R^8$, $R^9$, $R^{10}$, and $R^{12}$, which may be the same or different, independently represent a bivalent saturated or unsaturated hydrocarbon chain of 1 to 8 carbon atoms.

In a further exemplary embodiment for the substituents of the terminal modifier, $R^1$, $R^2$, and $R^3$, which may be the same or different, independently represent methyl, ethyl, normal propyl, isopropyl, normal butyl, isobutyl, tert-butyl, normal pentyl, normal hexyl, or normal heptyl; $R^4$, $R^5$, $R^6$, $R^7$, $R^{11}$, $R^{13}$, and $R^{14}$, which may be the same or different, independently represent a hydrogen atom, methyl, ethyl, normal propyl, isopropyl, normal butyl, isobutyl, tert-butyl, normal pentyl, normal hexyl, or normal heptyl; $R^8$, $R^9$, $R^{10}$, or $R^{12}$, which may be the same or different, independently represent methylene, ethylene, normal propylene, isopropylene, normal butylene, isobutylene, tert-butylene, normal pentylene, normal hexylene, or normal heptylene.

The terminal modifier of Formula 1a is accounted for by a compound of Formula in which X is C—$R^{11}$, and thus, for example, may be named 4-alkyl-N1,N1,N7-trialkyl-4-((alkoxysilyl)methyl)heptane-1,7-diamine. Concrete examples of the terminal modifier of Formula 1a include, but are not limited to:

N1,N1,N7,N7,4-pentamethyl-4-((trimethoxysilyl)methyl)heptane-1,7-diamine,
N1,N1,N7,N7,4-pentamethyl-4-((methyldimethoxysilyl)methyl)heptane-1,7-diamine,
N1,N1,N7,N7,4-pentamethyl-4-((ethyldimethoxysilyl)methyl)heptane-1,7-diamine,
N1,N1,N7,N7,4-pentamethyl-4-((dimethylmethoxysilyl)methyl)heptane-1,7-diamine,
N1,N1,N7,N7,4-pentamethyl-4-((diethylmethoxysilyl)methyl)heptane-1,7-diamine,
N1,N1,N7,N7,4-pentamethyl-4-((ethylmethylmethoxysilyl)methyl)heptane-1,7-diamine,
N1,N1,N7,N7,4-pentamethyl-4-((triethoxysilyl)methyl)heptane-1,7-diamine,
N1,N1,N7,N7,4-pentamethyl-4-((methyldiethoxysilyl)methyl)heptane-1,7-diamine,
N1,N1,N7,N7,4-pentamethyl-4-((ethyldiethoxysilyl)methyl)heptane-1,7-diamine,
N1,N1,N7,N7,4-pentamethyl-4-((dimethylethoxysilyl)methyl)heptane-1,7-diamine,
N1,N1,N7,N7,4-pentamethyl-4-((diethylethoxysilyl)methyl)heptane-1,7-diamine,
N1,N1,N7,N7,4-pentamethyl-4-((ethylmethylethoxy)methyl)heptane-1,7-diamine,
4-ethyl-N1,N1,N7,N7-tetramethyl-4-((trimethoxysilyl)methyl)heptane-1,7-diamine,
4-ethyl-N1,N1,N7,N7-tetramethyl-4-((methyldimethoxysilyl)methyl)heptane-1,7-diamine,
4-ethyl-N1,N1,N7,N7-tetramethyl-4-((ethyldimethoxysilyl)methyl)heptane-1,7-diamine,
4-ethyl-N1,N1,N7,N7-tetramethyl-4-((dimethylmethoxysilyl)methyl)heptane-1,7-diamine,
4-ethyl-N1,N1,N7,N7-tetramethyl-4-((diethylmethoxysilyl)methyl)heptane-1,7-diamine,
4-ethyl-N1,N1,N7,N7-tetramethyl-4-((ethylmethylmethoxysilyl)methyl) heptane-1,7-diamine,
4-ethyl-N1,N1,N7,N7-tetramethyl-4-((triethoxysilyl)methyl)heptane-1,7-diamine,
4-ethyl-N1,N1,N7,N7-tetramethyl-4-((methyldiethoxysilyl)methyl)heptane-1,7-diamine,
4-ethyl-N1,N1,N7,N7-tetramethyl-4-((ethyldiethoxysilyl)methyl)heptane-1,7-diamine,
4-ethyl-N1,N1,N7,N7-tetramethyl-4-((dimethylethoxysilyl)methyl)heptane-1,7-diamine,
4-ethyl-N1,N1,N7,N7-tetramethyl-4-((diethylethoxysilyl)methyl)heptane-1,7-diamine,
4-ethyl-N1,N1,N7,N7-tetramethyl-4-((ethylmethylethoxy)methyl)heptane-1,7-diamine,
2-((hexyldimethoxysilyl)methyl)-N1,N1,N3,N3,2-pentamethylpropane-1,3-diamine,
2-((hexylmethylmethoxysilyl)methyl)-N1,N1,N3,N3,2-pentamethylpropane-1,3-diamine,
2-((hexylethylmethoxysilyl)methyl)-N1,N1,N3,N3,2-pentamethylpropane-1,3-diamine,
2-((hexyldiethoxysilyl)methyl)-N1,N1,N3,N3,2-pentamethylpropane-1,3-diamine,
2-((hexylmethylethoxysilyl)methyl)-N1,N1,N3,N3,2-pentamethylpropane-1,3-diamine,
2-((hexylethylethoxysilyl)methyl)-N1,N1,N3,N3,2-pentamethylpropane-1,3-diamine,
2-ethyl-2-((hexyldimethoxysilyl)methyl)-N1,N1,N3,N3-tetramethylpropane-1,3-diamine,
2-ethyl-2-((hexylmethylmethoxysilyl)methyl)-N1,N1,N3,N3-tetramethylpropane-1,3-diamine,
2-ethyl-2-((hexylethylmethoxysilyl)methyl)-N1,N1,N3,N3-tetramethylpropane-1,3-diamine,
2-ethyl-2-((hexyldiethoxysilyl)methyl)-N1,N1,N3,N3-tetramethylpropane-1,3-diamine,
2-ethyl-2-((hexylmethylethoxysilyl)methyl)-N1,N1,N3,N3-tetramethylpropane-1,3-diamine,
2-ethyl-2-((hexylethylethoxysilyl)methyl)-N1,N1,N3,N3-tetramethylpropane-1,3-diamine,
3-((hexyldimethoxysilyl)methyl)-N1,N1,N5,N5,3-pentamethylpentane-1,3-diamine,
3-((hexylmethylmethoxysilyl)methyl)-N1,N1,N5,N5,3-pentamethylpentane-1,3-diamine,
3-((hexylethylmethoxysilyl)methyl)-N1,N1,N5,N5,3-pentamethylpentane-1,3-diamine,
3-((hexyldiethoxysilyl)methyl)-N1,N1,N5,N5,3-pentamethylpentane-1,3-diamine,
3-((hexylmethylethoxysilyl)methyl)-N1,N1,N5,N5,3-pentamethylpentane-1,3-diamine,
3-((hexylethylethoxysilyl)methyl)-N1,N1,N5,N5,3-pentamethylpentane-1,3-diamine,
3-ethyl-3-((hexyldimethoxysilyl)methyl)-N1,N1,N5,N5-tetramethylpentane-1,3-diamine,
3-ethyl-3-((hexylmethylmethoxysilyl)methyl)-N1,N1,N5,N5-tetramethylpentane-1,3-diamine,
3-ethyl-3-((hexylethylmethoxysilyl)methyl)-N1,N1,N5,N5-tetramethylpentane-1,3-diamine,
3-ethyl-3-((hexyldiethoxysilyl)methyl)-N1,N1,N5,N5-tetramethylpentane-1,3-diamine,
3-ethyl-3-((hexylmethylethoxysilyl)methyl)-N1,N1,N5,N5-tetramethylpentane-1,3-diamine,
3-ethyl-3-((hexylethylethoxysilyl)methyl)-N1,N1,N5,N5-tetramethylpentane-1,3-diamine,
4-((hexyldimethoxysilyl)methyl)-N1,N1,N7,N7,4-pentamethylheptane-1,7-diamine,
4-((hexylmethylmethoxysilyl)methyl)-N1,N1,N7,N7,4-pentamethylheptane-1,7-diamine,
4-((hexylethylmethoxysilyl)methyl)-N1,N1,N7,N7,4-pentamethylheptane-1,7-diamine,
4-((hexyldiethoxysilyl)methyl)-N1,N1,N7,N7,4-pentamethylheptane-1,7-diamine,
4-((hexylmethylethoxysilyl)methyl)-N1,N1,N7,N7,4-pentamethylheptane-1,7-diamine, 4-((hexylethylethoxysilyl)methyl)-N1,N1,N7,N7,4-pentamethylheptane-1,7-diamine,
4-ethyl-4-((hexyldimethoxysilyl)methyl)-N1,N1,N7,N7-tetramethylheptane-1,7-diamine,
4-ethyl-4-((hexylmethylmethoxysilyl)methyl)-N1,N1,N7,N7-tetramethylheptane-1,7-diamine,
4-ethyl-4-((hexylethylmethoxysilyl)methyl)-N1,N1,N7,N7-tetramethylheptane-1,7-diamine,
4-ethyl-4-((hexyldiethoxysilyl)methyl)-N1,N1,N7,N7-tetramethylheptane-1,7-diamine,
4-ethyl-4-((hexylmethylethoxysilyl)methyl)-N1,N1,N7,N7-tetramethylheptane-1,7-diamine,
4-ethyl-4-((hexylethylethoxysilyl)methyl)-N1,N1,N7,N7-tetramethylheptane-1,7-diamine,
2-((dimethoxy(phenethyll)silyl)methyl)-N1,N1,N3,N3,2-pentamethylpropane-1,3-diamine,
2-((methylmethoxy(phenethyll)silyl)methyl)-N1,N1,N3,N3,2-pentamethylpropane-1,3-diamine,
2-((ethylmethoxy(phenethyll)silyl)methyl)-N1,N1,N3,N3,2-pentamethylpropane-1,3-diamine,
2-((diethoxy(phenethyll)silyl)methyl)-N1,N1,N3,N3,2-pentamethylpropane-1,3-diamine,
2-((methylethoxy(phenethyll)silyl)methyl)-N1,N1,N3,N3,2-pentamethylpropane-1,3-diamine,
2-((ethylethoxy(phenethyll)silyl)methyl)-N1,N1,N3,N3,2-pentamethylpropane-1,3-diamine,
2-ethyl-2-((dimethoxy(phenethyll)silyl)methyl)-N1,N1,N3,N3-tetramethylpropane-1,3-diamine,
2-ethyl-2-((methylmethoxy(phenethyll)silyl)methyl)-N1,N1,N3,N3-tetramethylpropane-1,3-diamine,
2-ethyl-2-((ethylmethoxy(phenethyll)silyl)methyl)-N1,N1,N3,N3-tetramethylpropane-1,3-diamine,
2-ethyl-2-((diethoxy(phenethyll)silyl)methyl)-N1,N1,N3,N3-tetramethylpropane-1,3-diamine,
2-ethyl-2-((methylethoxy(phenethyll)silyl)methyl)-N1,N1,N3,N3-tetramethylpropane-1,3-diamine,
2-ethyl-2-((ethylethoxy(phenethyll)silyl)methyl)-N1,N1,N3,N3-tetramethylpropane-1,3-diamine,
3-((dimethoxy(phenethyll)silyl)methyl)-N1,N1,N5,N5,3-pentamethylmethyl-1,5-diamine,
3-((methylmethoxy(phenethyll)silyl)methyl)-N1,N1,N5,N5,3-pentamethylpentane-1,3-diamine,
3-((ethylmethoxy(phenethyll)silyl)methyl)-N1,N1,N5,N5,3-pentamethylpentane-1,3-diamine,
3-((diethoxy(phenethyll)silyl)methyl)-N1,N1,N5,N5,3-pentamethylpentane-1,3-diamine,
3-((methylethoxy(phenethyll)silyl)methyl)-N1,N1,N5,N5,3-pentamethylpentane-1,5-diamine,
3-((ethylethoxy(phenethyll)silyl)methyl)-N1,N1,N5,N5,3-pentamethylpentane-1,3-diamine,
3-((dimethoxy(phenethyll)silyl)methyl)-N1,N1,N5,N5,3-pentamethylmethyl-1,5-diamine,
3-((methylmethoxy(phenethyll)silyl)methyl)-N1,N1,N5,N5,3-pentamethylpentane-1,3-diamine,
3-((ethylmethoxy(phenethyll)silyl)methyl)-N1,N1,N5,N5,3-pentamethylpentane-1,3-diamine,
3-((diethoxy(phenethyll)silyl)methyl)-N1,N1,N5,N5,3-pentamethylpentane-1,3-diamine,
3-((methylethoxy(phenethyll)silyl)methyl)-N1,N1,N5,N5,3-pentamethylpentane-1,5-diamine,
3-((ethylethoxy(phenethyll)silyl)methyl)-N1,N1,N5,N5,3-pentamethylpentane-1,3-diamine,
4-((dimethoxy(phenethyll)silyl)methyl)-N1,N1,N7,N7,4-pentamethylheptane-1,7-diamine,
4-((methylmethoxy(phenethyll)silyl)methyl)-N1,N1,N7,N7,4-pentamethylheptane-1,7-diamine,
4-((ethylmethoxy(phenethyll)silyl)methyl)-N1,N1,N7,N7,4-pentamethylheptane-1,7-diamine,
4-((diethoxy(phenethyll)silyl)methyl)-N1,N1,N7,N7,4-pentamethylheptane-1,7-diamine,
4-((methylethoxy(phenethyll)silyl)methyl)-N1,N1,N7,N7,4-pentamethylheptane-1,7-diamine,
4-((ethylethoxy(phenethyll)silyl)methyl)-N1,N1,N7,N7,4-pentamethylheptane-1,7-diamine,
4-((dimethoxy(phenethyll)silyl)methyl)-4-ethyl-N1,N1,N7,N7-tetramethylheptane-1,7-diamine,
4-((methylmethoxy(phenethyll)silyl)methyl)-4-ethyl-N1,N1,N7,N7-tetramethylheptane-1,7-diamine,
4-((ethylmethoxy(phenethyll)silyl)methyl)-4-ethyl-N1,N1,N7,N7-tetramethylheptane-1,7-diamine,
4-((diethoxy(phenethyll)silyl)methyl)-4-ethyl-N1,N1,N7,N7-tetramethylheptane-1,7-diamine,
4-((methylethoxy(phenethyll)silyl)methyl)-4-ethyl-N1,N1,N7,N7-tetramethylheptane-1,7-diamine,
4-((ethylethoxy(phenethyll)silyl)methyl)-4-ethyl-N1,N1,N7,N7-tetramethylheptane-1,7-diamine.

The terminal modifier of Formula 1b is accounted for by the compound of Formula 1 in which X is C—R$^{12}$—N(R$^{13}$)(R$^{14}$), and thus may, for example, named 4-(3-(dialkylamino)alkyl)-N1,N1,N7,N7-tetramethyl-4-((trialkoxysilyl)methyl) heptane-1,7-diamine, and concrete examples thereof include, but are not limited to:
4-(3-(dimethylamino)propyl)-N1,N1,N7,N7-tetramethyl-4-((trimethoxysilyl)methyl)heptane-1,7-diamine,
4-(3-(dimethylamino)propyl)-N1,N1,N7,N7-tetramethyl-4-((methyldimethoxysilyl)methyl)heptane-1,7-diamine,
4-(3-(dimethylamino)propyl)-N1,N1,N7,N7-tetramethyl-4-((ethyldimethoxysilyl)methyl)heptane-1,7-diamine,
4-(3-(dimethylamino)propyl)-N1,N1,N7,N7-tetramethyl-4-((dimethylmethoxysilyl)methyl)heptane-1,7-diamine,
4-(3-(dimethylamino)propyl)-N1,N1,N7,N7-tetramethyl-4-((diethylmethoxysilyl)methyl)heptane-1,7-diamine,
4-(3-(dimethylamino)propyl)-N1,N1,N7,N7-tetramethyl-4-((ethylmethylmethoxysilyl)methyl)heptane-1,7-diamine,
4-(3-(dimethylamino)propyl)-N1,N1,N7,N7-tetramethyl-4-((triethoxysilyl)methyl)heptane-1,7-diamine,
4-(3-(dimethylamino)propyl)-N1,N1,N7,N7-tetramethyl-4-((methyldiethoxysilyl)methyl)heptane-1,7-diamine,
4-(3-(dimethylamino)propyl)-N1,N1,N7,N7-tetramethyl-4-((ethyldiethoxysilyl)methyl)heptane-1,7-diamine,
4-(3-(dimethylamino)propyl)-N1,N1,N7,N7-tetramethyl-4-((dimethylethoxysilyl)methyl)heptane-1,7-diamine,
4-(3-(dimethylamino)propyl)-N1,N1,N7,N7-tetramethyl-4-((diethylethoxysilyl)methyl)heptane-1,7-diamine,
4-(3-(dimethylamino)propyl)-N1,N1,N7,N7-tetramethyl-4-((ethylmethylethoxysilyl)methyl)heptane-1,7-diamine,
4-(3-(diethylamino)propyl)-N1,N1,N7,N7-tetraethyl-4-((trimethoxysilyl)methyl)heptane-1,7-diamine,
4-(3-(diethylamino)propyl)-N1,N1,N7,N7-tetraethyl-4-((methyldimethoxysilyl)methyl)heptane-1,7-diamine,
4-(3-(diethylamino)propyl)-N1,N1,N7,N7-tetraethyl-4-((ethyldimethoxysilyl)methyl)heptane-1,7-diamine,
4-(3-(diethylamino)propyl)-N1,N1,N7,N7-tetraethyl-4-((dimethylmethoxysilyl)methyl)heptane-1,7-diamine,
4-(3-(diethylamino)propyl)-N1,N1,N7,N7-tetraethyl-4-((diethylmethoxysilyl)methyl)heptane-1,7-diamine,
4-(3-(diethylamino)propyl)-N1,N1,N7,N7-tetraethyl-4-((ethylmethylmethoxysilyl)methyl)heptane-1,7-diamine,
4-(3-(diethylamino)propyl)-N1,N1,N7,N7-tetraethyl-4-((triethoxysilyl)methyl)heptane-1,7-diamine,
4-(3-(diethylamino)propyl)-N1,N1,N7,N7-tetraethyl-4-((methyldiethoxysilyl)methyl)heptane-1,7-diamine, 4-(3-(diethylamino)propyl)-N1,N1,N7,N7-tetraethyl-4-((ethyldiethoxysilyl)methyl)heptane-1,7-diamine, 4-(3-(diethylamino)propyl)-N1,N1,N7,N7-tetraethyl-4-((dimethylethoxysilyl)methyl)heptane-1,7-diamine, 4-(3-(diethylamino)propyl)-N1,N1,N7,N7-tetraethyl-4-((diethylethoxysilyl)methyl)heptane-1,7-diamine, 4-(3-(diethylamino)propyl)-N1,N1,N7,N7-tetraethyl-4-((ethylmethylethoxysilyl)methyl)heptane-1,7-diamine, 4-(3-(dipropylamino)propyl)-N1,N1,N7,N7-tetrapropyl-4-((trimethoxysilyl)methyl)heptane-1,7-diamine, 4-(3-(dipropylamino)propyl)-N1,N1,N7,N7-tetrapropyl-4-((methyldimethoxysilyl)methyl)heptane-1,7-diamine, 4-(3-(dipropylamino)propyl)-N1,N1,N7,N7-tetrapropyl-4-((ethyldimethoxysilyl)methyl)heptane-1,7-diamine, 4-(3-(dipropylamino)propyl)-N1,N1,N7,N7-tetrapropyl-4-((dimethylmethoxysilyl)methyl)heptane-1,7-diamine, 4-(3-(dipropylamino)propyl)-N1,N1,N7,N7-tetrapropyl-4-((diethylmethoxysilyl)methyl)heptane-1,7-diamine, 4-(3-(dipropylamino)propyl)-N1,N1,N7,N7-tetrapropyl-4-((ethylmethylmethoxysilyl)methyl)heptane-1,7-diamine, 4-(3-(dipropylamino)propyl)-N1,N1,N7,N7-tetrapropyl-4-((triethoxysilyl)methyl)heptane-1,7-diamine, 4-(3-(dipropylamino)propyl)-N1,N1,N7,N7-tetrapropyl-4-((methyldiethoxysilyl)methyl)heptane-1,7-diamine, 4-(3-(dipropylamino)propyl)-N1,N1,N7,N7-tetrapropyl-4-((ethyldiethoxysilyl)methyl)heptane-1,7-diamine, 4-(3-(dipropylamino)propyl)-N1,N1,N7,N7-tetrapropyl-4-((dimethylethoxysilyl)methyl)heptane-1,7-diamine, 4-(3-(dipropylamino)propyl)-N1,N1,N7,N7-tetrapropyl-4-((diethylethoxysilyl)methyl)heptane-1,7-diamine, 4-(3-(dipropylamino)propyl)-N1,N1,N7,N7-tetrapropyl-4-((ethylmethylethoxysilyl)methyl)heptane-1,7-diamine, N1,N7-diethyl-4-(3-(ethyl(methyl)amino)propyl)-N1,N7-dimethyl-4-((trimethoxysilyl)methyl)heptane-1,7-diamine, N1,N7-diethyl-4-(3-(ethyl(methyl)amino)propyl)-N1,N7-dimethyl-4-((methyldimethoxysilyl)methyl)heptane-1,7-diamine, N1,N7-diethyl-4-(3-(ethyl(methyl)amino)propyl)-N1,N7-dimethyl-4-((ethyldimethoxysilyl)methyl)heptane-1,7-diamine, N1,N7-diethyl-4-(3-(ethyl(methyl)amino)propyl)-N1,N7-dimethyl-4-((dimethylmethoxysilyl)methyl)heptane-1,7-diamine, N1,N7-diethyl-4-(3-(ethyl(methyl)amino)propyl)-N1,N7-dimethyl-4-((diethylmethoxysilyl)methyl)heptane-1,7-diamine, N1,N7-diethyl-4-(3-(ethyl(methyl)amino)propyl)-N1,N7-dimethyl-4-((ethylmethylmethoxysilyl)methyl)heptane-1,7-diamine, N1,N7-diethyl-4-(3-(ethyl(methyl)amino)propyl)-N1,N7-dimethyl-4-((triethoxysilyl)methyl)heptane-1,7-diamine, N1,N7-diethyl-4-(3-(ethyl(methyl)amino)propyl)-N1,N7-dimethyl-4-((methyldiethoxysilyl)methyl)heptane-1,7-diamine, N1,N7-diethyl-4-(3-(ethyl(methyl)amino)propyl)-N1,N7-dimethyl-4-((ethyldiethoxysilyl)methyl)heptane-1,7-diamine, N1,N7-diethyl-4-(3-(ethyl(methyl)amino)propyl)-N1,N7-dimethyl-4-((dimethylethoxysilyl)methyl)heptane-1,7-diamine, N1,N7-diethyl-4-(3-(ethyl(methyl)amino)propyl)-N1,N7-dimethyl-4-((diethylethoxysilyl)methyl)heptane-1,7-diamine, N1,N7-diethyl-4-(3-(ethyl(methyl)amino)propyl)-N1,N7-dimethyl-4-((ethylmethylethoxysilyl)methyl)heptane-1,7-diamine, N1,N7-dimethyl-4-(3-(methyl(propyl)amino)propyl)-N1,N7-dipropyl-4-((trimethoxysilyl)methyl)heptane-1,7-diamine, N1,N7-dimethyl-4-(3-(methyl(propyl)amino)propyl)-N1,N7-dipropyl-4-((methyldimethoxysilyl)methyl)heptane-1,7-diamine, N1,N7-dimethyl-4-(3-(methyl(propyl)amino)propyl)-N1,N7-dipropyl-4-((ethyldimethoxysilyl)methyl)heptane-1,7-diamine, N1,N7-dimethyl-4-(3-(methyl(propyl)amino)propyl)-N1,N7-dipropyl-4-((dimethylmethoxysilyl)methyl)heptane-1,7-diamine, N1,N7-dimethyl-4-(3-(methyl(propyl)amino)propyl)-N1,N7-dipropyl-4-((diethylmethoxysilyl)methyl)heptane-1,7-diamine, N1,N7-dimethyl-4-(3-(methyl(propyl)amino)propyl)-N1,N7-dipropyl-4-((ethylmethylmethoxysilyl)methyl)heptane-1,7-diamine, N1,N7-dimethyl-4-(3-(methyl(propyl)amino)propyl)-N1,N7-dipropyl-4-((triethoxysilyl)methyl)heptane-1,7-diamine, N1,N7-dimethyl-4-(3-(methyl(propyl)amino)propyl)-N1,N7-dipropyl-4-((methyldiethoxysilyl)methyl)heptane-1,7-diamine, N1,N7-dimethyl-4-(3-(methyl(propyl)amino)propyl)-N1,N7-dipropyl-4-((ethyldiethoxysilyl)methyl)heptane-1,7-diamine, N1,N7-dimethyl-4-(3-(methyl(propyl)amino)propyl)-N1,N7-dipropyl-4-((dimethylethoxysilyl)methyl)heptane-1,7-diamine, N1,N7-dimethyl-4-(3-(methyl(propyl)amino)propyl)-N1,N7-dipropyl-4-((diethylethoxysilyl)methyl)heptane-1,7-diamine, N1,N7-dimethyl-4-(3-(methyl(propyl)amino)propyl)-N1,N7-dipropyl-4-((ethylmethylethoxysilyl)methyl)heptane-1,7-diamine, N1,N7-diethyl-4-(3-(ethyl(propyl)amino)propyl)-N1,N7-dipropyl-4-((trimethoxysilyl)methyl)heptane-1,7-diamine, N1,N7-diethyl-4-(3-(ethyl(propyl)amino)propyl)-N1,N7-dipropyl-4-((methyldimethoxysilyl)methyl)heptane-1,7-diamine, N1,N7-diethyl-4-(3-(ethyl(propyl)amino)propyl)-N1,N7-dipropyl-4-((ethyldimethoxysilyl)methyl)heptane-1,7-diamine, N1,N7-diethyl-4-(3-(ethyl(propyl)amino)propyl)-N1,N7-dipropyl-4-((dimethylmethoxysilyl)methyl)heptane-1,7-diamine, N1,N7-diethyl-4-(3-(ethyl(propyl)amino)propyl)-N1,N7-dipropyl-4-((diethylmethoxysilyl)methyl)heptane-1,7-diamine, N1,N7-diethyl-4-(3-(ethyl(propyl)amino)propyl)-N1,N7-dipropyl-4-((ethylmethylmethoxysilyl)methyl)heptane-1,7-diamine, N1,N7-diethyl-4-(3-(ethyl(propyl)amino)propyl)-N1,N7-dipropyl-4-((triethoxysilyl)methyl)heptane-1,7-diamine, N1,N7-diethyl-4-(3-(ethyl(propyl)amino)propyl)-N1,N7-dipropyl-4-((methyldiethoxysilyl)methyl)heptane-1,7-diamine, N1,N7-diethyl-4-(3-(ethyl(propyl)amino)propyl)-N1,N7-dipropyl-4-((ethyldiethoxysilyl)methyl)heptane-1,7-diamine, N1,N7-diethyl-4-(3-(ethyl(propyl)amino)propyl)-N1,N7-dipropyl-4-((dimethylethoxysilyl)methyl)heptane-1,7-diamine, N1,N7-diethyl-4-(3-(ethyl(propyl)amino)propyl)-N1,N7-dipropyl-4-((diethylethoxysilyl)methyl)heptane-1,7-diamine, N1,N7-diethyl-4-(3-(ethyl(propyl)amino)propyl)-N1,N7-dipropyl-4-((ethylmethylethoxysilyl)methyl)heptane-1,7-diamine, 4-(3-(dimethylamino)propyl)-N1,N1,N7,N7-tetramethyl-4-(2-(trimethoxysilyl)ethyl)heptane-1,7-diamine, 4-(3-(dimethylamino)propyl)-N1,N1,N7,N7-tetramethyl-4-(2-(methyldimethoxysilyl)ethyl)heptane-1,7-diamine, 4-(3-(dimethylamino)propyl)-N1,N1,N7,N7-tetramethyl-4-(2-(ethyldimethoxysilyl)ethyl)heptane-1,7-diamine, 4-(3-(dimethylamino)propyl)-N1,N1,N7,N7-tetramethyl-4-(2-(dimethylmethoxysilyl)ethyl)heptane-1,7-diamine, 4-(3-(dimethylamino)propyl)-N1,N1,N7,N7-tetramethyl-4-(2-(diethylmethoxysilyl)ethyl)heptane-1,7-diamine, 4-(3-(dimethylamino)propyl)-N1,N1,N7,N7-tetramethyl-4-(2-(ethylmethylmethoxysilyl)ethyl)heptane-1,7-diamine, 4-(3-(dimethylamino)propyl)-N1,N1,N7,N7-tetramethyl-4-(2-(triethoxysilyl)ethyl)heptane-1,7-diamine, 4-(3-(dimethylamino)propyl)-N1,N1,N7,N7-tetramethyl-4-(2-(methyldiethoxysilyl)ethyl)heptane-1,7-diamine, 4-(3-(dimethylamino)propyl)-N1,N1,N7,N7-tetramethyl-4-(2-(ethyldiethoxysilyl)ethyl)heptane-1,7-diamine, 4-(3-(dimethylamino)propyl)-N1,N1,N7,N7-tetramethyl-4-(2-(dimethylethoxysilyl)ethyl)heptane-1,7-diamine, 4-(3-(dimethylamino)propyl)-N1,N1,N7,N7-tetramethyl-4-(2-(diethylethoxysilyl)ethyl)heptane-1,7-diamine, 4-(3-(dimethylamino)propyl)-N1,N1,N7,N7-tetramethyl-4-(2-(ethylmethylethoxysilyl)ethyl)heptane-1,7-diamine, 4-(3-(diethylamino)propyl)-N1,N1,N7,N7-tetraethyl-4-(2-(trimethoxysilyl)ethyl)heptane-1,7-diamine, 4-(3-(diethylamino)propyl)-N1,N1,N7,N7-tetraethyl-4-(2-(methyldimethoxysilyl)ethyl)heptane-1,7-diamine, 4-(3-(diethylamino)propyl)-N1,N1,N7,N7-tetraethyl-4-(2-(ethyldimethoxysilyl)ethyl)heptane-1,7-diamine, 4-(3-(diethylamino)propyl)-N1,N1,N7,N7-tetraethyl-4-(2-(dimethylmethoxysilyl)ethyl)heptane-1,7-diamine, 4-(3-(diethylamino)propyl)-N1,N1,N7,N7-tetraethyl-4-(2-(diethylmethoxysilyl)ethyl)heptane-1,7-diamine, 4-(3-(diethylamino)propyl)-N1,N1,N7,N7-tetraethyl-4-(2-(ethylmethylmethoxysilyl)ethyl)heptane-1,7-diamine, 4-(3-(diethylamino)propyl)-N1,N1,N7,N7-tetraethyl-4-(2-(triethoxysilyl)ethyl)heptane-1,7-diamine, 4-(3-(diethylamino)propyl)-N1,N1,N7,N7-tetraethyl-4-(2-(methyldiethoxysilyl)ethyl)heptane-1,7-diamine, 4-(3-(diethylamino)propyl)-N1,N1,N7,N7-tetraethyl-4-(2-(ethyldiethoxysilyl)ethyl)heptane-1,7-diamine, 4-(3-(diethylamino)propyl)-N1,N1,N7,N7-tetraethyl-4-(2-(dimethylethoxysilyl)ethyl)heptane-1,7-diamine, 4-(3-(diethylamino)propyl)-N1,N1,N7,N7-tetraethyl-4-(2-(diethylethoxysilyl)ethyl)heptane-1,7-diamine, 4-(3-(diethylamino)propyl)-N1,N1,N7,N7-tetraethyl-4-(2-(ethylmethylethoxysilyl)ethyl)heptane-1,7-diamine, 4-(3-(dipropylamino)propyl)-N1,N1,N7,N7-tetrapropyl-4-(2-(trimethoxysilyl)ethyl)heptane-1,7-diamine, 4-(3-(dipropylamino)propyl)-N1,N1,N7,N7-tetrapropyl-4-(2-(methyldimethoxysilyl)ethyl)heptane-1,7-diamine, 4-(3-(dipropylamino)propyl)-N1,N1,N7,N7-tetrapropyl-4-(2-(ethyldimethoxysilyl)ethyl)heptane-1,7-diamine, 4-(3-(dipropylamino)propyl)-N1,N1,N7,N7-tetrapropyl-4-(2-(dimethylmethoxysilyl)ethyl)heptane-1,7-diamine, 4-(3-(dipropylamino)propyl)-N1,N1,N7,N7-tetrapropyl-4-(2-(diethylmethoxysilyl)ethyl)heptane-1,7-diamine, 4-(3-(dipropylamino)propyl)-N1,N1,N7,N7-tetrapropyl-4-(2-(ethylmethylmethoxysilyl)ethyl)heptane-1,7-diamine, 4-(3-(dipropylamino)propyl)-N1,N1,N7,N7-tetrapropyl-4-(2-(triethoxysilyl)ethyl)heptane-1,7-diamine, 4-(3-(dipropylamino)propyl)-N1,N1,N7,N7-tetrapropyl-4-(2-(methyldiethoxysilyl)ethyl)heptane-1,7-diamine, 4-(3-(dipropylamino)propyl)-N1,N1,N7,N7-tetrapropyl-4-(2-(ethyldiethoxysilyl)ethyl)heptane-1,7-diamine, 4-(3-(dipropylamino)propyl)-N1,N1,N7,N7-tetrapropyl-4-(2-(dimethylethoxysilyl)ethyl)heptane-1,7-diamine, 4-(3-(dipropylamino)propyl)-N1,N1,N7,N7-tetrapropyl-4-(2-(diethylethoxysilyl)ethyl)heptane-1,7-diamine, 4-(3-(dipropylamino)propyl)-N1,N1,N7,N7-tetrapropyl-4-(2-(ethylmethylethoxysilyl)ethyl)heptane-1,7-diamine, N1,N7-diethyl-4-(3-(ethyl(methyl)amino)propyl)-N1,N7-dimethyl-4-(2-(trimethoxysilyl)ethyl)heptane-1,7-diamine, N1,N7-diethyl-4-(3-(ethyl(methyl)amino)propyl)-N1,N7-dimethyl-4-(2-(methyldimethoxysilyl)ethyl)heptane-1,7-diamine, N1,N7-diethyl-4-(3-(ethyl(methyl)amino)propyl)-N1,N7-dimethyl-4-(2-(ethyldimethoxysilyl)ethyl)heptane-1,7-diamine, N1,N7-diethyl-4-(3-(ethyl(methyl)amino)propyl)-N1,N7-dimethyl-4-(2-(dimethylmethoxysilyl)ethyl)heptane-1,7-diamine, N1,N7-diethyl-4-(3-(ethyl(methyl)amino)propyl)-N1,N7-dimethyl-4-(2-(diethylmethoxysilyl)ethyl)heptane-1,7-diamine, N1,N7-diethyl-4-(3-(ethyl(methyl)amino)propyl)-N1,N7-dimethyl-4-(2-(ethylmethylmethoxysilyl)ethyl)heptane-1,7-diamine, N1,N7-diethyl-4-(3-(ethyl(methyl)amino)propyl)-N1,N7-dimethyl-4-(2-(triethoxysilyl)ethyl)heptane-1,7-diamine, N1,N7-diethyl-4-(3-(ethyl(methyl)amino)propyl)-N1,N7-dimethyl-4-(2-(methyldiethoxysilyl)ethyl)heptane-1,7-diamine, N1,N7-diethyl-4-(3-(ethyl(methyl)amino)propyl)-N1,N7-dimethyl-4-(2-(ethyldiethoxysilyl)ethyl)heptane-1,7-diamine, N1,N7-diethyl-4-(3-(ethyl(methyl)amino)propyl)-N1,N7-dimethyl-4-(2-(dimethylethoxysilyl)ethyl)heptane-1,7-diamine, N1,N7-diethyl-4-(3-(ethyl(methyl)amino)propyl)-N1,N7-dimethyl-4-(2-(diethylethoxysilyl)ethyl)heptane-1,7-diamine, N1,N7-diethyl-4-(3-(ethyl(methyl)amino)propyl)-N1,N7-dimethyl-4-(2-(ethylmethylethoxysilyl)ethyl)heptane-1,7-diamine, N1,N7-dimethyl-4-(3-(methyl(propyl)amino)propyl)-N1,N7-dipropyl-4-(2-(trimethoxysilyl)ethyl)heptane-1,7-diamine, N1,N7-dimethyl-4-(3-(methyl(propyl)amino)propyl)-N1,N7-dipropyl-4-(2-(methyldimethoxysilyl)ethyl)heptane-1,7-diamine, N1,N7-dimethyl-4-(3-(methyl(propyl)amino)propyl)-N1,N7-dipropyl-4-(2-(ethyldimethoxysilyl)ethyl)heptane-1,7-diamine, N1,N7-dimethyl-4-(3-(methyl(propyl)amino)propyl)-N1,N7-dipropyl-4-(2-(dimethylmethoxysilyl)ethyl)heptane-1,7-diamine, N1,N7-dimethyl-4-(3-(methyl(propyl)amino)propyl)-N1,N7-dipropyl-4-(2-(diethylmethoxysilyl)ethyl)heptane-1,7-diamine, N1,N7-dimethyl-4-(3-(methyl(propyl)amino)propyl)-N1,N7-dipropyl-4-(2-(ethylmethylmethoxysilyl)ethyl)heptane-1,7-diamine, N1,N7-dimethyl-4-(3-(methyl(propyl)amino)propyl)-N1,N7-dipropyl-4-(2-(triethoxysilyl)ethyl)heptane-1,7-diamine,
N1,N7-dimethyl-4-(3-(methyl(propyl)amino)propyl)-N1,N7-dipropyl-4-(2-(methyldiethoxysilyl)ethyl)heptane-1,7-diamine,
N1,N7-dimethyl-4-(3-(methyl(propyl)amino)propyl)-N1,N7-dipropyl-4-(2-(ethyldiethoxysilyl)ethyl)heptane-1,7-diamine,
N1,N7-dimethyl-4-(3-(methyl(propyl)amino)propyl)-N1,N7-dipropyl-4-(2-(dimethylethoxysilyl)ethyl)heptane-1,7-diamine,
N1,N7-dimethyl-4-(3-(methyl(propyl)amino)propyl)-N1,N7-dipropyl-4-(2-(diethylethoxysilyl)ethyl)heptane-1,7-diamine,
N1,N7-dimethyl-4-(3-(methyl(propyl)amino)propyl)-N1,N7-dipropyl-4-(2-(ethylmethylethoxysilyl)ethyl)heptane-1,7-diamine,
N1,N7-diethyl-4-(3-(ethyl(propyl)amino)propyl)-N1,N7-dipropyl-4-(2-(trimethoxysilyl)ethyl)heptane-1,7-diamine,
N1,N7-diethyl-4-(3-(ethyl(propyl)amino)propyl)-N1,N7-dipropyl-4-(2-(methyldimethoxysilyl)ethyl)heptane-1,7-diamine,
N1,N7-diethyl-4-(3-(ethyl(propyl)amino)propyl)-N1,N7-dipropyl-4-(2-(ethyldimethoxysilyl)ethyl)heptane-1,7-diamine,
N1,N7-diethyl-4-(3-(ethyl(propyl)amino)propyl)-N1,N7-dipropyl-4-(2-(dimethylmethoxysilyl)ethyl)heptane-1,7-diamine,
N1,N7-diethyl-4-(3-(ethyl(propyl)amino)propyl)-N1,N7-dipropyl-4-(2-(diethylmethoxysilyl)ethyl)heptane-1,7-diamine,
N1,N7-diethyl-4-(3-(ethyl(propyl)amino)propyl)-N1,N7-dipropyl-4-(2-(ethylmethylmethoxysilyl)ethyl)heptane-1,7-diamine,
N1,N7-diethyl-4-(3-(ethyl(propyl)amino)propyl)-N1,N7-dipropyl-4-(2-(triethoxysilyl)ethyl)heptane-1,7-diamine,
N1,N7-diethyl-4-(3-(ethyl(propyl)amino)propyl)-N1,N7-dipropyl-4-(2-(methyldiethoxysilyl)ethyl)heptane-1,7-diamine,
N1,N7-diethyl-4-(3-(ethyl(propyl)amino)propyl)-N1,N7-dipropyl-4-(2-(ethyldiethoxysilyl)ethyl)heptane-1,7-diamine,
N1,N7-diethyl-4-(3-(ethyl(propyl)amino)propyl)-N1,N7-dipropyl-4-(2-(dimethylethoxysilyl)ethyl)heptane-1,7-diamine,
N1,N7-diethyl-4-(3-(ethyl(propyl)amino)propyl)-N1,N7-dipropyl-4-(2-(diethylethoxysilyl)ethyl)heptane-1,7-diamine,
N1,N7-diethyl-4-(3-(ethyl(propyl)amino)propyl)-N1,N7-dipropyl-4-(2-(ethylmethylethoxysilyl)ethyl)heptane-1,7-diamine,
3-(2-(dimethylamino)ethyl)-N1,N1,N5,N5-tetramethyl-3-((trimethoxysilyl)methyl)pentane-1,3-diamine,
3-(2-(dimethylamino)ethyl)-N1,N1,N5,N5-tetramethyl-3-((methyldimethoxysilyl)methyl)pentane-1,3-diamine,
3-(2-(dimethylamino)ethyl)-N1,N1,N5,N5-tetramethyl-3-((ethyldimethoxysilyl)methyl)pentane-1,3-diamine,
3-(2-(dimethylamino)ethyl)-N1,N1,N5,N5-tetramethyl-3-((dimethylmethoxysilyl)methyl)pentane-1,3-diamine,
3-(2-(dimethylamino)ethyl)-N1,N1,N5,N5-tetramethyl-3-((diethylmethoxysilyl)methyl)pentane-1,3-diamine,
3-(2-(dimethylamino)ethyl)-N1,N1,N5,N5-tetramethyl-3-((ethylmethylmethoxysilyl)methyl)pentane-1,3-diamine,
3-(2-(dimethylamino)ethyl)-N1,N1,N5,N5-tetramethyl-3-((triethoxysilyl)methyl)pentane-1,3-diamine,
3-(2-(dimethylamino)ethyl)-N1,N1,N5,N5-tetramethyl-3-((methyldiethoxysilyl)methyl)pentane-1,3-diamine,
3-(2-(dimethylamino)ethyl)-N1,N1,N5,N5-tetramethyl-3-((ethyldiethoxysilyl)methyl)pentane-1,3-diamine,
3-(2-(dimethylamino)ethyl)-N1,N1,N5,N5-tetramethyl-3-((dimethylethoxysilyl)methyl)pentane-1,3-diamine,
3-(2-(dimethylamino)ethyl)-N1,N1,N5,N5-tetramethyl-3-((diethylethoxysilyl)methyl)pentane-1,3-diamine,
3-(2-(dimethylamino)ethyl)-N1,N1,N5,N5-tetramethyl-3-((ethylmethylethoxysilyl)methyl)pentane-1,3-diamine,
3-(2-(diethylamino)ethyl)-N1,N1,N5,N5-tetraethyl-3-((trimethoxysilyl)methyl)pentane-1,3-diamine,
3-(2-(diethylamino)ethyl)-N1,N1,N5,N5-tetraethyl-3-((methyldimethoxysilyl)methyl)pentane-1,3-diamine,
3-(2-(diethylamino)ethyl)-N1,N1,N5,N5-tetraethyl-3-((ethyldimethoxysilyl)methyl)pentane-1,3-diamine,
3-(2-(diethylamino)ethyl)-N1,N1,N5,N5-tetraethyl-3-((dimethylmethoxysilyl)methyl)pentane-1,3-diamine,
3-(2-(diethylamino)ethyl)-N1,N1,N5,N5-tetraethyl-3-((diethylmethoxysilyl)methyl)pentane-1,3-diamine,
3-(2-(diethylamino)ethyl)-N1,N1,N5,N5-tetraethyl-3-((ethylmethylmethoxysilyl)methyl)pentane-1,3-diamine,
3-(2-(diethylamino)ethyl)-N1,N1,N5,N5-tetraethyl-3-((triethoxysilyl)methyl)pentane-1,3-diamine,
3-(2-(diethylamino)ethyl)-N1,N1,N5,N5-tetraethyl-3-((methyldiethoxysilyl)methyl)pentane-1,3-diamine,
3-(2-(diethylamino)ethyl)-N1,N1,N5,N5-tetraethyl-3-((ethyldiethoxysilyl)methyl)pentane-1,3-diamine,
3-(2-(diethylamino)ethyl)-N1,N1,N5,N5-tetraethyl-3-((dimethylethoxysilyl)methyl)pentane-1,3-diamine,
3-(2-(diethylamino)ethyl)-N1,N1,N5,N5-tetraethyl-3-((diethylethoxysilyl)methyl)pentane-1,3-diamine,
3-(2-(diethylamino)ethyl)-N1,N1,N5,N5-tetraethyl-3-((ethylmethylethoxysilyl)methyl)pentane-1,3-diamine,
3-(2-(dipropylamino)ethyl)-N1,N1,N5,N5-tetrapropyl-3-((trimethoxysilyl)methyl)pentane-1,3-diamine,
3-(2-(dipropylamino)ethyl)-N1,N1,N5,N5-tetrapropyl-3-((methyldimethoxysilyl)methyl)pentane-1,3-diamine,
3-(2-(dipropylamino)ethyl)-N1,N1,N5,N5-tetrapropyl-3-((ethyldimethoxysilyl)methyl)pentane-1,3-diamine,
3-(2-(dipropylamino)ethyl)-N1,N1,N5,N5-tetrapropyl-3-((dimethylmethoxysilyl)methyl)pentane-1,3-diamine,
3-(2-(dipropylamino)ethyl)-N1,N1,N5,N5-tetrapropyl-3-((diethylmethoxysilyl)methyl)pentane-1,3-diamine,
3-(2-(dipropylamino)ethyl)-N1,N1,N5,N5-tetrapropyl-3-((ethylmethylmethoxysilyl)methyl)pentane-1,3-diamine,
3-(2-(dipropylamino)ethyl)-N1,N1,N5,N5-tetrapropyl-3-((triethoxysilyl)methyl)pentane-1,3-diamine,
3-(2-(dipropylamino)ethyl)-N1,N1,N5,N5-tetrapropyl-3-((methyldiethoxysilyl)methyl)pentane-1,3-diamine,
3-(2-(dipropylamino)ethyl)-N1,N1,N5,N5-tetrapropyl-3-((ethyldiethoxysilyl)methyl)pentane-1,3-diamine,
3-(2-(dipropylamino)ethyl)-N1,N1,N5,N5-tetrapropyl-3-((dimethylethoxysilyl)methyl)pentane-1,3-diamine,
3-(2-(dipropylamino)ethyl)-N1,N1,N5,N5-tetrapropyl-3-((diethylethoxysilyl)methyl)pentane-1,3-diamine,
3-(2-(dipropylamino)ethyl)-N1,N1,N5,N5-tetrapropyl-3-((ethylmethylethoxysilyl)methyl)pentane-1,3-diamine,
N1,N5-diethyl-3-(2-(ethyl(methyl)amino)ethyl)-N1,N5-dimethyl-3-((trimethoxysilyl)methyl)pentane-1,3-diamine,
N1,N5-diethyl-3-(2-(ethyl(methyl)amino)ethyl)-N1,N5-dimethyl-3-((methyldimethoxysilyl)methyl)pentane-1,3-diamine,
N1,N5-diethyl-3-(2-(ethyl(methyl)amino)ethyl)-N1,N5-dimethyl-3-((ethyldimethoxysilyl)methyl)pentane-1,3-diamine, N1,N5-diethyl-3-(2-(ethyl(methyl)amino)ethyl)-N1,N5-dimethyl-3-((dimethylmethoxysilyl)methyl)pentane-1,3-diamine,
N1,N5-diethyl-3-(2-(ethyl(methyl)amino)ethyl)-N1,N5-dimethyl-3-((diethylmethoxysilyl)methyl)pentane-1,3-diamine,
N1,N5-diethyl-3-(2-(ethyl(methyl)amino)ethyl)-N1,N5-dimethyl-3-((ethylmethylmethoxysilyl)methyl)pentane-1,3-diamine,
N1,N5-diethyl-3-(2-(ethyl(methyl)amino)ethyl)-N1,N5-dimethyl-3-((triethoxysilyl)methyl)pentane-1,3-diamine,
N1,N5-diethyl-3-(2-(ethyl(methyl)amino)ethyl)-N1,N5-dimethyl-3-((methyldiethoxysilyl)methyl)pentane-1,3-diamine,
N1,N5-diethyl-3-(2-(ethyl(methyl)amino)ethyl)-N1,N5-dimethyl-3-((ethyldiethoxysilyl)methyl)pentane-1,3-diamine,
N1,N5-diethyl-3-(2-(ethyl(methyl)amino)ethyl)-N1,N5-dimethyl-3-((dimethylethoxysilyl)methyl)pentane-1,3-diamine,
N1,N5-diethyl-3-(2-(ethyl(methyl)amino)ethyl)-N1,N5-dimethyl-3-((diethylethoxysilyl)methyl)pentane-1,3-diamine,
N1,N5-diethyl-3-(2-(ethyl(methyl)amino)ethyl)-N1,N5-dimethyl-3-((ethylmethylethoxysilyl)methyl)pentane-1,3-diamine,
N1,N5-dimethyl-3-(2-(methyl(propyl)amino)ethyl)-N1,N5-dipropyl-3-((trimethoxysilyl)methyl)pentane-1,3-diamine,
N1,N5-dimethyl-3-(2-(methyl(propyl)amino)ethyl)-N1,N5-dipropyl-3-((methyldimethoxysilyl)methyl)pentane-1,3-diamine,
N1,N5-dimethyl-3-(2-(methyl(propyl)amino)ethyl)-N1,N5-dipropyl-3-((ethyldimethoxysilyl)methyl)pentane-1,3-diamine,
N1,N5-dimethyl-3-(2-(methyl(propyl)amino)ethyl)-N1,N5-dipropyl-3-((dimethylmethoxysilyl)methyl)pentane-1,3-diamine,
N1,N5-dimethyl-3-(2-(methyl(propyl)amino)ethyl)-N1,N5-dipropyl-3-((diethylmethoxysilyl)methyl)pentane-1,3-diamine,
N1,N5-dimethyl-3-(2-(methyl(propyl)amino)ethyl)-N1,N5-dipropyl-3-((ethylmethylmethoxysilyl)methyl)pentane-1,3-diamine,
N1,N5-dimethyl-3-(2-(methyl(propyl)amino)ethyl)-N1,N5-dipropyl-3-((triethoxysilyl)methyl)pentane-1,3-diamine,
N1,N5-dimethyl-3-(2-(methyl(propyl)amino)ethyl)-N1,N5-dipropyl-3-((methyldiethoxysilyl)methyl)pentane-1,3-diamine,
N1,N5-dimethyl-3-(2-(methyl(propyl)amino)ethyl)-N1,N5-dipropyl-3-((ethyldiethoxysilyl)methyl)pentane-1,3-diamine,
N1,N5-dimethyl-3-(2-(methyl(propyl)amino)ethyl)-N1,N5-dipropyl-3-((dimethylethoxysilyl)methyl)pentane-1,3-diamine,
N1,N5-dimethyl-3-(2-(methyl(propyl)amino)ethyl)-N1,N5-dipropyl-3-((diethylethoxysilyl)methyl)pentane-1,3-diamine,
N1,N5-dimethyl-3-(2-(methyl(propyl)amino)ethyl)-N1,N5-dipropyl-3-((ethylmethylethoxysilyl)methyl)pentane-1,3-diamine,
N1,N5-diethyl-3-(2-(ethyl(propyl)amino)ethyl)-N1,N5-dipropyl-3-((trimethoxysilyl)methyl)pentane-1,3-diamine,
N1,N5-diethyl-3-(2-(ethyl(propyl)amino)ethyl)-N1,N5-dipropyl-3-((methyldimethoxysilyl)methyl)pentane-1,3-diamine,
N1,N5-diethyl-3-(2-(ethyl(propyl)amino)ethyl)-N1,N5-dipropyl-3-((ethyldimethoxysilyl)methyl)pentane-1,3-diamine,
N1,N5-diethyl-3-(2-(ethyl(propyl)amino)ethyl)-N1,N5-dipropyl-3-((dimethylmethoxysilyl)methyl)pentane-1,3-diamine,
N1,N5-diethyl-3-(2-(ethyl(propyl)amino)ethyl)-N1,N5-dipropyl-3-((diethylmethoxysilyl)methyl)pentane-1,3-diamine,
N1,N5-diethyl-3-(2-(ethyl(propyl)amino)ethyl)-N1,N5-dipropyl-3-((ethylmethylmethoxysilyl)methyl)pentane-1,3-diamine,
N1,N5-diethyl-3-(2-(ethyl(propyl)amino)ethyl)-N1,N5-dipropyl-3-((triethoxysilyl)methyl)pentane-1,3-diamine,
N1,N5-diethyl-3-(2-(ethyl(propyl)amino)ethyl)-N1,N5-dipropyl-3-((methyldiethoxysilyl)methyl)pentane-1,3-diamine,
N1,N5-diethyl-3-(2-(ethyl(propyl)amino)ethyl)-N1,N5-dipropyl-3-((ethyldiethoxysilyl)methyl)pentane-1,3-diamine,
N1,N5-diethyl-3-(2-(ethyl(propyl)amino)ethyl)-N1,N5-dipropyl-3-((dimethylethoxysilyl)methyl)pentane-1,3-diamine,
N1,N5-diethyl-3-(2-(ethyl(propyl)amino)ethyl)-N1,N5-dipropyl-3-((diethylethoxysilyl)methyl)pentane-1,3-diamine,
N1,N5-diethyl-3-(2-(ethyl(propyl)amino)ethyl)-N1,N5-dipropyl-3-((ethylmethylethoxysilyl)methyl)pentane-1,3-diamine,
3-(2-(dimethylamino)ethyl)-N1,N1,N5,N5-tetramethyl-3-(2-(trimethoxysilyl)ethyl)pentane-1,3-diamine,
3-(2-(dimethylamino)ethyl)-N1,N1,N5,N5-tetramethyl-3-(2-(methyldimethoxysilyl)ethyl)pentane-1,3-diamine,
3-(2-(dimethylamino)ethyl)-N1,N1,N5,N5-tetramethyl-3-(2-(ethyldimethoxysilyl)ethyl)pentane-1,3-diamine,
3-(2-(dimethylamino)ethyl)-N1,N1,N5,N5-tetramethyl-3-(2-(dimethylmethoxysilyl)ethyl)pentane-1,3-diamine,
3-(2-(dimethylamino)ethyl)-N1,N1,N5,N5-tetramethyl-3-(2-(diethylmethoxysilyl)ethyl)pentane-1,3-diamine,
3-(2-(dimethylamino)ethyl)-N1,N1,N5,N5-tetramethyl-3-(2-(ethylmethylmethoxysilyl)ethyl)pentane-1,3-diamine,
3-(2-(dimethylamino)ethyl)-N1,N1,N5,N5-tetramethyl-3-(2-(triethoxysilyl)ethyl)pentane-1,3-diamine,
3-(2-(dimethylamino)ethyl)-N1,N1,N5,N5-tetramethyl-3-(2-(methyldiethoxysilyl)ethyl)pentane-1,3-diamine,
3-(2-(dimethylamino)ethyl)-N1,N1,N5,N5-tetramethyl-3-(2-(ethyldiethoxysilyl)ethyl)pentane-1,3-diamine,
3-(2-(dimethylamino)ethyl)-N1,N1,N5,N5-tetramethyl-3-(2-(dimethylethoxysilyl)ethyl)pentane-1,3-diamine,
3-(2-(dimethylamino)ethyl)-N1,N1,N5,N5-tetramethyl-3-(2-(diethylethoxysilyl)ethyl)pentane-1,3-diamine,
3-(2-(dimethylamino)ethyl)-N1,N1,N5,N5-tetramethyl-3-(2-(ethylmethylethoxysilyl)ethyl)pentane-1,3-diamine,
3-(2-(diethylamino)ethyl)-N1,N1,N5,N5-tetraethyl-3-(2-(trimethoxysilyl)ethyl)pentane-1,3-diamine,
3-(2-(diethylamino)ethyl)-N1,N1,N5,N5-tetraethyl-3-(2-(methyldimethoxysilyl)ethyl)pentane-1,3-diamine,
3-(2-(diethylamino)ethyl)-N1,N1,N5,N5-tetraethyl-3-(2-(ethyldimethoxysilyl)ethyl)pentane-1,3-diamine,
3-(2-(diethylamino)ethyl)-N1,N1,N5,N5-tetraethyl-3-(2-(dimethylmethoxysilyl)ethyl)pentane-1,3-diamine,
3-(2-(diethylamino)ethyl)-N1,N1,N5,N5-tetraethyl-3-(2-(diethylmethoxysilyl)ethyl)pentane-1,3-diamine,
3-(2-(diethylamino)ethyl)-N1,N1,N5,N5-tetraethyl-3-(2-(ethylmethylmethoxysilyl)ethyl)pentane-1,3-diamine,
3-(2-(diethylamino)ethyl)-N1,N1,N5,N5-tetraethyl-3-(2-(triethoxysilyl)ethyl)pentane-1,3-diamine, 3-(2-(diethylamino)ethyl)-N1,N1,N5,N5-tetraethyl-3-(2-(methyldiethoxysilyl)ethyl)pentane-1,3-diamine,
3-(2-(diethylamino)ethyl)-N1,N1,N5,N5-tetraethyl-3-(2-(ethyldiethoxysilyl)ethyl)pentane-1,3-diamine,
3-(2-(diethylamino)ethyl)-N1,N1,N5,N5-tetraethyl-3-(2-(dimethylethoxysilyl)ethyl)pentane-1,3-diamine,
3-(2-(diethylamino)ethyl)-N1,N1,N5,N5-tetraethyl-3-(2-(diethylethoxysilyl)ethyl)pentane-1,3-diamine,
3-(2-(diethylamino)ethyl)-N1,N1,N5,N5-tetraethyl-3-(2-(ethylmethylethoxysilyl)ethyl)pentane-1,3-diamine,
3-(2-(dipropylamino)ethyl)-N1,N1,N5,N5-tetrapropyl-3-(2-(trimethoxysilyl)ethyl)pentane-1,3-diamine,
3-(2-(dipropylamino)ethyl)-N1,N1,N5,N5-tetrapropyl-3-(2-(methyldimethoxysilyl)ethyl)pentane-1,3-diamine,
3-(2-(dipropylamino)ethyl)-N1,N1,N5,N5-tetrapropyl-3-(2-(ethyldimethoxysilyl)ethyl)pentane-1,3-diamine,
3-(2-(dipropylamino)ethyl)-N1,N1,N5,N5-tetrapropyl-3-(2-(dimethylmethoxysilyl)ethyl)pentane-1,3-diamine,
3-(2-(dipropylamino)ethyl)-N1,N1,N5,N5-tetrapropyl-3-(2-(diethylmethoxysilyl)ethyl)pentane-1,3-diamine,
3-(2-(dipropylamino)ethyl)-N1,N1,N5,N5-tetrapropyl-3-(2-(ethylmethylmethoxysilyl)ethyl)pentane-1,3-diamine,
3-(2-(dipropylamino)ethyl)-N1,N1,N5,N5-tetrapropyl-3-(2-(triethoxysilyl)ethyl)pentane-1,3-diamine,
3-(2-(dipropylamino)ethyl)-N1,N1,N5,N5-tetrapropyl-3-(2-(methyldiethoxysilyl)ethyl)pentane-1,3-diamine,
3-(2-(dipropylamino)ethyl)-N1,N1,N5,N5-tetrapropyl-3-(2-(ethyldiethoxysilyl)ethyl)pentane-1,3-diamine,
3-(2-(dipropylamino)ethyl)-N1,N1,N5,N5-tetrapropyl-3-(2-(dimethylethoxysilyl)ethyl)pentane-1,3-diamine,
3-(2-(dipropylamino)ethyl)-N1,N1,N5,N5-tetrapropyl-3-(2-(diethylethoxysilyl)ethyl)pentane-1,3-diamine,
3-(2-(dipropylamino)ethyl)-N1,N1,N5,N5-tetrapropyl-3-(2-(ethylmethylethoxysilyl)ethyl)pentane-1,3-diamine,
N1,N5-diethyl-3-(2-(ethyl(methyl)amino)ethyl)-N1,N5-dimethyl-3-(2-(trimethoxysilyl)ethyl)pentane-1,3-diamine,
N1,N5-diethyl-3-(2-(ethyl(methyl)amino)ethyl)-N1,N5-dimethyl-3-(2-(methyldimethoxysilyl)ethyl)pentane-1,3-diamine,
N1,N5-diethyl-3-(2-(ethyl(methyl)amino)ethyl)-N1,N5-dimethyl-3-(2-(ethyldimethoxysilyl)ethyl)pentane-1,3-diamine,
N1,N5-diethyl-3-(2-(ethyl(methyl)amino)ethyl)-N1,N5-dimethyl-3-(2-(dimethylmethoxysilyl)ethyl)pentane-1,3-diamine,
N1,N5-diethyl-3-(2-(ethyl(methyl)amino)ethyl)-N1,N5-dimethyl-3-(2-(diethylmethoxysilyl)ethyl)pentane-1,3-diamine,
N1,N5-diethyl-3-(2-(ethyl(methyl)amino)ethyl)-N1,N5-dimethyl-3-(2-(ethylmethylmethoxysilyl)ethyl)pentane-1,3-diamine,
N1,N5-diethyl-3-(2-(ethyl(methyl)amino)ethyl)-N1,N5-dimethyl-3-(2-(triethoxysilyl)ethyl)pentane-1,3-diamine,
N1,N5-diethyl-3-(2-(ethyl(methyl)amino)ethyl)-N1,N5-dimethyl-3-(2-(methyldiethoxysilyl)ethyl)pentane-1,3-diamine,
N1,N5-diethyl-3-(2-(ethyl(methyl)amino)ethyl)-N1,N5-dimethyl-3-(2-(ethyldiethoxysilyl)ethyl)pentane-1,3-diamine,
N1,N5-diethyl-3-(2-(ethyl(methyl)amino)ethyl)-N1,N5-dimethyl-3-(2-(dimethylethoxysilyl)ethyl)pentane-1,3-diamine,
N1,N5-diethyl-3-(2-(ethyl(methyl)amino)ethyl)-N1,N5-dimethyl-3-(2-(diethylethoxysilyl)ethyl)pentane-1,3-diamine,
N1,N5-diethyl-3-(2-(ethyl(methyl)amino)ethyl)-N1,N5-dimethyl-3-(2-(ethylmethylethoxysilyl)ethyl)pentane-1,3-diamine,
N1,N5-dimethyl-3-(2-(methyl(propyl)amino)ethyl)-N1,N5-dipropyl-3-(2-(trimethoxysilyl)ethyl)pentane-1,3-diamine,
N1,N5-dimethyl-3-(2-(methyl(propyl)amino)ethyl)-N1,N5-dipropyl-3-(2-(methyldimethoxysilyl)ethyl)pentane-1,3-diamine,
N1,N5-dimethyl-3-(2-(methyl(propyl)amino)ethyl)-N1,N5-dipropyl-3-(2-(ethyldimethoxysilyl)ethyl)pentane-1,3-diamine,
N1,N5-dimethyl-3-(2-(methyl(propyl)amino)ethyl)-N1,N5-dipropyl-3-(2-(dimethylmethoxysilyl)ethyl)pentane-1,3-diamine,
N1,N5-dimethyl-3-(2-(methyl(propyl)amino)ethyl)-N1,N5-dipropyl-3-(2-(diethylmethoxysilyl)ethyl)pentane-1,3-diamine,
N1,N5-dimethyl-3-(2-(methyl(propyl)amino)ethyl)-N1,N5-dipropyl-3-(2-(ethylmethylmethoxysilyl)ethyl)pentane-1,3-diamine,
N1,N5-dimethyl-3-(2-(methyl(propyl)amino)ethyl)-N1,N5-dipropyl-3-(2-(triethoxysilyl)ethyl)pentane-1,3-diamine,
N1,N5-dimethyl-3-(2-(methyl(propyl)amino)ethyl)-N1,N5-dipropyl-3-(2-(methyldiethoxysilyl)ethyl)pentane-1,3-diamine,
N1,N5-dimethyl-3-(2-(methyl(propyl)amino)ethyl)-N1,N5-dipropyl-3-(2-(ethyldiethoxysilyl)ethyl)pentane-1,3-diamine,
N1,N5-dimethyl-3-(2-(methyl(propyl)amino)ethyl)-N1,N5-dipropyl-3-(2-(dimethylethoxysilyl)ethyl)pentane-1,3-diamine,
N1,N5-dimethyl-3-(2-(methyl(propyl)amino)ethyl)-N1,N5-dipropyl-3-(2-(diethylethoxysilyl)ethyl)pentane-1,3-diamine,
N1,N5-dimethyl-3-(2-(methyl(propyl)amino)ethyl)-N1,N5-dipropyl-3-(2-(ethylmethylethoxysilyl)ethyl)pentane-1,3-diamine,
N1,N5-diethyl-3-(2-(ethyl(propyl)amino)ethyl)-N1,N5-dipropyl-3-(2-(trimethoxysilyl)ethyl)pentane-1,3-diamine,
N1,N5-diethyl-3-(2-(ethyl(propyl)amino)ethyl)-N1,N5-dipropyl-3-(2-(methyldimethoxysilyl)ethyl)pentane-1,3-diamine,
N1,N5-diethyl-3-(2-(ethyl(propyl)amino)ethyl)-N1,N5-dipropyl-3-(2-(ethyldimethoxysilyl)ethyl)pentane-1,3-diamine,
N1,N5-diethyl-3-(2-(ethyl(propyl)amino)ethyl)-N1,N5-dipropyl-3-(2-(dimethylmethoxysilyl)ethyl)pentane-1,3-diamine,
N1,N5-diethyl-3-(2-(ethyl(propyl)amino)ethyl)-N1,N5-dipropyl-3-(2-(diethylmethoxysilyl)ethyl)pentane-1,3-diamine,
N1,N5-diethyl-3-(2-(ethyl(propyl)amino)ethyl)-N1,N5-dipropyl-3-(2-(ethylmethylmethoxysilyl)ethyl)pentane-1,3-diamine,
N1,N5-diethyl-3-(2-(ethyl(propyl)amino)ethyl)-N1,N5-dipropyl-3-(2-(triethoxysilyl)ethyl)pentane-1,3-diamine,
N1,N5-diethyl-3-(2-(ethyl(propyl)amino)ethyl)-N1,N5-dipropyl-3-(2-(methyldiethoxysilyl)ethyl)pentane-1,3-diamine,
N1,N5-diethyl-3-(2-(ethyl(propyl)amino)ethyl)-N1,N5-dipropyl-3-(2-(ethyldiethoxysilyl)ethyl)pentane-1,3-diamine,
N1,N5-diethyl-3-(2-(ethyl(propyl)amino)ethyl)-N1,N5-dipropyl-3-(2-(dimethylethoxysilyl)ethyl)pentane-1,3-diamine, N1,N5-diethyl-3-(2-(ethyl(propyl)amino)ethyl)-N1,N5-dipropyl-3-(2-(diethylethoxysilyl)ethyl)pentane-1,3-diamine, N1,N5-diethyl-3-(2-(ethyl(propyl)amino)ethyl)-N1,N5-dipropyl-3-(2-(ethylmethylethoxysilyl)ethyl)pentane-1,3-diamine, 2-((dimethylamino)methyl)-N1,N1,N3,N3-tetramethyl-2-((trimethoxysilyl)methyl)propane-1,3-diamine, 2-((dimethylamino)methyl)-N1,N1,N3,N3-tetramethyl-2-((methyldimethoxysilyl)methyl)propane-1,3-diamine, 2-((dimethylamino)methyl)-N1,N1,N3,N3-tetramethyl-2-((ethyldimethoxysilyl)methyl)propane-1,3-diamine, 2-((dimethylamino)methyl)-N1,N1,N3,N3-tetramethyl-2-((dimethylmethoxysilyl)methyl)propane-1,3-diamine, 2-((dimethylamino)methyl)-N1,N1,N3,N3-tetramethyl-2-((diethylmethoxysilyl)methyl)propane-1,3-diamine, 2-((dimethylamino)methyl)-N1,N1,N3,N3-tetramethyl-2-((ethylmethylmethoxysilyl)methyl)propane-1,3-diamine, 2-((dimethylamino)methyl)-N1,N1,N3,N3-tetramethyl-2-((triethoxysilyl)methyl)propane-1,3-diamine, 2-((dimethylamino)methyl)-N1,N1,N3,N3-tetramethyl-2-((methyldiethoxysilyl)methyl)propane-1,3-diamine, 2-((dimethylamino)methyl)-N1,N1,N3,N3-tetramethyl-2-((ethyldiethoxysilyl)methyl)propane-1,3-diamine, 2-((dimethylamino)methyl)-N1,N1,N3,N3-tetramethyl-2-((dimethylethoxysilyl)methyl)propane-1,3-diamine, 2-((dimethylamino)methyl)-N1,N1,N3,N3-tetramethyl-2-((diethylethoxysilyl)methyl)propane-1,3-diamine, 2-((dimethylamino)methyl)-N1,N1,N3,N3-tetramethyl-2-((ethylmethylethoxysilyl)methyl)propane-1,3-diamine, 2-((diethylamino)methyl)-N1,N1,N3,N3-tetraethyl-2-((trimethoxysilyl)methyl)propane-1,3-diamine, 2-((diethylamino)methyl)-N1,N1,N3,N3-tetraethyl-2-((methyldimethoxysilyl)methyl)propane-1,3-diamine, 2-((diethylamino)methyl)-N1,N1,N3,N3-tetraethyl-2-((ethyldimethoxysilyl)methyl)propane-1,3-diamine, 2-((diethylamino)methyl)-N1,N1,N3,N3-tetraethyl-2-((dimethylmethoxysilyl)methyl)propane-1,3-diamine, 2-((diethylamino)methyl)-N1,N1,N3,N3-tetraethyl-2-((diethylmethoxysilyl)methyl)propane-1,3-diamine, 2-((diethylamino)methyl)-N1,N1,N3,N3-tetraethyl-2-((ethylmethylmethoxysilyl)methyl)propane-1,3-diamine, 2-((diethylamino)methyl)-N1,N1,N3,N3-tetraethyl-2-((triethoxysilyl)methyl)propane-1,3-diamine, 2-((diethylamino)methyl)-N1,N1,N3,N3-tetraethyl-2-((methyldiethoxysilyl)methyl)propane-1,3-diamine, 2-((diethylamino)methyl)-N1,N1,N3,N3-tetraethyl-2-((ethyldiethoxysilyl)methyl)propane-1,3-diamine, 2-((diethylamino)methyl)-N1,N1,N3,N3-tetraethyl-2-((dimethylethoxysilyl)methyl)propane-1,3-diamine, 2-((diethylamino)methyl)-N1,N1,N3,N3-tetraethyl-2-((diethylethoxysilyl)methyl)propane-1,3-diamine, 2-((diethylamino)methyl)-N1,N1,N3,N3-tetraethyl-2-((ethylmethylethoxysilyl)methyl)propane-1,3-diamine, 2-((dipropylamino)methyl)-N1,N1,N3,N3-tetrapropyl-2-((trimethoxysilyl)methyl)propane-1,3-diamine, 2-((dipropylamino)methyl)-N1,N1,N3,N3-tetrapropyl-2-((methyldimethoxysilyl)methyl)propane-1,3-diamine, 2-((dipropylamino)methyl)-N1,N1,N3,N3-tetrapropyl-2-((ethyldimethoxysilyl)methyl)propane-1,3-diamine, 2-((dipropylamino)methyl)-N1,N1,N3,N3-tetrapropyl-2-((dimethylmethoxysilyl)methyl)propane-1,3-diamine, 2-((dipropylamino)methyl)-N1,N1,N3,N3-tetrapropyl-2-((diethylmethoxysilyl)methyl)propane-1,3-diamine, 2-((dipropylamino)methyl)-N1,N1,N3,N3-tetrapropyl-2-((ethylmethylmethoxysilyl)methyl)propane-1,3-diamine, 2-((dipropylamino)methyl)-N1,N1,N3,N3-tetrapropyl-2-((triethoxysilyl)methyl)propane-1,3-diamine, 2-((dipropylamino)methyl)-N1,N1,N3,N3-tetrapropyl-2-((methyldiethoxysilyl)methyl)propane-1,3-diamine, 2-((dipropylamino)methyl)-N1,N1,N3,N3-tetrapropyl-2-((ethyldiethoxysilyl)methyl)propane-1,3-diamine, 2-((dipropylamino)methyl)-N1,N1,N3,N3-tetrapropyl-2-((dimethylethoxysilyl)methyl)propane-1,3-diamine, 2-((dipropylamino)methyl)-N1,N1,N3,N3-tetrapropyl-2-((diethylethoxysilyl)methyl)propane-1,3-diamine, 2-((dipropylamino)methyl)-N1,N1,N3,N3-tetrapropyl-2-((ethylmethylethoxysilyl)methyl)propane-1,3-diamine, N1,N3-diethyl-2-((ethyl(methyl)amino)methyl)-N1,N3-dimethyl-2-((trimethoxysilyl)methyl)propane-1,3-diamine, N1,N3-diethyl-2-((ethyl(methyl)amino)methyl)-N1,N3-dimethyl-2-((methyldimethoxysilyl)methyl)propane-1,3-diamine, N1,N3-diethyl-2-((ethyl(methyl)amino)methyl)-N1,N3-dimethyl-2-((ethyldimethoxysilyl)methyl)propane-1,3-diamine, N1,N3-diethyl-2-((ethyl(methyl)amino)methyl)-N1,N3-dimethyl-2-((dimethylmethoxysilyl)methyl)propane-1,3-diamine, N1,N3-diethyl-2-((ethyl(methyl)amino)methyl)-N1,N3-dimethyl-2-((diethylmethoxysilyl)methyl)propane-1,3-diamine, N1,N3-diethyl-2-((ethyl(methyl)amino)methyl)-N1,N3-dimethyl-2-((ethylmethylmethoxysilyl)methyl)propane-1,3-diamine, N1,N3-diethyl-2-((ethyl(methyl)amino)methyl)-N1,N3-dimethyl-2-((triethoxysilyl)methyl)propane-1,3-diamine, N1,N3-diethyl-2-((ethyl(methyl)amino)methyl)-N1,N3-dimethyl-2-((methyldiethoxysilyl)methyl)propane-1,3-diamine, N1,N3-diethyl-2-((ethyl(methyl)amino)methyl)-N1,N3-dimethyl-2-((ethyldiethoxysilyl)methyl)propane-1,3-diamine, N1,N3-diethyl-2-((ethyl(methyl)amino)methyl)-N1,N3-dimethyl-2-((dimethylethoxysilyl)methyl)propane-1,3-diamine, N1,N3-diethyl-2-((ethyl(methyl)amino)methyl)-N1,N3-dimethyl-2-((diethylethoxysilyl)methyl)propane-1,3-diamine, N1,N3-diethyl-2-((ethyl(methyl)amino)methyl)-N1,N3-dimethyl-2-((ethylmethylethoxysilyl)methyl)propane-1,3-diamine, N1,N3-dimethyl-2-((methyl(propyl)amino)methyl)-N1,N3-dipropyl-2-((trimethoxysilyl)methyl)propane-1,3-diamine, N1,N3-dimethyl-2-((methyl(propyl)amino)methyl)-N1,N3-dipropyl-2-((methyldimethoxysilyl)methyl)propane-1,3-diamine, N1,N3-dimethyl-2-((methyl(propyl)amino)methyl)-N1,N3-dipropyl-2-((ethyldimethoxysilyl)methyl)propane-1,3-diamine, N1,N3-dimethyl-2-((methyl(propyl)amino)methyl)-N1,N3-dipropyl-2-((dimethylmethoxysilyl)methyl)propane-1,3-diamine, N1,N3-dimethyl-2-((methyl(propyl)amino)methyl)-N1,N3-dipropyl-2-((diethylmethoxysilyl)methyl)propane-1,3-diamine, N1,N3-dimethyl-2-((methyl(propyl)amino)methyl)-N1,N3-dipropyl-2-((ethylmethylmethoxysilyl)methyl)propane-1,3-diamine, N1,N3-dimethyl-2-((methyl(propyl)amino)methyl)-N1,N3-dipropyl-2-((triethoxysilyl)methyl)propane-1,3-diamine, N1,N3-dimethyl-2-((methyl(propyl)amino)methyl)-N1,N3-dipropyl-2-((methyldiethoxysilyl)methyl)propane-1,3-diamine, N1,N3-dimethyl-2-((methyl(propyl)amino)methyl)-N1,N3-dipropyl-2-((ethyldiethoxysilyl)methyl)propane-1,3-diamine, N1,N3-dimethyl-2-((methyl(propyl)amino)methyl)-N1,N3-dipropyl-2-((dimethylethoxysilyl)methyl)propane-1,3-diamine, N1,N3-dimethyl-2-((methyl(propyl)amino)methyl)-N1,N3-dipropyl-2-((diethylethoxysilyl)methyl)propane-1,3-diamine, N1,N3-dimethyl-2-((methyl(propyl)amino)methyl)-N1,N3-dipropyl-2-((ethylmethylethoxysilyl)methyl)propane-1,3-diamine, N1,N3-diethyl-2-((ethyl(propyl)amino)methyl)-N1,N3-dipropyl-2-((trimethoxysilyl)methyl)propane-1,3-diamine, N1,N3-diethyl-2-((ethyl(propyl)amino)methyl)-N1,N3-dipropyl-2-((methyldimethoxysilyl)methyl)propane-1,3-diamine, N1,N3-diethyl-2-((ethyl(propyl)amino)methyl)-N1,N3-dipropyl-2-((ethyldimethoxysilyl)methyl)propane-1,3-diamine, N1,N3-diethyl-2-((ethyl(propyl)amino)methyl)-N1,N3-dipropyl-2-((dimethylmethoxysilyl)methyl)propane-1,3-diamine, N1,N3-diethyl-2-((ethyl(propyl)amino)methyl)-N1,N3-dipropyl-2-((diethylmethoxysilyl)methyl)propane-1,3-diamine, N1,N3-diethyl-2-((ethyl(propyl)amino)methyl)-N1,N3-dipropyl-2-((ethylmethylmethoxysilyl)methyl)propane-1,3-diamine, N1,N3-diethyl-2-((ethyl(propyl)amino)methyl)-N1,N3-dipropyl-2-((triethoxysilyl)methyl)propane-1,3-diamine, N1,N3-diethyl-2-((ethyl(propyl)amino)methyl)-N1,N3-dipropyl-2-((methyldiethoxysilyl)methyl)propane-1,3-diamine, N1,N3-diethyl-2-((ethyl(propyl)amino)methyl)-N1,N3-dipropyl-2-((ethyldiethoxysilyl)methyl)propane-1,3-diamine, N1,N3-diethyl-2-((ethyl(propyl)amino)methyl)-N1,N3-dipropyl-2-((dimethylethoxysilyl)methyl)propane-1,3-diamine, N1,N3-diethyl-2-((ethyl(propyl)amino)methyl)-N1,N3-dipropyl-2-((diethylethoxysilyl)methyl)propane-1,3-diamine, N1,N3-diethyl-2-((ethyl(propyl)amino)methyl)-N1,N3-dipropyl-2-((ethylmethylethoxysilyl)methyl)propane-1,3-diamine, 2-((dimethylamino)methyl)-N1,N1,N3,N3-tetramethyl-2-(2-(trimethoxysilyl)ethyl)propane-1,3-diamine, 2-((dimethylamino)methyl)-N1,N1,N3,N3-tetramethyl-2-(2-(methyldimethoxysilyl)ethyl)propane-1,3-diamine, 2-((dimethylamino)methyl)-N1,N1,N3,N3-tetramethyl-2-(2-(ethyldimethoxysilyl)ethyl)propane-1,3-diamine, 2-((dimethylamino)methyl)-N1,N1,N3,N3-tetramethyl-2-(2-(dimethylmethoxysilyl)ethyl)propane-1,3-diamine, 2-((dimethylamino)methyl)-N1,N1,N3,N3-tetramethyl-2-(2-(diethylmethoxysilyl)ethyl)propane-1,3-diamine, 2-((dimethylamino)methyl)-N1,N1,N3,N3-tetramethyl-2-(2-(ethylmethylmethoxysilyl)ethyl)propane-1,3-diamine, 2-((dimethylamino)methyl)-N1,N1,N3,N3-tetramethyl-2-(2-(triethoxysilyl)ethyl)propane-1,3-diamine, 2-((dimethylamino)methyl)-N1,N1,N3,N3-tetramethyl-2-(2-(methyldiethoxysilyl)ethyl)propane-1,3-diamine, 2-((dimethylamino)methyl)-N1,N1,N3,N3-tetramethyl-2-(2-(ethyldiethoxysilyl)ethyl)propane-1,3-diamine, 2-((dimethylamino)methyl)-N1,N1,N3,N3-tetramethyl-2-(2-(dimethylethoxysilyl)ethyl)propane-1,3-diamine, 2-((dimethylamino)methyl)-N1,N1,N3,N3-tetramethyl-2-(2-(diethylethoxysilyl)ethyl)propane-1,3-diamine, 2-((dimethylamino)methyl)-N1,N1,N3,N3-tetramethyl-2-(2-(ethylmethylethoxysilyl)ethyl)propane-1,3-diamine, 2-((diethylamino)methyl)-N1,N1,N3,N3-tetraethyl-2-(2-(trimethoxysilyl)ethyl)propane-1,3-diamine, 2-((diethylamino)methyl)-N1,N1,N3,N3-tetraethyl-2-(2-(methyldimethoxysilyl)ethyl)propane-1,3-diamine, 2-((diethylamino)methyl)-N1,N1,N3,N3-tetraethyl-2-(2-(ethyldimethoxysilyl)ethyl)propane-1,3-diamine, 2-((diethylamino)methyl)-N1,N1,N3,N3-tetraethyl-2-(2-(dimethylmethoxysilyl)ethyl)propane-1,3-diamine, 2-((diethylamino)methyl)-N1,N1,N3,N3-tetraethyl-2-(2-(diethylmethoxysilyl)ethyl)propane-1,3-diamine, 2-((diethylamino)methyl)-N1,N1,N3,N3-tetraethyl-2-(2-(ethylmethylmethoxysilyl)ethyl)propane-1,3-diamine, 2-((diethylamino)methyl)-N1,N1,N3,N3-tetraethyl-2-(2-(triethoxysilyl)ethyl)propane-1,3-diamine, 2-((diethylamino)methyl)-N1,N1,N3,N3-tetraethyl-2-(2-(methyldiethoxysilyl)ethyl)propane-1,3-diamine, 2-((diethylamino)methyl)-N1,N1,N3,N3-tetraethyl-2-(2-(ethyldiethoxysilyl)ethyl)propane-1,3-diamine, 2-((diethylamino)methyl)-N1,N1,N3,N3-tetraethyl-2-(2-(dimethylethoxysilyl)ethyl)propane-1,3-diamine, 2-((diethylamino)methyl)-N1,N1,N3,N3-tetraethyl-2-(2-(diethylethoxysilyl)ethyl)propane-1,3-diamine, 2-((diethylamino)methyl)-N1,N1,N3,N3-tetraethyl-2-(2-(ethylmethylethoxysilyl)ethyl)propane-1,3-diamine, 2-((dipropylamino)methyl)-N1,N1,N3,N3-tetrapropyl-2-(2-(trimethoxysilyl)ethyl)propane-1,3-diamine, 2-((dipropylamino)methyl)-N1,N1,N3,N3-tetrapropyl-2-(2-(methyldimethoxysilyl)ethyl)propane-1,3-diamine, 2-((dipropylamino)methyl)-N1,N1,N3,N3-tetrapropyl-2-(2-(ethyldimethoxysilyl)ethyl)propane-1,3-diamine, 2-((dipropylamino)methyl)-N1,N1,N3,N3-tetrapropyl-2-(2-(dimethylmethoxysilyl)ethyl)propane-1,3-diamine, 2-((dipropylamino)methyl)-N1,N1,N3,N3-tetrapropyl-2-(2-(diethylmethoxysilyl)ethyl)propane-1,3-diamine, 2-((dipropylamino)methyl)-N1,N1,N3,N3-tetrapropyl-2-(2-(ethylmethylmethoxysilyl)ethyl)propane-1,3-diamine, 2-((dipropylamino)methyl)-N1,N1,N3,N3-tetrapropyl-2-(2-(triethoxysilyl)ethyl)propane-1,3-diamine, 2-((dipropylamino)methyl)-N1,N1,N3,N3-tetrapropyl-2-(2-(methyldiethoxysilyl)ethyl)propane-1,3-diamine, 2-((dipropylamino)methyl)-N1,N1,N3,N3-tetrapropyl-2-(2-(ethyldiethoxysilyl)ethyl)propane-1,3-diamine, 2-((dipropylamino)methyl)-N1,N1,N3,N3-tetrapropyl-2-(2-(dimethylethoxysilyl)ethyl)propane-1,3-diamine, 2-((dipropylamino)methyl)-N1,N1,N3,N3-tetrapropyl-2-(2-(diethylethoxysilyl)ethyl)propane-1,3-diamine, 2-((dipropylamino)methyl)-N1,N1,N3,N3-tetrapropyl-2-(2-(ethylmethylethoxysilyl)ethyl)propane-1,3-diamine, N1,N3-diethyl-2-(2-(ethyl(methyl)amino)methyl)-N1,N3-dimethyl-2-(2-(trimethoxysilyl)ethyl)propane-1,3-diamine, N1,N3-diethyl-2-(2-(ethyl(methyl)amino)methyl)-N1,N3-dimethyl-2-(2-(methyldimethoxysilyl)ethyl)propane-1,3-diamine, N1,N3-diethyl-2-(2-(ethyl(methyl)amino)methyl)-N1,N3-dimethyl-2-(2-(ethyldimethoxysilyl)ethyl)propane-1,3-diamine, N1,N3-diethyl-2-(2-(ethyl(methyl)amino)methyl)-N1,N3-dimethyl-2-(2-(dimethylmethoxysilyl)ethyl)propane-1,3-diamine, N1,N3-diethyl-2-(2-(ethyl(methyl)amino)methyl)-N1,N3-dimethyl-2-(2-(diethylmethoxysilyl)ethyl)propane-1,3-diamine, N1,N3-diethyl-2-(2-(ethyl(methyl)amino)methyl)-N1,N3-dimethyl-2-(2-(ethylmethylmethoxysilyl)ethyl)propane-1,3-diamine, N1,N3-diethyl-2-(2-(ethyl(methyl)amino)methyl)-N1,N3-dimethyl-2-(2-(triethoxysilyl)ethyl)propane-1,3-diamine, N1,N3-diethyl-2-(2-(ethyl(methyl)amino)methyl)-N1,N3-dimethyl-2-(2-(methyldiethoxysilyl)ethyl)propane-1,3-diamine, N1,N3-diethyl-2-(2-(ethyl(methyl)amino)methyl)-N1,N3-dimethyl-2-(2-(ethyldiethoxysilyl)ethyl)propane-1,3-diamine, N1,N3-diethyl-2-(2-(ethyl(methyl)amino)methyl)-N1,N3-dimethyl-2-(2-(dimethylethoxysilyl)ethyl)propane-1,3-diamine, N1,N3-diethyl-2-(2-(ethyl(methyl)amino)methyl)-N1,N3-dimethyl-2-(2-(diethylethoxysilyl)ethyl)propane-1,3-diamine, N1,N3-diethyl-2-(2-(ethyl(methyl)amino)methyl)-N1,N3-dimethyl-2-(2-(ethylmethylethoxysilyl)ethyl)propane-1,3-diamine, N1,N3-dimethyl-2-(2-(methyl(propyl)amino)methyl)-N1,N3-dipropyl-2-(2-(trimethoxysilyl)ethyl)propane-1,3-diamine, N1,N3-dimethyl-2-(2-(methyl(propyl)amino)methyl)-N1,N3-dipropyl-2-(2-(methyldimethoxysilyl)ethyl)propane-1,3-diamine, N1,N3-dimethyl-2-(2-(methyl(propyl)amino)methyl)-N1,N3-dipropyl-2-(2-(ethyldimethoxysilyl)ethyl)propane-1,3-diamine, N1,N3-dimethyl-2-(2-(methyl(propyl)amino)methyl)-N1,N3-dipropyl-2-(2-(dimethylmethoxysilyl)ethyl)propane-1,3-diamine, N1,N3-dimethyl-2-(2-(methyl(propyl)amino)methyl)-N1,N3-dipropyl-2-(2-(diethylmethoxysilyl)ethyl)propane-1,3-diamine, N1,N3-dimethyl-2-(2-(methyl(propyl)amino)methyl)-N1,N3-dipropyl-2-(2-(ethylmethylmethoxysilyl)ethyl)propane-1,3-diamine, N1,N3-dimethyl-2-(2-(methyl(propyl)amino)methyl)-N1,N3-dipropyl-2-(2-(triethoxysilyl)ethyl)propane-1,3-diamine, N1,N3-dimethyl-2-(2-(methyl(propyl)amino)methyl)-N1,N3-dipropyl-2-(2-(methyldiethoxysilyl)ethyl)propane-1,3-diamine, N1,N3-dimethyl-2-(2-(methyl(propyl)amino)methyl)-N1,N3-dipropyl-2-(2-(ethyldiethoxysilyl)ethyl)propane-1,3-diamine, N1,N3-dimethyl-2-(2-(methyl(propyl)amino)methyl)-N1,N3-dipropyl-2-(2-(dimethylethoxysilyl)ethyl)propane-1,3-diamine, N1,N3-dimethyl-2-(2-(methyl(propyl)amino)methyl)-N1,N3-dipropyl-2-(2-(diethylethoxysilyl)ethyl)propane-1,3-diamine, N1,N3-dimethyl-2-(2-(methyl(propyl)amino)methyl)-N1,N3-dipropyl-2-(2-(ethylmethylethoxysilyl)ethyl)propane-1,3-diamine, N1,N3-diethyl-2-(2-(ethyl(propyl)amino)methyl)-N1,N3-dipropyl-2-(2-(trimethoxysilyl)ethyl)propane-1,3-diamine, N1,N3-diethyl-2-(2-(ethyl(propyl)amino)methyl)-N1,N3-dipropyl-2-(2-(methyldimethoxysilyl)ethyl)propane-1,3-diamine, N1,N3-diethyl-2-(2-(ethyl(propyl)amino)methyl)-N1,N3-dipropyl-2-(2-(ethyldimethoxysilyl)ethyl)propane-1,3-diamine, N1,N3-diethyl-2-(2-(ethyl(propyl)amino)methyl)-N1,N3-dipropyl-2-(2-(dimethylmethoxysilyl)ethyl)propane-1,3-diamine, N1,N3-diethyl-2-(2-(ethyl(propyl)amino)methyl)-N1,N3-dipropyl-2-(2-(diethylmethoxysilyl)ethyl)propane-1,3-diamine, N1,N3-diethyl-2-(2-(ethyl(propyl)amino)methyl)-N1,N3-dipropyl-2-(2-(ethylmethylmethoxysilyl)ethyl)propane-1,3-diamine, N1,N3-diethyl-2-(2-(ethyl(propyl)amino)methyl)-N1,N3-dipropyl-2-(2-(triethoxysilyl)ethyl)propane-1,3-diamine, N1,N3-diethyl-2-(2-(ethyl(propyl)amino)methyl)-N1,N3-dipropyl-2-(2-(methyldiethoxysilyl)ethyl)propane-1,3-diamine, N1,N3-diethyl-2-(2-(ethyl(propyl)amino)methyl)-N1,N3-dipropyl-2-(2-(ethyldiethoxysilyl)ethyl)propane-1,3-diamine, N1,N3-diethyl-2-(2-(ethyl(propyl)amino)methyl)-N1,N3-dipropyl-2-(2-(dimethylethoxysilyl)ethyl)propane-1,3-diamine, N1,N3-diethyl-2-(2-(ethyl(propyl)amino)methyl)-N1,N3-dipropyl-2-(2-(diethylethoxysilyl)ethyl)propane-1,3-diamine, N1,N3-diethyl-2-(2-(ethyl(propyl)amino)methyl)-N1,N3-dipropyl-2-(2-(ethylmethylethoxysilyl)ethyl)propane-1,3-diamine.

The terminal modifier of Formula 1c is accounted for by the compound of Formula 1 in which X is N, and thus may, for example, named N1-(3-(dialkylamino)propyl)-N3,N3-dialkyl-NJ-(3-(trialkoxysilyl)propyl)propane-1,3-diamine. Concrete examples of the terminal modifier of Formula 1c include, but are not limited to:

N1-(3-(dimethylamino)propyl)-N3,N3-dimethyl-N1-(3-(trimethoxysilyl)propyl)propane-1,3-diamine, N1-(3-(dimethylamino)propyl)-N3,N3-dimethyl-N1-(3-(methyldimethoxysilyl)propyl)propane-1,3-diamine, N1-(3-(dimethylamino)propyl)-N3,N3-dimethyl-N1-(3-(ethyldimethoxysilyl)propyl)propane-1,3-diamine, N1-(3-(dimethylamino)propyl)-N3,N3-dimethyl-N1-(3-(dimethylmethoxysilyl)propyl)propane-1,3-diamine, N1-(3-(dimethylamino)propyl)-N3,N3-dimethyl-N1-(3-(diethylmethoxysilyl)propyl)propane-1,3-diamine, N1-(3-(dimethylamino)propyl)-N3,N3-dimethyl-N1-(3-(ethylmethylmethoxysilyl)propyl)propane-1,3-diamine, N1-(3-(dimethylamino)propyl)-N3,N3-dimethyl-N1-(3-(triethoxysilyl)propyl)propane-1,3-diamine, N1-(3-(dimethylamino)propyl)-N3,N3-dimethyl-N1-(3-(methyldiethoxysilyl)propyl)propane-1,3-diamine, N1-(3-(dimethylamino)propyl)-N3,N3-dimethyl-N1-(3-(ethyldiethoxysilyl)propyl)propane-1,3-diamine, N1-(3-(dimethylamino)propyl)-N3,N3-dimethyl-N1-(3-(dimethylethoxysilyl)propyl)propane-1,3-diamine, N1-(3-(dimethylamino)propyl)-N3,N3-dimethyl-N1-(3-(diethylethoxysilyl)propyl)propane-1,3-diamine, N1-(3-(dimethylamino)propyl)-N3,N3-dimethyl-N1-(3-(ethylmethylethoxysilyl)propyl)propane-1,3-diamine, N1-(3-(diethylamino)propyl)-N3,N3-diethyl-N1-(3-(trimethoxysilyl)propyl)propane-1,3-diamine, N1-(3-(diethylamino)propyl)-N3,N3-diethyl-N1-(3-(methyldimethoxysilyl)propyl)propane-1,3-diamine, N1-(3-(diethylamino)propyl)-N3,N3-diethyl-N1-(3-(ethyldimethoxysilyl)propyl)propane-1,3-diamine, N1-(3-(diethylamino)propyl)-N3,N3-diethyl-N1-(3-(dimethylmethoxysilyl)propyl)propane-1,3-diamine,
N1-(3-(diethylamino)propyl)-N3,N3-diethyl-N1-(3-(diethylmethoxysilyl)propyl)propane-1,3-diamine,
N1-(3-(diethylamino)propyl)-N3,N3-diethyl-N1-(3-(ethylmethylmethoxysilyl)propyl)propane-1,3-diamine,
N1-(3-(diethylamino)propyl)-N3,N3-diethyl-N1-(3-(triethoxysilyl)propyl)propane-1,3-diamine,
N1-(3-(diethylamino)propyl)-N3,N3-diethyl-N1-(3-(methyldiethoxysilyl)propyl)propane-1,3-diamine,
N1-(3-(diethylamino)propyl)-N3,N3-diethyl-N1-(3-(ethyldiethoxysilyl)propyl)propane-1,3-diamine,
N1-(3-(diethylamino)propyl)-N3,N3-diethyl-N1-(3-(dimethylethoxysilyl)propyl)propane-1,3-diamine,
N1-(3-(diethylamino)propyl)-N3,N3-diethyl-N1-(3-(diethylethoxysilyl)propyl)propane-1,3-diamine,
N1-(3-(diethylamino)propyl)-N3,N3-diethyl-N1-(3-(ethylmethylethoxysilyl)propyl)propane-1,3-diamine,
N1-(3-(dipropylamino)propyl)-N3,N3-dipropyl-N1-(3-(trimethoxy silyl)propyl)propane-1,3-diamine,
N1-(3-(dipropylamino)propyl)-N3,N3-dipropyl-N1-(3-(methyldimethoxysilyl)propyl)propane-1,3-diamine,
N1-(3-(dipropylamino)propyl)-N3,N3-dipropyl-N1-(3-(ethyldimethoxysilyl)propyl)propane-1,3-diamine,
N1-(3-(dipropylamino)propyl)-N3,N3-dipropyl-N1-(3-(dimethylmethoxysilyl)propyl)propane-1,3-diamine,
N1-(3-(dipropylamino)propyl)-N3,N3-dipropyl-N1-(3-(diethylmethoxysilyl)propyl)propane-1,3-diamine,
N1-(3-(dipropylamino)propyl)-N3,N3-dipropyl-N1-(3-(ethylmethylmethoxysilyl)propyl)propane-1,3-diamine,
N1-(3-(dipropylamino)propyl)-N3,N3-dipropyl-N1-(3-(triethoxysilyl)propyl)propane-1,3-diamine,
N1-(3-(dipropylamino)propyl)-N3,N3-dipropyl-N1-(3-(methyldiethoxysilyl)propyl)propane-1,3-diamine,
N1-(3-(dipropylamino)propyl)-N3,N3-dipropyl-N1-(3-(ethyldiethoxysilyl)propyl)propane-1,3-diamine,
N1-(3-(dipropylamino)propyl)-N3,N3-dipropyl-N1-(3-(dimethylethoxysilyl)propyl)propane-1,3-diamine,
N1-(3-(dipropylamino)propyl)-N3,N3-dipropyl-N1-(3-(diethylethoxysilyl)propyl)propane-1,3-diamine,
N1-(3-(dipropylamino)propyl)-N3,N3-dipropyl-N1-(3-(ethylmethylethoxysilyl)propyl)propane-1,3-diamine,
N1-ethyl-N3-(3-(ethylmethylamino)propyl)-N1-methyl-N3-(3-(trimethoxysilyl)propyl)propane-1,3-diamine,
N1-ethyl-N3-(3-(ethylmethylamino)propyl)-N1-methyl-N3-(3-(methyldimethoxysilyl)propyl)propane-1,3-diamine,
N1-ethyl-N3-(3-(ethylmethylamino)propyl)-N1-methyl-N3-(3-(ethyldimethoxysilyl)propyl)propane-1,3-diamine,
N1-ethyl-N3-(3-(ethylmethylamino)propyl)-N1-methyl-N3-(3-(dimethylmethoxysilyl)propyl)propane-1,3-diamine,
N1-ethyl-N3-(3-(ethylmethylamino)propyl)-N1-methyl-N3-(3-(diethylmethoxysilyl)propyl)propane-1,3-diamine,
N1-ethyl-N3-(3-(ethylmethylamino)propyl)-N1-methyl-N3-(3-(ethylmethylmethoxysilyl)propyl)propane-1,3-diamine,
N1-ethyl-N3-(3-(ethylmethylamino)propyl)-N1-methyl-N3-(3-(triethoxysilyl)propyl)propane-1,3-diamine,
N1-ethyl-N3-(3-(ethylmethylamino)propyl)-N1-methyl-N3-(3-(methyldiethoxysilyl)propyl)propane-1,3-diamine,
N1-ethyl-N3-(3-(ethylmethylamino)propyl)-N1-methyl-N3-(3-(ethyldiethoxysilyl)propyl)propane-1,3-diamine,
N1-ethyl-N3-(3-(ethylmethylamino)propyl)-N1-methyl-N3-(3-(dimethylethoxysilyl)propyl)propane-1,3-diamine,
N1-ethyl-N3-(3-(ethylmethylamino)propyl)-N1-methyl-N3-(3-(diethylethoxysilyl)propyl)propane-1,3-diamine,
N1-ethyl-N3-(3-(ethylmethylamino)propyl)-N1-methyl-N3-(3-(ethylmethylethoxysilyl)propyl)propane-1,3-diamine,
N1-methyl-N3-(3-(methylpropylamino)propyl)-N1-propyl-N3-(3-(trimethoxysilyl)propyl)propane-1,3-diamine,
N1-methyl-N3-(3-(methylpropylamino)propyl)-N1-propyl-N3-(3-(methyldimethoxysilyl)propyl)propane-1,3-diamine,
N1-methyl-N3-(3-(methylpropylamino)propyl)-N1-propyl-N3-(3-(ethyldimethoxysilyl)propyl)propane-1,3-diamine,
N1-methyl-N3-(3-(methylpropylamino)propyl)-N1-propyl-N3-(3-(dimethylmethoxysilyl)propyl)propane-1,3-diamine,
N1-methyl-N3-(3-(methylpropylamino)propyl)-N1-propyl-N3-(3-(diethylmethoxysilyl)propyl)propane-1,3-diamine,
N1-methyl-N3-(3-(methylpropylamino)propyl)-N1-propyl-N3-(3-(ethylmethylmethoxysilyl)propyl)propane-1,3-diamine,
N1-methyl-N3-(3-(methylpropylamino)propyl)-N1-propyl-N3-(3-(triethoxysilyl)propyl)propane-1,3-diamine,
N1-methyl-N3-(3-(methylpropylamino)propyl)-N1-propyl-N3-(3-(methyldiethoxysilyl)propyl)propane-1,3-diamine,
N1-methyl-N3-(3-(methylpropylamino)propyl)-N1-propyl-N3-(3-(ethyldiethoxysilyl)propyl)propane-1,3-diamine,
N1-methyl-N3-(3-(methylpropylamino)propyl)-N1-propyl-N3-(3-(dimethylethoxysilyl)propyl)propane-1,3-diamine,
N1-methyl-N3-(3-(methylpropylamino)propyl)-N1-propyl-N3-(3-(diethylethoxysilyl)propyl)propane-1,3-diamine,
N1-methyl-N3-(3-(methylpropylamino)propyl)-N1-propyl-N3-(3-(ethylmethylethoxysilyl)propyl)propane-1,3-diamine,
N1-ethyl-N3-(3-(ethylpropylamino)propyl)-N1-propyl-N3-(3-(trimethoxysilyl)propyl)propane-1,3-diamine,
N1-ethyl-N3-(3-(ethylpropylamino)propyl)-N1-propyl-N3-(3-(methyldimethoxysilyl)propyl)propane-1,3-diamine,
N1-ethyl-N3-(3-(ethylpropylamino)propyl)-N1-propyl-N3-(3-(ethyldimethoxysilyl)propyl)propane-1,3-diamine,
N1-ethyl-N3-(3-(ethylpropylamino)propyl)-N1-propyl-N3-(3-(dimethylmethoxysilyl)propyl)propane-1,3-diamine,
N1-ethyl-N3-(3-(ethylpropylamino)propyl)-N1-propyl-N3-(3-(diethylmethoxysilyl)propyl)propane-1,3-diamine,
N1-ethyl-N3-(3-(ethylpropylamino)propyl)-N1-propyl-N3-(3-(ethylmethylmethoxysilyl)propyl)propane-1,3-diamine,
N1-ethyl-N3-(3-(ethylpropylamino)propyl)-N1-propyl-N3-(3-(triethoxysilyl)propyl)propane-1,3-diamine,
N1-ethyl-N3-(3-(ethylpropylamino)propyl)-N1-propyl-N3-(3-(methyldiethoxysilyl)propyl)propane-1,3-diamine,
N1-ethyl-N3-(3-(ethylpropylamino)propyl)-N1-propyl-N3-(3-(ethyldiethoxysilyl)propyl)propane-1,3-diamine,
N1-ethyl-N3-(3-(ethylpropylamino)propyl)-N1-propyl-N3-(3-(dimethylethoxysilyl)propyl)propane-1,3-diamine,
N1-ethyl-N3-(3-(ethylpropylamino)propyl)-N1-propyl-N3-(3-(diethylethoxysilyl)propyl)propane-1,3-diamine,
N1-ethyl-N3-(3-(ethylpropylamino)propyl)-N1-propyl-N3-(3-(ethylmethylethoxysilyl)propyl)propane-1,3-diamine,
N1-(3-(dimethylamino)propyl)-N3,N3-dimethyl-N1-(2-(trimethoxysilyl)ethyl)propane-1,3-diamine,
N1-(3-(dimethylamino)propyl)-N3,N3-dimethyl-N1-(2-(methyldimethoxysilyl)ethyl)propane-1,3-diamine,
N1-(3-(dimethylamino)propyl)-N3,N3-dimethyl-N1-(2-(ethyldimethoxysilyl)ethyl)propane-1,3-diamine, N1-(3-(dimethylamino)propyl)-N3,N3-dimethyl-N1-(2-(dimethylmethoxysilyl)ethyl)propane-1,3-diamine,
N1-(3-(dimethylamino)propyl)-N3,N3-dimethyl-N1-(2-(diethylmethoxysilyl)ethyl)propane-1,3-diamine,
N1-(3-(dimethylamino)propyl)-N3,N3-dimethyl-N1-(2-(ethylmethylmethoxysilyl)ethyl)propane-1,3-diamine,
N1-(3-(dimethylamino)propyl)-N3,N3-dimethyl-N1-(2-(triethoxy silyl)ethyl)propane-1,3-diamine,
N1-(3-(dimethylamino)propyl)-N3,N3-dimethyl-N1-(2-(methyldiethoxysilyl)ethyl)propane-1,3-diamine,
N1-(3-(dimethylamino)propyl)-N3,N3-dimethyl-N1-(2-(ethyldiethoxysilyl)ethyl)propane-1,3-diamine,
N1-(3-(dimethylamino)propyl)-N3,N3-dimethyl-N1-(2-(dimethylethoxysilyl)ethyl)propane-1,3-diamine,
N1-(3-(dimethylamino)propyl)-N3,N3-dimethyl-N1-(2-(diethylethoxysilyl)ethyl)propane-1,3-diamine,
N1-(3-(dimethylamino)propyl)-N3,N3-dimethyl-N1-(2-(ethylmethylethoxysilyl)ethyl)propane-1,3-diamine,
N1-(3-(diethylamino)propyl)-N3,N3-diethyl-N1-(2-(trimethoxysilyl)ethyl)propane-1,3-diamine,
N1-(3-(diethylamino)propyl)-N3,N3-diethyl-N1-(2-(methyldimethoxysilyl)ethyl)propane-1,3-diamine,
N1-(3-(diethylamino)propyl)-N3,N3-diethyl-N1-(2-(ethyldimethoxysilyl)ethyl)propane-1,3-diamine,
N1-(3-(diethylamino)propyl)-N3,N3-diethyl-N1-(2-(dimethylmethoxysilyl)ethyl)propane-1,3-diamine,
N1-(3-(diethylamino)propyl)-N3,N3-diethyl-N1-(2-(diethylmethoxysilyl)ethyl)propane-1,3-diamine,
N1-(3-(diethylamino)propyl)-N3,N3-diethyl-N1-(2-(ethylmethylmethoxysilyl)ethyl)propane-1,3-diamine,
N1-(3-(diethylamino)propyl)-N3,N3-diethyl-N1-(2-(triethoxy silyl)ethyl)propane-1,3-diamine,
N1-(3-(diethylamino)propyl)-N3,N3-diethyl-N1-(2-(methyldiethoxysilyl)ethyl)propane-1,3-diamine,
N1-(3-(diethylamino)propyl)-N3,N3-diethyl-N1-(2-(ethyldiethoxysilyl)ethyl)propane-1,3-diamine,
N1-(3-(diethylamino)propyl)-N3,N3-diethyl-N1-(2-(dimethylethoxysilyl)ethyl)propane-1,3-diamine,
N1-(3-(diethylamino)propyl)-N3,N3-diethyl-N1-(2-(diethylethoxysilyl)ethyl)propane-1,3-diamine,
N1-(3-(diethylamino)propyl)-N3,N3-diethyl-N1-(2-(ethylmethylethoxysilyl)ethyl)propane-1,3-diamine,
N1-(3-(dipropylamino)propyl)-N3,N3-dipropyl-N1-(2-(trimethoxysilyl)ethyl)propane-1,3-diamine,
N1-(3-(dipropylamino)propyl)-N3,N3-dipropyl-N1-(2-(methyldimethoxysilyl)ethyl)propane-1,3-diamine,
N1-(3-(dipropylamino)propyl)-N3,N3-dipropyl-N1-(2-(ethyldimethoxysilyl)ethyl)propane-1,3-diamine,
N1-(3-(dipropylamino)propyl)-N3,N3-dipropyl-N1-(2-(dimethylmethoxysilyl)ethyl)propane-1,3-diamine,
N1-(3-(dipropylamino)propyl)-N3,N3-dipropyl-N1-(2-(diethylmethoxysilyl)ethyl)propane-1,3-diamine,
N1-(3-(dipropylamino)propyl)-N3,N3-dipropyl-N1-(2-(ethylmethylmethoxysilyl)ethyl)propane-1,3-diamine,
N1-(3-(dipropylamino)propyl)-N3,N3-dipropyl-N1-(2-(triethoxysilyl)ethyl)propane-1,3-diamine,
N1-(3-(dipropylamino)propyl)-N3,N3-dipropyl-N1-(2-(methyldiethoxysilyl)ethyl)propane-1,3-diamine,
N1-(3-(dipropylamino)propyl)-N3,N3-dipropyl-N1-(2-(ethyldiethoxysilyl)ethyl)propane-1,3-diamine,
N1-(3-(dipropylamino)propyl)-N3,N3-dipropyl-N1-(2-(dimethylethoxysilyl)ethyl)propane-1,3-diamine,
N1-(3-(dipropylamino)propyl)-N3,N3-dipropyl-N1-(2-(diethylethoxysilyl)ethyl)propane-1,3-diamine,
N1-(3-(dipropylamino)propyl)-N3,N3-dipropyl-N1-(2-(ethylmethylethoxysilyl)ethyl)propane-1,3-diamine,
N1-ethyl-N3-(3-(ethylmethylamino)propyl)-M-methyl-N3-(2-(trimethoxysilyl)ethyl)propane-1,3-diamine,
N1-ethyl-N3-(3-(ethylmethylamino)propyl)-M-methyl-N3-(2-(methyldimethoxysilyl)ethyl)propane-1,3-diamine,
N1-ethyl-N3-(3-(ethylmethylamino)propyl)-M-methyl-N3-(2-(ethyldimethoxysilyl)ethyl)propane-1,3-diamine,
N1-ethyl-N3-(3-(ethylmethylamino)propyl)-N1-methyl-N3-(2-(dimethylmethoxysilyl)ethyl)propane-1,3-diamine,
N1-ethyl-N3-(3-(ethylmethylamino)propyl)-N1-methyl-N3-(2-(diethylmethoxysilyl)ethyl)propane-1,3-diamine,
N1-ethyl-N3-(3-(ethylmethylamino)propyl)-N1-methyl-N3-(2-(ethylmethylmethoxysilyl)ethyl)propane-1,3-diamine,
N1-ethyl-N3-(3-(ethylmethylamino)propyl)-N1-methyl-N3-(2-(triethoxysilyl)ethyl)propane-1,3-diamine,
N1-ethyl-N3-(3-(ethylmethylamino)propyl)-N1-methyl-N3-(2-(methyldiethoxysilyl)ethyl)propane-1,3-diamine,
N1-ethyl-N3-(3-(ethylmethylamino)propyl)-N1-methyl-N3-(2-(ethyldiethoxysilyl)ethyl)propane-1,3-diamine,
N1-ethyl-N3-(3-(ethylmethylamino)propyl)-N1-methyl-N3-(2-(dimethylethoxysilyl)ethyl)propane-1,3-diamine,
N1-ethyl-N3-(3-(ethylmethylamino)propyl)-N1-methyl-N3-(2-(diethylethoxysilyl)ethyl)propane-1,3-diamine,
N1-ethyl-N3-(3-(ethylmethylamino)propyl)-N1-methyl-N3-(2-(ethylmethylethoxysilyl)ethyl)propane-1,3-diamine,
N1-methyl-N3-(3-(methylpropylamino)propyl)-N1-propyl-N3-(2-(trimethoxysilyl)ethyl)propane-1,3-diamine,
N1-methyl-N3-(3-(methylpropylamino)propyl)-N1-propyl-N3-(2-(methyldimethoxysilyl)ethyl)propane-1,3-diamine,
N1-methyl-N3-(3-(methylpropylamino)propyl)-N1-propyl-N3-(2-(ethyldimethoxysilyl)ethyl)propane-1,3-diamine,
N1-methyl-N3-(3-(methylpropylamino)propyl)-N1-propyl-N3-(2-(dimethylmethoxysilyl)ethyl)propane-1,3-diamine,
N1-methyl-N3-(3-(methylpropylamino)propyl)-N1-propyl-N3-(2-(diethylmethoxysilyl)ethyl)propane-1,3-diamine,
N1-methyl-N3-(3-(methylpropylamino)propyl)-N1-propyl-N3-(2-(ethylmethylmethoxysilyl)ethyl)propane-1,3-diamine,
N1-methyl-N3-(3-(methylpropylamino)propyl)-N1-propyl-N3-(2-(triethoxysilyl)ethyl)propane-1,3-diamine,
N1-methyl-N3-(3-(methylpropylamino)propyl)-N1-propyl-N3-(2-(methyldiethoxysilyl)ethyl)propane-1,3-diamine,
N1-methyl-N3-(3-(methylpropylamino)propyl)-N1-propyl-N3-(2-(ethyldiethoxysilyl)ethyl)propane-1,3-diamine,
N1-methyl-N3-(3-(methylpropylamino)propyl)-N1-propyl-N3-(2-(dimethylethoxysilyl)ethyl)propane-1,3-diamine,
N1-methyl-N3-(3-(methylpropylamino)propyl)-N1-propyl-N3-(2-(diethylethoxysilyl)ethyl)propane-1,3-diamine,
N1-methyl-N3-(3-(methylpropylamino)propyl)-N1-propyl-N3-(2-(ethylmethylethoxysilyl)ethyl)propane-1,3-diamine,
N1-ethyl-N3-(3-(ethylpropylamino)propyl)-N1-propyl-N3-(2-(trimethoxysilyl)ethyl)propane-1,3-diamine,
N1-ethyl-N3-(3-(ethylpropylamino)propyl)-N1-propyl-N3-(2-(methyldimethoxysilyl)ethyl)propane-1,3-diamine,
N1-ethyl-N3-(3-(ethylpropylamino)propyl)-N1-propyl-N3-(2-(ethyldimethoxysilyl)ethyl)propane-1,3-diamine,
N1-ethyl-N3-(3-(ethylpropylamino)propyl)-N1-propyl-N3-(2-(dimethylmethoxysilyl)ethyl)propane-1,3-diamine,
N1-ethyl-N3-(3-(ethylpropylamino)propyl)-N1-propyl-N3-(2-(diethylmethoxysilyl)ethyl)propane-1,3-diamine,
N1-ethyl-N3-(3-(ethylpropylamino)propyl)-N1-propyl-N3-(2-(ethylmethylmethoxysilyl)ethyl)propane-1,3-diamine, N1-ethyl-N3-(3-(ethylpropylamino)propyl)-N1-propyl-N3-(2-(triethoxysilyl)ethyl)propane-1,3-diamine,
N1-ethyl-N3-(3-(ethylpropylamino)propyl)-N1-propyl-N3-(2-(methyldiethoxysilyl)ethyl)propane-1,3-diamine,
N1-ethyl-N3-(3-(ethylpropylamino)propyl)-N1-propyl-N3-(2-(ethyldiethoxysilyl)ethyl)propane-1,3-diamine,
N1-ethyl-N3-(3-(ethylpropylamino)propyl)-N1-propyl-N3-(2-(dimethylethoxysilyl)ethyl)propane-1,3-diamine,
N1-ethyl-N3-(3-(ethylpropylamino)propyl)-N1-propyl-N3-(2-(diethylethoxysilyl)ethyl)propane-1,3-diamine,
N1-ethyl-N3-(3-(ethylpropylamino)propyl)-N1-propyl-N3-(2-(ethylmethylethoxysilyl)ethyl)propane-1,3-diamine,
N1-(3-(dimethylamino)propyl)-N3,N3-dimethyl-N1-((trimethoxysilyl)methyl)propane-1,3-diamine,
N1-(3-(dimethylamino)propyl)-N3,N3-dimethyl-N1-((methyldimethoxysilyl)methyl)propane-1,3-diamine,
N1-(3-(dimethylamino)propyl)-N3,N3-dimethyl-N1-((ethyldimethoxysilyl)methyl)propane-1,3-diamine,
N1-(3-(dimethylamino)propyl)-N3,N3-dimethyl-N1-((dimethylmethoxysilyl)methyl)propane-1,3-diamine,
N1-(3-(dimethylamino)propyl)-N3,N3-dimethyl-N1-((diethylmethoxysilyl)methyl)propane-1,3-diamine,
N1-(3-(dimethylamino)propyl)-N3,N3-dimethyl-N1-((ethylmethylmethoxysilyl)methyl)propane-1,3-diamine,
N1-(3-(dimethylamino)propyl)-N3,N3-dimethyl-N1-((triethoxysilyl)methyl)propane-1,3-diamine,
N1-(3-(dimethylamino)propyl)-N3,N3-dimethyl-N1-((methyldiethoxysilyl)methyl)propane-1,3-diamine,
N1-(3-(dimethylamino)propyl)-N3,N3-dimethyl-N1-((ethyldiethoxysilyl)methyl)propane-1,3-diamine,
N1-(3-(dimethylamino)propyl)-N3,N3-dimethyl-N1-((dimethylethoxysilyl)methyl)propane-1,3-diamine,
N1-(3-(dimethylamino)propyl)-N3,N3-dimethyl-N1-((diethylethoxysilyl)methyl)propane-1,3-diamine,
N1-(3-(dimethylamino)propyl)-N3,N3-dimethyl-N1-((ethylmethylethoxysilyl)methyl)propane-1,3-diamine,
N1-(3-(diethylamino)propyl)-N3,N3-diethyl-N1-((trimethoxysilyl)methyl)propane-1,3-diamine,
N1-(3-(diethylamino)propyl)-N3,N3-diethyl-N1-((methyldimethoxysilyl)methyl)propane-1,3-diamine,
N1-(3-(diethylamino)propyl)-N3,N3-diethyl-N1-((ethyldimethoxysilyl)methyl)propane-1,3-diamine,
N1-(3-(diethylamino)propyl)-N3,N3-diethyl-N1-((dimethylmethoxysilyl)methyl)propane-1,3-diamine,
N1-(3-(diethylamino)propyl)-N3,N3-diethyl-N1-((diethylmethoxysilyl)methyl)propane-1,3-diamine,
N1-(3-(diethylamino)propyl)-N3,N3-diethyl-N1-((ethylmethylmethoxysilyl)methyl)propane-1,3-diamine,
N1-(3-(diethylamino)propyl)-N3,N3-diethyl-N1-((triethoxysilyl)methyl)propane-1,3-diamine,
N1-(3-(diethylamino)propyl)-N3,N3-diethyl-N1-((methyldiethoxysilyl)methyl)propane-1,3-diamine,
N1-(3-(diethylamino)propyl)-N3,N3-diethyl-N1-((ethyldiethoxysilyl)methyl)propane-1,3-diamine,
N1-(3-(diethylamino)propyl)-N3,N3-diethyl-N1-((dimethylethoxysilyl)methyl)propane-1,3-diamine,
N1-(3-(diethylamino)propyl)-N3,N3-diethyl-N1-((diethylethoxysilyl)methyl)propane-1,3-diamine,
N1-(3-(diethylamino)propyl)-N3,N3-diethyl-N1-((ethylmethylethoxysilyl)methyl)propane-1,3-diamine,
N1-(3-(dipropylamino)propyl)-N3,N3-dipropyl-N1-((trimethoxysilyl)methyl)propane-1,3-diamine,
N1-(3-(dipropylamino)propyl)-N3,N3-dipropyl-N1-((methyldimethoxysilyl)methyl)propane-1,3-diamine,
N1-(3-(dipropylamino)propyl)-N3,N3-dipropyl-N1-((ethyldimethoxysilyl)methyl)propane-1,3-diamine,
N1-(3-(dipropylamino)propyl)-N3,N3-dipropyl-N1-((dimethylmethoxysilyl)methyl)propane-1,3-diamine,
N1-(3-(dipropylamino)propyl)-N3,N3-dipropyl-N1-((diethylmethoxysilyl)methyl)propane-1,3-diamine,
N1-(3-(dipropylamino)propyl)-N3,N3-dipropyl-N1-((ethylmethylmethoxysilyl)methyl)propane-1,3-diamine,
N1-(3-(dipropylamino)propyl)-N3,N3-dipropyl-N1-((triethoxysilyl)methyl)propane-1,3-diamine,
N1-(3-(dipropylamino)propyl)-N3,N3-dipropyl-N1-((methyldiethoxysilyl)methyl)propane-1,3-diamine,
N1-(3-(dipropylamino)propyl)-N3,N3-dipropyl-N1-((ethyldiethoxysilyl)methyl)propane-1,3-diamine,
N1-(3-(dipropylamino)propyl)-N3,N3-dipropyl-N1-((dimethylethoxysilyl)methyl)propane-1,3-diamine,
N1-(3-(dipropylamino)propyl)-N3,N3-dipropyl-N1-((diethylethoxysilyl)methyl)propane-1,3-diamine,
N1-(3-(dipropylamino)propyl)-N3,N3-dipropyl-N1-((ethylmethylethoxysilyl)methyl)propane-1,3-diamine,
N1-ethyl-N3-(3-(ethylmethylamino)propyl)-N1-methyl-N3-((trimethoxysilyl)methyl)propane-1,3-diamine,
N1-ethyl-N3-(3-(ethylmethylamino)propyl)-N1-methyl-N3-((methyldimethoxysilyl)methyl)propane-1,3-diamine,
N1-ethyl-N3-(3-(ethylmethylamino)propyl)-N1-methyl-N3-((ethyldimethoxysilyl)methyl)propane-1,3-diamine,
N1-ethyl-N3-(3-(ethylmethylamino)propyl)-N1-methyl-N3-((dimethylmethoxysilyl)methyl)propane-1,3-diamine,
N1-ethyl-N3-(3-(ethylmethylamino)propyl)-N1-methyl-N3-((diethylmethoxysilyl)methyl)propane-1,3-diamine,
N1-ethyl-N3-(3-(ethylmethylamino)propyl)-N1-methyl-N3-((ethylmethylmethoxysilyl)methyl)propane-1,3-diamine,
N1-ethyl-N3-(3-(ethylmethylamino)propyl)-N1-methyl-N3-((triethoxysilyl)methyl)propane-1,3-diamine,
N1-ethyl-N3-(3-(ethylmethylamino)propyl)-N1-methyl-N3-((methyldiethoxysilyl)methyl)propane-1,3-diamine,
N1-ethyl-N3-(3-(ethylmethylamino)propyl)-M-methyl-N3-((ethyldiethoxysilyl)methyl)propane-1,3-diamine,
N1-ethyl-N3-(3-(ethylmethylamino)propyl)-N1-methyl-N3-((dimethylethoxysilyl)methyl)propane-1,3-diamine,
N1-ethyl-N3-(3-(ethylmethylamino)propyl)-N1-methyl-N3-((diethylethoxysilyl)methyl)propane-1,3-diamine,
N1-ethyl-N3-(3-(ethylmethylamino)propyl)-N1-methyl-N3-((ethylmethylethoxysilyl)methyl)propane-1,3-diamine,
N1-methyl-N3-(3-(methylpropylamino)propyl)-N1-propyl-N3-((trimethoxysilyl)methyl)propane-1,3-diamine,
N1-methyl-N3-(3-(methylpropylamino)propyl)-N1-propyl-N3-((methyldimethoxysilyl)methyl)propane-1,3-diamine,
N1-methyl-N3-(3-(methylpropylamino)propyl)-N1-propyl-N3-((ethyldimethoxysilyl)methyl)propane-1,3-diamine,
N1-methyl-N3-(3-(methylpropylamino)propyl)-N1-propyl-N3-((dimethylmethoxysilyl)methyl)propane-1,3-diamine,
N1-methyl-N3-(3-(methylpropylamino)propyl)-N1-propyl-N3-((diethylmethoxysilyl)methyl)propane-1,3-diamine,
N1-methyl-N3-(3-(methylpropylamino)propyl)-N1-propyl-N3-((ethylmethylmethoxysilyl)methyl)propane-1,3-diamine,
N1-methyl-N3-(3-(methylpropylamino)propyl)-N1-propyl-N3-((triethoxysilyl)methyl)propane-1,3-diamine,
N1-methyl-N3-(3-(methylpropylamino)propyl)-N1-propyl-N3-((methyldiethoxysilyl)methyl)propane-1,3-diamine,
N1-methyl-N3-(3-(methylpropylamino)propyl)-N1-propyl-N3-((ethyldiethoxysilyl)methyl)propane-1,3-diamine,
N1-methyl-N3-(3-(methylpropylamino)propyl)-N1-propyl-N3-((dimethylethoxysilyl)methyl)propane-1,3-diamine, N1-methyl-N3-(3-(methylpropylamino)propyl)-N1-propyl-N3-((diethylethoxysilyl)methyl)propane-1,3-diamine,
N1-methyl-N3-(3-(methylpropylamino)propyl)-N1-propyl-N3-((ethylmethylethoxysilyl)methyl)propane-1,3-diamine,
N1-ethyl-N3-(3-(ethylpropylamino)propyl)-N1-propyl-N3-((trimethoxysilyl)methyl)propane-1,3-diamine,
N1-ethyl-N3-(3-(ethylpropylamino)propyl)-N1-propyl-N3-((methyldimethoxysilyl)methyl)propane-1,3-diamine,
N1-ethyl-N3-(3-(ethylpropylamino)propyl)-N1-propyl-N3-((ethyldimethoxysilyl)methyl)propane-1,3-diamine,
N1-ethyl-N3-(3-(ethylpropylamino)propyl)-N1-propyl-N3-((dimethylmethoxysilyl)methyl)propane-1,3-diamine,
N1-ethyl-N3-(3-(ethylpropylamino)propyl)-N1-propyl-N3-((diethylmethoxysilyl)methyl)propane-1,3-diamine,
N1-ethyl-N3-(3-(ethylpropylamino)propyl)-N1-propyl-N3-((ethylmethylmethoxysilyl)methyl)propane-1,3-diamine,
N1-ethyl-N3-(3-(ethylpropylamino)propyl)-N1-propyl-N3-((triethoxysilyl)methyl)propane-1,3-diamine,
N1-ethyl-N3-(3-(ethylpropylamino)propyl)-N1-propyl-N3-((methyldiethoxysilyl)methyl)propane-1,3-diamine,
N1-ethyl-N3-(3-(ethylpropylamino)propyl)-N1-propyl-N3-((ethyldiethoxysilyl)methyl)propane-1,3-diamine,
N1-ethyl-N3-(3-(ethylpropylamino)propyl)-N1-propyl-N3-((dimethylethoxysilyl)methyl)propane-1,3-diamine,
N1-ethyl-N3-(3-(ethylpropylamino)propyl)-N1-propyl-N3-((diethylethoxysilyl)methyl)propane-1,3-diamine,
N1-ethyl-N3-(3-(ethylpropylamino)propyl)-N1-propyl-N3-((ethylmethylethoxysilyl)methyl)propane-1,3-diamine.

Also, the present invention pertains to a conjugated diene polymer modified with the terminal modifier of Formula 1.

Since the molecular syntax of the terminal modifier of the present invention, as described above, guarantees excellent compatibility with the inorganic reinforcing agents carbon black and silica, the conjugated diene polymers with the terminal modifier is highly miscible with the reinforcing agents, bringing about an improvement in mechanical properties, dynamic properties, wear resistance and formulation processability, compared to conventional diene polymers.

The terminally modified, conjugated diene polymer according to the present invention may be represented by the following Formula 2:

[Formula 2]

$$A-O-\underset{(OR^2)_m}{\underset{|}{\overset{(R^3)_n}{\overset{|}{Si}}}}-R^8-X\begin{array}{c}R^9-N\diagdown_{R^5}^{R^4}\\ \diagdown_{R^{10}-N\diagdown_{R^7}^{R^6}}\end{array}$$

wherein A represents a conjugated diene polymer; $R^1$, $R^3$, $R^4$, $R^5$, $R^6$, $R^7$, $R^8$, $R^9$, $R^{10}$, m, and n are respectively as defined hereinbefore; and $R^2$ represents a monovalent saturated or unsaturated hydrocarbon chain of 1 to 20 carbon atoms or another conjugated diene polymer A.

The terminally modified, conjugated diene polymer of the present invention may be prepared as follows.

In the present invention, a solution polymerization process is adopted for preparing the polymer. In this regard, compounds with appropriate functional groups are polymerized into a conjugated diene polymer in the presence of an organolithium catalyst and a Lewis base in a hydrocarbon solvent according to a living anionic polymerization starting with the activation of a polymerization initiator, followed by modifying the living polymer with a terminal modifier into a desired terminally modified, conjugated diene polymer.

Briefly, conjugated diene monomers and/or aromatic vinyl monomers are subjected to living polymerization in the presence of an activated polymerization initiator in a solution of an organolithium catalyst alone or in combination with a secondary amine or amide compound in tetrahydrofuran or a similar polar solvent. Then, the living polymers thus obtained are coupled, that is, modified at the terminus with the terminal modifier of Formula 1 to give a desired terminally modified, conjugated diene polymer.

The conjugated diene polymer of the present invention may be either a homopolymer of conjugated diene monomers, or a copolymer of conjugated diene monomers and aromatic vinyl monomers. For use in the anionic polymerization of the present invention, the monomer may be an unsaturated hydrocarbon of 4 to 12 carbon atoms, with 4 to 8 unsaturated bonds present in one molecule. Representative among the conjugated diene monomers are butadiene, isoprene, 2,3-dimethyl-1,3-butadiene, 1,3-pentadiene and octadiene. As for the vinyl aromatic monomers, their examples include styrene, 2-methylstyrene, 3-methylstyrene, 4-methylstyrene, α-methylstyrene, 2,4-dimethylstyrene, 2,4-diisopropylstyrene, 4-tert-butylstyrene, divinylstyrene, tert-butoxystyrene, vinylbenzyldimethylamine, (4-vinlyvenzyl) dimethylaminoethyl ether(4-vinylbenzyl) dimethylaminoethyl ether, N,N-dimethylaminoethylstyrene, 2-tert-butylstyrene, 3-tert-butylstyrene, 4-tert-butylstyrene, vinylpyrridine and a combination thereof.

Acting as an initiator for living polymerization, a secondary amine or imine compound is used in combination with an organic alkaline metal in accordance with the present invention. The secondary amine or imine compound can be activated by reaction with an organic alkaline metal, predominantly with an organolithium, such as n-butyl lithium or s-butyl lithium, in a polar solvent such as tetrahydrofuran. Examples of the secondary amine compound useful in the present invention include dimethylamine, diethylamine, dipropylamine, di-n-butylamine, di-sec-butylamine, dipentylamine, dihexylamine, di-n-octylamine, di-(2-ethylhexyl) amine, dicyclohexylamine, N-methylbenzylamine, diallylamine, morpholine, piperazine, 2,6-dimethylmorpholine, 2,6-dimethylpiperazine, 1-ethylpiperazine, 2-ethylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azepine, hexamethyleneimine, heptamethyleneimine, 5-benzyloxyindone, 3-azaspiro[5.5] undecane, 3-azabicyclo[3.2.2]nonane, and carbazole.

Turning to the hydrocarbon solvent available for the living polymerization, n-hexane, n-heptane, iso-octane, cyclohexane, methylcyclopentane, benzene, and toluene may be mentioned. Preferably, n-hexane, n-heptane, and cyclohexane may be used individually or in combination. Monomers are preferably used in an amount of 5~40% by weight in the hydrocarbon solvent, and more preferably in an amount of 10~25% by weight. For example, when monomers are used in an amount less than 5% by weight, an excess of the solvent hinders the anionic polymerization. On the other hand, more than 40% by weight of the monomers causes problems with the control of solution viscosity and reaction heat.

The Lewis base that can be mentioned to control the microstructure of the polymer include tetrahydrofuran, N,N,N,N-tetra methylethylenediamine (TMEDA), di-n-propylether, di-isopropy ether, di-n-butyl ether, ethylbutyl ether, triethylene glycol, 1,2-dimethoxybenzene, trimethylamine, triethylamine, and tetrahydrofurylpropane, with preference for ditetrahydrofurylpropane, tetrahydrofuran, N,N,N,N-tetramethylethylenediamine, and ethyltetrahydroperfuryl ether.

Depending on the amount of the Lewis base added, a polymer with a desired random distribution of monomers and a desired vinyl group content can be produced. The living polymerization is typically carried out at approximately 10~100° C. and preferably at approximately 20~90° C., under a pressure of 0.5~10 kgf/cm².

Usually, the polymerization is carried out for a sufficient time to convert almost all of the monomers to a polymer, that is, to achieve a high conversion rate.

The terminal modification of the conjugated diene polymers is led to by a coupling reaction between the living polymer and the terminal modifier. After monitoring 90% or more conversion from monomer to polymer, the coupling reaction starts with the addition of an organosilane compound. A predetermined time later, the polymerization is terminated with a chain stopper.

The terminally modified conjugated diene polymer ranges in Mooney viscosity [ML(1+4)@100° C.] from 20 to 200, and preferably from 30 to 160, with a vinyl content of 10~90% by weight, and preferably 30~80% by weight.

With respect to the structure of the terminally modified conjugated diene polymer, it is analyzed with NMR spectra and IR spectra for the microstructure of the polymer, the composition ratio of conjugated diene monomers and aromatic vinyl monomers, and the random and block ratio of conjugated diene monomers and aromatic vinyl monomers, and terminal modification, with gel permeation chromatography (GPC) for coupling number (CN), coupling efficiency (CE), molecular weight (Mw), and molecular weight distribution (MWD), and with a Mooney viscometer for Mooney viscosity. A lab mixer of 500 cc was used for rubber formulation.

In accordance with another aspect thereof, the present invention envisages a polymer composition for tires, comprising the terminally modified, conjugated diene polymer and an inorganic reinforcing agent.

In the polymer, the inorganic reinforcing agent is used in an amount of 50 to 100 parts by weight based on 100 parts by weight of the terminally modified, conjugated diene polymer. So long as it is typically available for tires, any inorganic reinforcing agent, such as carbon black, silica, etc., may be used in the present invention.

Below, the present invention will be further explained with reference to the following Examples but are not limited thereto.

In the Examples, silica rubbers with a coupling rate of around 30% are described, but it is appreciated by a person having ordinary skill in the art that various modifications are possible within the scope of the present invention without departing from the spirit of the present invention.

An explanation is made of preparation methods, coupling rates, Mooney viscosities, and vinyl contents of SBR random copolymers in the Examples, which are set forth to illustrate, but are not to be construed to limit the present invention. Unless stated otherwise, all percentages (%) are based on weight.

EXAMPLES

Example 1

To a 5 L glass reactor were sequentially fed 84 g of styrene, 307 g of 1,3-butadiene, 2,200 g of cyclohexane, and 5 ml of tetrahydrofuran. Thereafter, the reactor was maintained at 35° C. while a stirrer was operated therein. At this temperature, the polymerization started with the addition of 2.4 mmol of n-butyl lithium, a polymerization initiator, and was progressed under an adiabatic condition. The degree of polymerization was determined by observing changes in reaction temperature. During the reaction, monomer ratios and conversion rates were monitored from the reaction mixtures which were frequently withdrawn in a small amount.

When the conversion rate of the monomers was observed to reach 99%, 9 g of 1,3-butadiene was additionally fed to the reactor to substitute the terminus of the polymer with butadiene. Subsequently, 2.7 mmol N1,N1,N7-4-tetramethyl-4-((trimethoxysilyl)methyl)heptane-1,7-diamine, a terminal modifier, was added to the reaction, and left for a predetermined time before the reaction was terminated with 4 g of the antioxidant butylated hydroxy toluene (BHT) (corresponding to 1 part by weight per 100 parts by weight of rubber). The reaction mixture was poured to steam-heated water, and stirred to remove the solvent, followed by roll drying to remove residual solvent and water. Terminal modification was monitored by NMR analysis in each polymerization step. Samples from the living polymers prepared from the conjugated diene monomers and/or the vinyl aromatic monomers, and the terminally modified conjugated diene polymers resulting from coupling the living polymers with the terminal modifier of Formula 1 were analyzed to determine functional groups at the terminus of the polymers. GPC was performed to measure molecular weights, coupling numbers, coupling rates, and molecular weight distribution, and the results are given in Table 1 below.

Example 2

A copolymer was prepared in the same manner as in Example 1, except for the terminal modifier. After the additional feeding of butadiene, the living polymers was modified with 2.7 mmol of 2-((hexyldimethoxysilyl)methyl)-N1,N1,N3,N3-2-pentamethylpropane-1,3-diamine, a terminal modifier, and the reaction was terminated with 4 g of the antioxidant butylated hydroxy toluene (BHT) (corresponding to 1 part by weight per 100 parts by weight of rubber). The reaction mixture was poured to steam-heated water and stirred to remove the solvent, followed by roll drying to eliminate residual solvent and water.

Example 3

A copolymer was prepared in the same manner as in Example 1, except for the terminal modifier. After the additional feeding of butadiene, the living polymers was modified with 2.7 mmol of N1-(3-(dimethylamino)propyl)-N3,N3-dimethyl-N1-(3-(trimethoxysilyl)propyl)propane-1,3-diamine, a terminal modifier, and the reaction was terminated with 4 g of the antioxidant butylated hydroxy toluene (BHT) (corresponding to 1 part by weight per 100 parts by weight of rubber). The reaction mixture was poured to steam-heated water and stirred to remove the solvent, followed by roll drying to eliminate residual solvent and water.

Example 4

A copolymer was prepared in the same manner as in Example 1, except for the terminal modifier. After the additional feeding of butadiene, the living polymers was modified with 2.7 mmol of 4-(3-(dimethylamino)propyl)-N1,N1,N7,N7-tetramethyl-4-((trimethoxysilyl)methyl)heptane-1,7-diamine, a terminal modifier, and the reaction was terminated with 4 g of the antioxidant butylated hydroxy toluene (BHT) (corresponding to 1 part by weight per 100 parts by weight of rubber). The reaction mixture was poured to steam-heated water and stirred to remove the solvent, followed by roll drying to eliminate residual solvent and water.

Comparative Example 1

A copolymer was prepared in the same manner as in Example 1, except for the terminal modifier. After the additional feeding of butadiene, the reaction was terminated with 4 g of the antioxidant butylated hydroxy toluene (BHT) (corresponding to 1 part by weight per 100 parts by weight of rubber) without any terminal modification. The reaction mixture was poured to steam-heated water and stirred to remove the solvent, followed by roll drying to eliminate residual solvent and water.

Comparative Example 2

A copolymer was prepared in the same manner as in Example 1, except for the terminal modifier. After the additional feeding of butadiene, the living polymers was modified with 2.7 mmol of N,N-climethylaminopropyltrimethoxysilane, a terminal modifier, and the reaction was terminated with 4 g of the antioxidant butylated hydroxy toluene (BHT) (corresponding to 1 part by weight per 100 parts by weight of rubber). The reaction mixture was poured to steam-heated water and stirred to remove the solvent, followed by roll drying to eliminate residual solvent and water.

TABLE 1

| Example No. | Terminal Modification Rate (%) | Weight Avg. Mol. Wt (Mw) | Mooney Visco. (ML1 + 4, 100° C.) | Styrene Content (%) | Vinyl Content in BD unit (%) |
|---|---|---|---|---|---|
| 1 | 38 | 217,000 | 63 | 28.7 | 58.7 |
| 2 | 39 | 220,000 | 62 | 29.1 | 58.9 |
| 3 | 39 | 219,000 | 63 | 28.8 | 58.5 |
| 4 | 37 | 221,000 | 64 | 29.0 | 58.8 |
| C. Ex. 1 | 0 | 215,000 | 60 | 27.9 | 58.0 |
| C. Ex. 2 | 31 | 216,000 | 61 | 28.3 | 58.4 |

Experimental Example

Polymers prepared in Examples 1 to 4 and Comparative Example 1 and 2 were compounded with silica, as shown in Table 2 below. In addition, the compounded formulations were measured for processability, physical properties and dynamic properties. The results are summarized in Table 3 below. Dynamic properties were determined by DMTA.

[Measurement of Physical Properties]

(1) Hardness: measured by a SHORE-A durometer.

(2) Tensile strength, 300% modulus, elongation of compounded rubber: measured by a UTM (universal test machine according to ASTM 3189 Method B.

(3) Dynamic value tan δ of vulcanized rubber: analyzed using DTMA 5 from Rheometic, at a frequency of 10 Hz in 0.2 strain, torsion mode.

TABLE 2

| Compounding | Content (parts by weight) |
|---|---|
| Solution SBR | 80 |
| High cis BR | 20 |
| Stearic acid | 2 |
| Zinc oxide | 3 |
| Silica | 80 |
| Aromatic oil | 10 |
| Si-69 | 6.4 |
| CZ | 1 |
| DPG | 1.5 |
| Sulfur | 1.5 |

Solution SBR: polymers prepared in Examples 1~4 and Comparative Examples 1 and 2

High cis BR: KBR01 from Keumho Petrochemical.

Si-69: bis-(triethoxysilylpropyl)tetrasulfide

CZ: N-cyclohexylbenzothiazyl sulfenamide

DPG: 1,3-diphenyl guanidine

TABLE 3

| Property | Ex. 1 | Ex. 2 | Ex. 3 | Ex. 4 | Comp. Ex. 1 | Comp. Ex. 2 |
|---|---|---|---|---|---|---|
| Compound Mooney Viscosity | 93 | 94 | 94 | 95 | 135 | 97 |
| Hardness | 73 | 73 | 73 | 73 | 61 | 74 |
| Tensile Strength | 191 | 193 | 192 | 192 | 121 | 173 |
| 300% Modulus | 171 | 170 | 171 | 174 | — | 163 |
| Elongation (%) | 317 | 315 | 316 | 317 | 260 | 302 |
| Compound Tg (° C.) | −8.7 | −8.5 | −9.0 | −8.8 | −6.2 | −8.3 |
| Tan δ (0° C.) | 0.6268 | 0.6197 | 0.6211 | 0.6190 | 0.4132 | 0.5172 |
| Tan δ (60° C.) | 0.0589 | 0.0592 | 0.0591 | 0.0590 | 0.1052 | 0.0697 |
| Bound rubber con. (wt %) | 83 | 82 | 81 | 82 | 17 | 69 |
| Cold Flow (mg/min) | 0.94 | 0.94 | 0.93 | 0.95 | 2.1 | 1.3 |

The terminally modified polymers according to the present invention (Examples 1~4) exhibited higher processability than did the polymer prepared without a terminal modifier (Comparative Example 1) or with a conventional terminal modifier (Comparative Example 2), as demonstrated by lower compound Mooney viscosities. With regard to wet traction (tan δ at 0° C.), an important factor accounting for environment-friendly tires, the polymers of Examples 1~4 were improved by 33.5% (compared to the polymer of Comparative Example 1) and 16.8% (compared to the polymer of Comparative Example 20, on average. Rolling resistance (tan δ at 60° C.) was also increased in the polymers of Examples 1~4 by 78.2% and 18.0%, compared to Comparative Examples 1 and 2, respectively. Further, great improvement was also brought about in bound rubber and cold flow for the polymers of Examples 1~4.

Consequently, the formulations comprising the terminally modified, conjugated diene polymers of the present invention are useful as tire materials.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A terminal modifier for a conjugated diene polymer, represented by the following Formula 1:

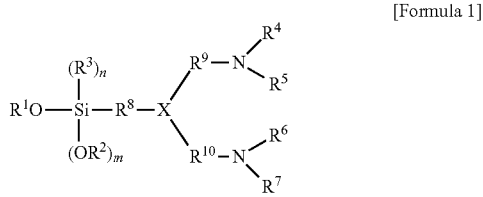

[Formula 1]

wherein

X represents nitrogen (N), Si—$R^{11}$, Si—$R^{12}$—N($R^{13}$)($R^{14}$), C—$R^{11}$, or C—$R^{12}$—N($R^{13}$)($R^{14}$);

$R^1$, $R^2$, and $R^3$, which may be the same or different, independently represent a monovalent, saturated or unsaturated hydrocarbon chain of 1 to 20 carbon atoms;

$R^4$, $R^5$, $R^6$, $R^7$, $R^{11}$, $R^{13}$ and $R^{14}$, which may be the same or different, independently represent a hydrogen atom, or a monovalent, saturated or unsaturated hydrocarbon chain of 1 to 20 carbon atoms;

$R^8$, $R^9$, $R^{10}$, and $R^{12}$, which may be the same or different, independently a bivalent saturated or unsaturated hydrocarbon chain of 1 to 20 carbon atoms; and m and n are respectively an integer of 0 to 2, satisfying the condition of m+n=2.

2. The terminal modifier of claim 1, represented by any one of the Formulas 1a, 1b and 1c:

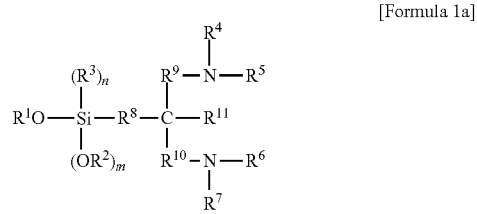

[Formula 1a]

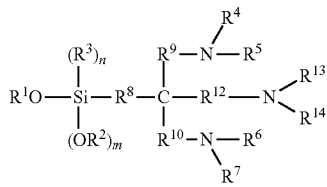

[Formula 1b]

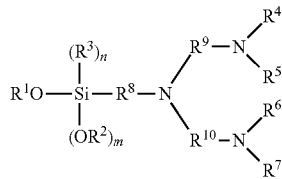

[Formula 1c]

(wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, m, and n are respectively the same as defined in claim 1).

3. The terminal modifier of claim 1, wherein $R^1$, $R^2$, and $R^3$, which may be the same or different, independently represents a monovalent saturated or unsaturated hydrocarbon chain of 1 to 8 carbon atoms;

$R^4$, $R^5$, $R^6$, $R^7$, $R^{11}$, $R^{13}$, and $R^{14}$, which may be the same or different, independently represent a monovalent saturated or unsaturated hydrocarbon chain of 1 to 8 carbon atoms; and $R^8$, $R^9$, $R^{10}$, and $R^{12}$, which may be the same or different, independently represent a bivalent saturated or unsaturated hydrocarbon chain of 1 to 8 carbon atoms.

4. The terminal modifier of claim 1, wherein $R^1$, $R^2$, and $R^3$, which may be the same or different, independently represent methyl, ethyl, normal propyl, isopropyl, normal butyl, isobutyl, tert-butyl, normal pentyl, normal hexyl, or normal heptyl;

$R^4$, $R^5$, $R^6$, $R^7$, $R^{11}$, $R^{13}$, and $R^{14}$, which may be the same or different, independently represent a hydrogen atom, methyl, ethyl, normal propyl, isopropyl, normal butyl, isobutyl, tert-butyl, normal pentyl, normal hexyl, or normal heptyl; and $R^8$, $R^9$, $R^{10}$, or $R^{12}$, which may be the same or different, independently represent methylene, ethylene, normal propylene, isopropylene, normal butylene, isobutylene, tert-butylene, normal pentylene, normal hexylene, or normal heptylene.

5. The terminal modifier of claim 1, wherein the conjugated diene polymer is either a homopolymer of conjugated diene monomers, or a copolymer of conjugated diene monomers and aromatic vinyl monomers.

6. The terminal modifier of claim 2, wherein the terminal modifier represented by Formula 1a is selected from the group consisting of:

N1,N1,N7,N7,4-pentamethyl-4-((trimethoxysilyl)methyl)heptane-1,7-diamine,
N1,N1,N7,N7,4-pentamethyl-4-((methyldimethoxysilyl)methyl)heptane-1,7-diamine,
N1,N1,N7,N7,4-pentamethyl-4-((ethyldimethoxysilyl)methyl)heptane-1,7-diamine,
N1,N1,N7,N7,4-pentamethyl-4-((dimethylmethoxysilyl)methyl)heptane-1,7-diamine,
N1,N1,N7,N7,4-pentamethyl-4-((diethylmethoxysilyl)methyl)heptane-1,7-diamine,
N1,N1,N7,N7,4-pentamethyl-4-((ethylmethylmethoxysilyl)methyl)heptane-1,7-diamine, N1,N1,N7,N7,4-pentamethyl-4-((triethoxysilyl)methyl) heptane-1,7-diamine,
N1,N1,N7,N7,4-pentamethyl-4-((methyldiethoxysilyl) methyl)heptane-1,7-diamine,
N1,N1,N7,N7,4-pentamethyl-4-((ethyldiethoxysilyl)methyl)heptane-1,7-diamine,
N1,N1,N7,N7,4-pentamethyl-4-((dimethylethoxysilyl) methyl)heptane-1,7-diamine,
N1,N1,N7,N7,4-pentamethyl-4-((diethylethoxysilyl)methyl)heptane-1,7-diamine,
N1,N1,N7,N7,4-pentamethyl-4-((ethylmethylethoxy)methyl)heptane-1,7-diamine,
4-ethyl-N1,N1,N7,N7-tetramethyl-4-((trimethoxysilyl) methyl) heptane-1,7-diamine,
4-ethyl-N1,N1,N7,N7-tetramethyl-4-((methyldimethoxysilyl)methyl)heptane-1,7-diamine,
4-ethyl-N1,N1,N7,N7-tetramethyl-4-((ethyldimethoxysilyl)methyl)heptane-1,7-diamine,
4-ethyl-N1,N1,N7,N7-tetramethyl-4-((dimethylmethoxysilyl)methyl)heptane-1,7-diamine,
4-ethyl-N1,N1,N7,N7-tetramethyl-4-((diethylmethoxysilyl)methyl)heptane-1,7-diamine,
4-ethyl-N1,N1,N7,N7-tetramethyl-4-((ethylmethylmethoxysilyl)methyl)heptane-1,7-diamine,
4-ethyl-N1,N1,N7,N7-tetramethyl-4-((triethoxysilyl)methyl)heptane-1,7-diamine,
4-ethyl-N1,N1,N7,N7-tetramethyl-4-((methyldiethoxysilyl)methyl)heptane-1,7-diamine,
4-ethyl-N1,N1,N7,N7-tetramethyl-4-((ethyldiethoxysilyl)methyl)heptane-1,7-diamine,
4-ethyl-N1,N1,N7,N7-tetramethyl-4-((dimethylethoxysilyl)methyl)heptane-1,7-diamine,
4-ethyl-N1,N1,N7,N7-tetramethyl-4-((diethylethoxysilyl)methyl)heptane-1,7-diamine,
4-ethyl-N1,N1,N7,N7-tetramethyl-4-((ethylmethylethoxy)methyl)heptane-1,7-diamine,
2-((hexyldimethoxysilyl)methyl)-N1,N1,N3,N3,2-pentamethylpropane-1,3-diamine,
2-((hexylmethylmethoxysilyl)methyl)-N1,N1,N3,N3,2-pentamethylpropane-1,3-diamine,
2-((hexylethylmethoxysilyl)methyl)-N1,N1,N3,N3,2-pentamethylpropane-1,3-diamine,
2-((hexyldiethoxysilyl)methyl)-N1,N1,N3,N3,2-pentamethylpropane-1,3-diamine,
2-((hexylmethylethoxysilyl)methyl)-N1,N1,N3,N3,2-pentamethylpropane-1,3-diamine,
2-((hexylethylethoxysilyl)methyl)-N1,N1,N3,N3,2-pentamethylpropane-1,3-diamine,
2-ethyl-2-((hexyldimethoxysilyl)methyl)-N1,N1,N3,N3-tetramethylpropane-1,3-diamine,
2-ethyl-2-((hexylmethylmethoxysilyl)methyl)-N1,N1,N3,N3-tetramethylpropane-1,3-diamine,
2-ethyl-2-((hexylethylmethoxysilyl)methyl)-N1,N1,N3,N3-tetramethylpropane-1,3-diamine,
2-ethyl-2-((hexyldiethoxysilyl)methyl)-N1,N1,N3,N3-tetramethylpropane-1,3-diamine,
2-ethyl-2-((hexylmethylethoxysilyl)methyl)-N1,N1,N3,N3-tetramethylpropane-1,3-diamine,
2-ethyl-2-((hexylethylethoxysilyl)methyl)-N1,N1,N3,N3-tetramethylpropane-1,3-diamine,
3-((hexyldimethoxysilyl)methyl)-N1,N1,N5,N5,3-pentamethylpentane-1,3-diamine,
3-((hexylmethylmethoxysilyl)methyl)-N1,N1,N5,N5,3-pentamethylpentane-1,3-diamine,
3-((hexylethylmethoxysilyl)methyl)-N1,N1,N5,N5,3-pentamethylpentane-1,3-diamine,
3-((hexyldiethoxysilyl)methyl)-N1,N1,N5,N5,3-pentamethylpentane-1,3-diamine,
3-((hexylmethylethoxysilyl)methyl)-N1,N1,N5,N5,3-pentamethylpentane-1,3-diamine,
3-((hexylethylethoxysilyl)methyl)-N1,N1,N5,N5,3-pentamethylpentane-1,3-diamine,
3-ethyl-3-((hexyldimethoxysilyl)methyl)-N1,N1,N5,N5-tetramethylpentane-1,3-diamine,
3-ethyl-3-((hexylmethylmethoxysilyl)methyl)-N1,N1,N5,N5-tetramethylpentane-1,3-diamine,
3-ethyl-3-((hexylethylmethoxysilyl)methyl)-N1,N1,N5,N5-tetramethylpentane-1,3-diamine,
3-ethyl-3-((hexyldiethoxysilyl)methyl)-N1,N1,N5,N5-tetramethylpentane-1,3-diamine,
3-ethyl-3-((hexylmethylethoxysilyl)methyl)-N1,N1,N5,N5-tetramethylpentane-1,3-diamine,
3-ethyl-3-((hexylethylethoxysilyl)methyl)-N1,N1,N5,N5-tetramethylpentane-1,3-diamine,
4-((hexyldimethoxysilyl)methyl)-N1,N1,N7,N7,4-pentamethylheptane-1,7-diamine,
4-((hexylmethylmethoxysilyl)methyl)-N1,N1,N7,N7,4-pentamethylheptane-1,7-diamine,
4-((hexylethylmethoxysilyl)methyl)-N1,N1,N7,N7,4-pentamethylheptane-1,7-diamine,
4-((hexyldiethoxysilyl)methyl)-N1,N1,N7,N7,4-pentamethylheptane-1,7-diamine,
4-((hexylmethylethoxysilyl)methyl)-N1,N1,N7,N7,4-pentamethylheptane-1,7-diamine,
4-((hexylethylethoxysilyl)methyl)-N1,N1,N7,N7,4-pentamethylheptane-1,7-diamine,
4-ethyl-4-((hexyldimethoxysilyl)methyl)-N1,N1,N7,N7-tetramethylheptane-1,7-diamine,
4-ethyl-4-((hexylmethylmethoxysilyl)methyl)-N1,N1,N7,N7-tetramethylheptane-1,7-diamine,
4-ethyl-4-((hexylethylmethoxysilyl)methyl)-N1,N1,N7,N7-tetramethylheptane-1,7-diamine,
4-ethyl-4-((hexyldiethoxysilyl)methyl)-N1,N1,N7,N7-tetramethylheptane-1,7-diamine,
4-ethyl-4-((hexylmethylethoxysilyl)methyl)-N1,N1,N7,N7-tetramethylheptane-1,7-diamine,
4-ethyl-4-((hexylethylethoxysilyl)methyl)-N1,N1,N7,N7-tetramethylheptane-1,7-diamine,
2-((dimethoxy(phenethyll)silyl)methyl)-N1,N1,N3,N3,2-pentamethylpropane-1,3-diamine,
2-((methylmethoxy(phenethyll)silyl)methyl)-N1,N1,N3,N3,2-pentamethylpropane-1,3-diamine,
2-((ethylmethoxy(phenethyll)silyl)methyl)-N1,N1,N3,N3,2-pentamethylpropane-1,3-diamine,
2-((diethoxy(phenethyll)silyl)methyl)-N1,N1,N3,N3,2-pentamethylpropane-1,3-diamine,
2-((methylethoxy(phenethyll)silyl)methyl)-N1,N1,N3,N3,2-pentamethylpropane-1,3-diamine,
2-((ethylethoxy(phenethyll)silyl)methyl)-N1,N1,N3,N3,2-pentamethylpropane-1,3-diamine,
2-ethyl-2-((dimethoxy(phenethyll)silyl)methyl)-N1,N1,N3,N3-tetramethylpropane-1,3-diamine,
2-ethyl-2-((methylmethoxy(phenethyll)silyl)methyl)-N1,N1,N3,N3-tetramethylpropane-1,3-diamine,
2-ethyl-2-((ethylmethoxy(phenethyll)silyl)methyl)-N1,N1,N3,N3-tetramethylpropane-1,3-diamine,
2-ethyl-2-((diethoxy(phenethyll)silyl)methyl)-N1,N1,N3,N3-tetramethylpropane-1,3-diamine,
2-ethyl-2-((methylethoxy(phenethyll)silyl)methyl)-N1,N1,N3,N3-tetramethylpropane-1,3-diamine,
2-ethyl-2-((ethylethoxy(phenethyll)silyl)methyl)-N1,N1,N3,N3-tetramethylpropane-1,3-diamine, 3-((dimethoxy(phenethyll)silyl)methyl)-N1,N1,N5,N5,3-pentamethylmethyl-1,5-diamine,
3-((methylmethoxy(phenethyll)silyl)methyl)-N1,N1,N5,N5,3-pentamethylpentane-1,3-diamine,
3-((ethylmethoxy(phenethyll)silyl)methyl)-N1,N1,N5,N5,3-pentamethylpentane-1,3-diamine,
3-((diethoxy(phenethyll)silyl)methyl)-N1,N1,N5,N5,3-pentamethylpentane-1,3-diamine,
3-((methylethoxy(phenethyll)silyl)methyl)-N1,N1,N5,N5,3-pentamethylpentane-1,5-diamine,
3-((ethylethoxy(phenethyll)silyl)methyl)-N1,N1,N5,N5,3-pentamethylpentane-1,3-diamine,
3-((dimethoxy(phenethyll)silyl)methyl)-N1,N1,N5,N5,3-pentamethylmethyl-1,5-diamine,
3-((methylmethoxy(phenethyll)silyl)methyl)-N1,N1,N5,N5,3-pentamethylpentane-1,3-diamine,
3-((ethylmethoxy(phenethyll)silyl)methyl)-N1,N1,N5,N5,3-pentamethylpentane-1,3-diamine,
3-((diethoxy(phenethyll)silyl)methyl)-N1,N1,N5,N5,3-pentamethylpentane-1,3-diamine,
3-((methylethoxy(phenethyll)silyl)methyl)-N1,N1,N5,N5,3-pentamethylpentane-1,5-diamine,
3-((ethylethoxy(phenethyll)silyl)methyl)-N1,N1,N5,N5,3-pentamethylpentane-1,3-diamine,
4-((dimethoxy(phenethyll)silyl)methyl)-N1,N1,N7,N7,4-pentamethylheptane-1,7-diamine,
4-((methylmethoxy(phenethyll)silyl)methyl)-N1,N1,N7,N7,4-pentamethylheptane-1,7-diamine,
4-((ethylmethoxy(phenethyll)silyl)methyl)-N1,N1,N7,N7,4-pentamethylheptane-1,7-diamine,
4-((diethoxy(phenethyll)silyl)methyl)-N1,N1,N7,N7,4-pentamethylheptane-1,7-diamine,
4-((methylethoxy(phenethyll)silyl)methyl)-N1,N1,N7,N7,4-pentamethylheptane-1,7-diamine,
4-((ethylethoxy(phenethyll)silyl)methyl)-N1,N1,N7,N7,4-pentamethylheptane-1,7-diamine,
4-((dimethoxy(phenethyll)silyl)methyl)-4-ethyl-N1,N1,N7,N7-tetramethyl heptane-1,7-diamine,
4-((methylmethoxy(phenethyll)silyl)methyl)-4-ethyl-N1,N1,N7,N7-tetramethyl heptane-1,7-diamine,
4-((ethylmethoxy(phenethyll)silyl)methyl)-4-ethyl-N1,N1,N7,N7-tetramethyl heptane-1,7-diamine,
4-((diethoxy(phenethyll)silyl)methyl)-4-ethyl-N1,N1,N7,N7-tetramethylheptane-1,7-diamine,
4-((methylethoxy(phenethyll)silyl)methyl)-4-ethyl-N1,N1,N7,N7-tetramethylheptane-1,7-diamine, and
4-((ethylethoxy(phenethyll)silyl)methyl)-4-ethyl-N1,N1,N7,N7-tetramethyl heptane-1,7-diamine.

7. The terminal modifier of claim 2, wherein the terminal modifier represented by Formula 1b is selected from the group consisting of:

4-(3-(dimethylamino)propyl)-N1,N1,N7,N7-tetramethyl-4-((trimethoxysilyl)methyl)heptane-1,7-diamine,
4-(3-(dimethylamino)propyl)-N1,N1,N7,N7-tetramethyl-4-((methyldimethoxysilyl)methyl)heptane-1,7-diamine,
4-(3-(dimethylamino)propyl)-N1,N1,N7,N7-tetramethyl-4-((ethyldimethoxysilyl)methyl)heptane-1,7-diamine,
4-(3-(dimethylamino)propyl)-N1,N1,N7,N7-tetramethyl-4-((dimethylmethoxysilyl)methyl)heptane-1,7-diamine,
4-(3-(dimethylamino)propyl)-N1,N1,N7,N7-tetramethyl-4-((diethylmethoxysilyl)methyl)heptane-1,7-diamine,
4-(3-(dimethylamino)propyl)-N1,N1,N7,N7-tetramethyl-4-((ethylmethylmethoxysilyl)methyl)heptane-1,7-diamine,
4-(3-(dimethylamino)propyl)-N1,N1,N7,N7-tetramethyl-4-((triethoxysilyl)methyl)heptane-1,7-diamine,
4-(3-(dimethylamino)propyl)-N1,N1,N7,N7-tetramethyl-4-((methyldiethoxysilyl)methyl)heptane-1,7-diamine,
4-(3-(dimethylamino)propyl)-N1,N1,N7,N7-tetramethyl-4-((ethyldiethoxysilyl)methyl)heptane-1,7-diamine,
4-(3-(dimethylamino)propyl)-N1,N1,N7,N7-tetramethyl-4-((dimethylethoxysilyl)methyl)heptane-1,7-diamine,
4-(3-(dimethylamino)propyl)-N1,N1,N7,N7-tetramethyl-4-((diethylethoxysilyl)methyl)heptane-1,7-diamine,
4-(3-(dimethylamino)propyl)-N1,N1,N7,N7-tetramethyl-4-((ethylmethylethoxysilyl)methyl)heptane-1,7-diamine,
4-(3-(diethylamino)propyl)-N1,N1,N7,N7-tetraethyl-4-((trimethoxysilyl)methyl)heptane-1,7-diamine,
4-(3-(diethylamino)propyl)-N1,N1,N7,N7-tetraethyl-4-((methyldimethoxysilyl)methyl)heptane-1,7-diamine,
4-(3-(diethylamino)propyl)-N1,N1,N7,N7-tetraethyl-4-((ethyldimethoxysilyl)methyl)heptane-1,7-diamine,
4-(3-(diethylamino)propyl)-N1,N1,N7,N7-tetraethyl-4-((dimethylmethoxysilyl)methyl)heptane-1,7-diamine,
4-(3-(diethylamino)propyl)-N1,N1,N7,N7-tetraethyl-4-((diethylmethoxysilyl)methyl)heptane-1,7-diamine,
4-(3-(diethylamino)propyl)-N1,N1,N7,N7-tetraethyl-4-((ethylmethylmethoxysilyl)methyl)heptane-1,7-diamine,
4-(3-(diethylamino)propyl)-N1,N1,N7,N7-tetraethyl-4-((triethoxysilyl)methyl)heptane-1,7-diamine,
4-(3-(diethylamino)propyl)-N1,N1,N7,N7-tetraethyl-4-((methyldiethoxysilyl)methyl)heptane-1,7-diamine,
4-(3-(diethylamino)propyl)-N1,N1,N7,N7-tetraethyl-4-((ethyldiethoxysilyl)methyl)heptane-1,7-diamine,
4-(3-(diethylamino)propyl)-N1,N1,N7,N7-tetraethyl-4-((dimethylethoxysilyl)methyl)heptane-1,7-diamine,
4-(3-(diethylamino)propyl)-N1,N1,N7,N7-tetraethyl-4-((diethylethoxysilyl)methyl)heptane-1,7-diamine,
4-(3-(diethylamino)propyl)-N1,N1,N7,N7-tetraethyl-4-((ethylmethylethoxysilyl)methyl)heptane-1,7-diamine,
4-(3-(dipropylamino)propyl)-N1,N1,N7,N7-tetrapropyl-4-((trimethoxysilyl)methyl)heptane-1,7-diamine,
4-(3-(dipropylamino)propyl)-N1,N1,N7,N7-tetrapropyl-4-((methyldimethoxysilyl)methyl)heptane-1,7-diamine,
4-(3-(dipropylamino)propyl)-N1,N1,N7,N7-tetrapropyl-4-((ethyldimethoxysilyl)methyl)heptane-1,7-diamine,
4-(3-(dipropylamino)propyl)-N1,N1,N7,N7-tetrapropyl-4-((dimethylmethoxysilyl)methyl)heptane-1,7-diamine,
4-(3-(dipropylamino)propyl)-N1,N1,N7,N7-tetrapropyl-4-((diethylmethoxysilyl)methyl)heptane-1,7-diamine,
4-(3-(dipropylamino)propyl)-N1,N1,N7,N7-tetrapropyl-4-((ethylmethylmethoxysilyl)methyl)heptane-1,7-diamine,
4-(3-(dipropylamino)propyl)-N1,N1,N7,N7-tetrapropyl-4-((triethoxysilyl)methyl)heptane-1,7-diamine,
4-(3-(dipropylamino)propyl)-N1,N1,N7,N7-tetrapropyl-4-((methyldiethoxysilyl)methyl)heptane-1,7-diamine,
4-(3-(dipropylamino)propyl)-N1,N1,N7,N7-tetrapropyl-4-((ethyldiethoxysilyl)methyl) heptane-1,7-diamine,
4-(3-(dipropylamino)propyl)-N1,N1,N7,N7-tetrapropyl-4-((dimethylethoxysilyl)methyl)heptane-1,7-diamine,
4-(3-(dipropylamino)propyl)-N1,N1,N7,N7-tetrapropyl-4-((diethylethoxysilyl)methyl)heptane-1,7-diamine,
4-(3-(dipropylamino)propyl)-N1,N1,N7,N7-tetrapropyl-4-((ethylmethylethoxysilyl)methyl)heptane-1,7-diamine, N1,N7-diethyl-4-(3-(ethyl(methyl)amino)propyl)-N1,N7-dimethyl-4-((trimethoxysilyl)methyl)heptane-1,7-diamine,
N1,N7-diethyl-4-(3-(ethyl(methyl)amino)propyl)-N1,N7-dimethyl-4-((methyldimethoxysilyl)methyl)heptane-1,7-diamine,
N1,N7-diethyl-4-(3-(ethyl(methyl)amino)propyl)-N1,N7-dimethyl-4-((ethyldimethoxysilyl)methyl)heptane-1,7-diamine,
N1,N7-diethyl-4-(3-(ethyl(methyl)amino)propyl)-N1,N7-dimethyl-4-((dimethylmethoxysilyl)methyl)heptane-1,7-diamine,
N1,N7-diethyl-4-(3-(ethyl(methyl)amino)propyl)-N1,N7-dimethyl-4-((diethylmethoxysilyl)methyl)heptane-1,7-diamine,
N1,N7-diethyl-4-(3-(ethyl(methyl)amino)propyl)-N1,N7-dimethyl-4-((ethylmethylmethoxysilyl)methyl)heptane-1,7-diamine,
N1,N7-diethyl-4-(3-(ethyl(methyl)amino)propyl)-N1,N7-dimethyl-4-((triethoxysilyl)methyl)heptane-1,7-diamine,
N1,N7-diethyl-4-(3-(ethyl(methyl)amino)propyl)-N1,N7-dimethyl-4-((methyldiethoxysilyl)methyl)heptane-1,7-diamine,
N1,N7-diethyl-4-(3-(ethyl(methyl)amino)propyl)-N1,N7-dimethyl-4-((ethyldiethoxysilyl)methyl)heptane-1,7-diamine,
N1,N7-diethyl-4-(3-(ethyl(methyl)amino)propyl)-N1,N7-dimethyl-4-((dimethylethoxysilyl)methyl)heptane-1,7-diamine,
N1,N7-diethyl-4-(3-(ethyl(methyl)amino)propyl)-N1,N7-dimethyl-4-((diethylethoxysilyl)methyl)heptane-1,7-diamine,
N1,N7-diethyl-4-(3-(ethyl(methyl)amino)propyl)-N1,N7-dimethyl-4-((ethylmethylethoxysilyl)methyl)heptane-1,7-diamine,
N1,N7-dimethyl-4-(3-(methyl(propyl)amino)propyl)-N1,N7-dipropyl-4-((trimethoxysilyl)methyl)heptane-1,7-diamine,
N1,N7-dimethyl-4-(3-(methyl(propyl)amino)propyl)-N1,N7-dipropyl-4-((methyldimethoxysilyl)methyl)heptane-1,7-diamine,
N1,N7-dimethyl-4-(3-(methyl(propyl)amino)propyl)-N1,N7-dipropyl-4-((ethyldimethoxysilyl)methyl)heptane-1,7-diamine,
N1,N7-dimethyl-4-(3-(methyl(propyl)amino)propyl)-N1,N7-dipropyl-4-((dimethylmethoxysilyl)methyl)heptane-1,7-diamine,
N1,N7-dimethyl-4-(3-(methyl(propyl)amino)propyl)-N1,N7-dipropyl-4-((diethylmethoxysilyl)methyl)heptane-1,7-diamine,
N1,N7-dimethyl-4-(3-(methyl(propyl)amino)propyl)-N1,N7-dipropyl-4-((ethylmethylmethoxysilyl)methyl)heptane-1,7-diamine,
N1,N7-dimethyl-4-(3-(methyl(propyl)amino)propyl)-N1,N7-dipropyl-4-((triethoxysilyl)methyl)heptane-1,7-diamine,
N1,N7-dimethyl-4-(3-(methyl(propyl)amino)propyl)-N1,N7-dipropyl-4-((methyldiethoxysilyl)methyl)heptane-1,7-diamine,
N1,N7-dimethyl-4-(3-(methyl(propyl)amino)propyl)-N1,N7-dipropyl-4-((ethyldiethoxysilyl)methyl)heptane-1,7-diamine,
N1,N7-dimethyl-4-(3-(methyl(propyl)amino)propyl)-N1,N7-dipropyl-4-((dimethylethoxysilyl)methyl)heptane-1,7-diamine,
N1,N7-dimethyl-4-(3-(methyl(propyl)amino)propyl)-N1,N7-dipropyl-4-((diethylethoxysilyl)methyl)heptane-1,7-diamine,
N1,N7-dimethyl-4-(3-(methyl(propyl)amino)propyl)-N1,N7-dipropyl-4-((ethylmethylethoxysilyl)methyl)heptane-1,7-diamine,
N1,N7-diethyl-4-(3-(ethyl(propyl)amino)propyl)-N1,N7-dipropyl-4-((trimethoxysilyl)methyl)heptane-1,7-diamine,
N1,N7-diethyl-4-(3-(ethyl(propyl)amino)propyl)-N1,N7-dipropyl-4-((methyldimethoxysilyl)methyl)heptane-1,7-diamine,
N1,N7-diethyl-4-(3-(ethyl(propyl)amino)propyl)-N1,N7-dipropyl-4-((ethyldimethoxysilyl)methyl)heptane-1,7-diamine,
N1,N7-diethyl-4-(3-(ethyl(propyl)amino)propyl)-N1,N7-dipropyl-4-((dimethylmethoxysilyl)methyl)heptane-1,7-diamine,
N1,N7-diethyl-4-(3-(ethyl(propyl)amino)propyl)-N1,N7-dipropyl-4-((diethylmethoxysilyl)methyl)heptane-1,7-diamine,
N1,N7-diethyl-4-(3-(ethyl(propyl)amino)propyl)-N1,N7-dipropyl-4-((ethylmethylmethoxysilyl)methyl)heptane-1,7-diamine,
N1,N7-diethyl-4-(3-(ethyl(propyl)amino)propyl)-N1,N7-dipropyl-4-((triethoxysilyl)methyl)heptane-1,7-diamine,
N1,N7-diethyl-4-(3-(ethyl(propyl)amino)propyl)-N1,N7-dipropyl-4-((methyldiethoxysilyl)methyl)heptane-1,7-diamine,
N1,N7-diethyl-4-(3-(ethyl(propyl)amino)propyl)-N1,N7-dipropyl-4-((ethyldiethoxysilyl)methyl)heptane-1,7-diamine,
N1,N7-diethyl-4-(3-(ethyl(propyl)amino)propyl)-N1,N7-dipropyl-4-((dimethylethoxysilyl)methyl)heptane-1,7-diamine,
N1,N7-diethyl-4-(3-(ethyl(propyl)amino)propyl)-N1,N7-dipropyl-4-((diethylethoxysilyl)methyl)heptane-1,7-diamine,
N1,N7-diethyl-4-(3-(ethyl(propyl)amino)propyl)-N1,N7-dipropyl-4-((ethylmethylethoxysilyl)methyl)heptane-1,7-diamine,
4-(3-(dimethylamino)propyl)-N1,N1,N7,N7-tetramethyl-4-(2-(trimethoxysilyl)ethyl)heptane-1,7-diamine,
4-(3-(dimethylamino)propyl)-N1,N1,N7,N7-tetramethyl-4-(2-(methyldimethoxysilyl)ethyl)heptane-1,7-diamine,
4-(3-(dimethylamino)propyl)-N1,N1,N7,N7-tetramethyl-4-(2-(ethyldimethoxysilyl)ethyl)heptane-1,7-diamine,
4-(3-(dimethylamino)propyl)-N1,N1,N7,N7-tetramethyl-4-(2-(dimethylmethoxysilyl)ethyl)heptane-1,7-diamine,
4-(3-(dimethylamino)propyl)-N1,N1,N7,N7-tetramethyl-4-(2-(diethylmethoxysilyl)ethyl)heptane-1,7-diamine,
4-(3-(dimethylamino)propyl)-N1,N1,N7,N7-tetramethyl-4-(2-(ethylmethylmethoxysilyl)ethyl)heptane-1,7-diamine,
4-(3-(dimethylamino)propyl)-N1,N1,N7,N7-tetramethyl-4-(2-(triethoxysilyl)ethyl)heptane-1,7-diamine,
4-(3-(dimethylamino)propyl)-N1,N1,N7,N7-tetramethyl-4-(2-(methyldiethoxysilyl)ethyl)heptane-1,7-diamine,
4-(3-(dimethylamino)propyl)-N1,N1,N7,N7-tetramethyl-4-(2-(ethyldiethoxysilyl)ethyl)heptane-1,7-diamine,
4-(3-(dimethylamino)propyl)-N1,N1,N7,N7-tetramethyl-4-(2-(dimethylethoxysilyl)ethyl)heptane-1,7-diamine,
4-(3-(dimethylamino)propyl)-N1,N1,N7,N7-tetramethyl-4-(2-(diethylethoxysilyl)ethyl)heptane-1,7-diamine, 4-(3-(dimethylamino)propyl)-N1,N1,N7,N7-tetramethyl-4-(2-(ethylmethylethoxysilyl)ethyl)heptane-1,7-diamine,
4-(3-(diethylamino)propyl)-N1,N1,N7,N7-tetraethyl-4-(2-(trimethoxysilyl)ethyl)heptane-1,7-diamine,
4-(3-(diethylamino)propyl)-N1,N1,N7,N7-tetraethyl-4-(2-(methyldimethoxysilyl)ethyl)heptane-1,7-diamine,
4-(3-(diethylamino)propyl)-N1,N1,N7,N7-tetraethyl-4-(2-(ethyldimethoxysilyl)ethyl)heptane-1,7-diamine,
4-(3-(diethylamino)propyl)-N1,N1,N7,N7-tetraethyl-4-(2-(dimethylmethoxysilyl)ethyl)heptane-1,7-diamine,
4-(3-(diethylamino)propyl)-N1,N1,N7,N7-tetraethyl-4-(2-(diethylmethoxysilyl)ethyl)heptane-1,7-diamine,
4-(3-(diethylamino)propyl)-N1,N1,N7,N7-tetraethyl-4-(2-(ethylmethylmethoxysilyl)ethyl)heptane-1,7-diamine,
4-(3-(diethylamino)propyl)-N1,N1,N7,N7-tetraethyl-4-(2-(triethoxysilyl)ethyl)heptane-1,7-diamine,
4-(3-(diethylamino)propyl)-N1,N1,N7,N7-tetraethyl-4-(2-(methyldiethoxysilyl)ethyl)heptane-1,7-diamine,
4-(3-(diethylamino)propyl)-N1,N1,N7,N7-tetraethyl-4-(2-(ethyldiethoxysilyl)ethyl)heptane-1,7-diamine,
4-(3-(diethylamino)propyl)-N1,N1,N7,N7-tetraethyl-4-(2-(dimethylethoxysilyl)ethyl)heptane-1,7-diamine,
4-(3-(diethylamino)propyl)-N1,N1,N7,N7-tetraethyl-4-(2-(diethylethoxysilyl)ethyl)heptane-1,7-diamine,
4-(3-(diethylamino)propyl)-N1,N1,N7,N7-tetraethyl-4-(2-(ethylmethylethoxysilyl)ethyl)heptane-1,7-diamine,
4-(3-(dipropylamino)propyl)-N1,N1,N7,N7-tetrapropyl-4-(2-(trimethoxysilyl)ethyl)heptane-1,7-diamine,
4-(3-(dipropylamino)propyl)-N1,N1,N7,N7-tetrapropyl-4-(2-(methyldimethoxysilyl)ethyl)heptane-1,7-diamine,
4-(3-(dipropylamino)propyl)-N1,N1,N7,N7-tetrapropyl-4-(2-(ethyldimethoxysilyl)ethyl)heptane-1,7-diamine,
4-(3-(dipropylamino)propyl)-N1,N1,N7,N7-tetrapropyl-4-(2-(dimethylmethoxysilyl)ethyl)heptane-1,7-diamine,
4-(3-(dipropylamino)propyl)-N1,N1,N7,N7-tetrapropyl-4-(2-(diethylmethoxysilyl)ethyl)heptane-1,7-diamine,
4-(3-(dipropylamino)propyl)-N1,N1,N7,N7-tetrapropyl-4-(2-(ethylmethylmethoxysilyl)ethyl)heptane-1,7-diamine,
4-(3-(dipropylamino)propyl)-N1,N1,N7,N7-tetrapropyl-4-(2-(triethoxysilyl)ethyl)heptane-1,7-diamine,
4-(3-(dipropylamino)propyl)-N1,N1,N7,N7-tetrapropyl-4-(2-(methyldiethoxysilyl)ethyl)heptane-1,7-diamine,
4-(3-(dipropylamino)propyl)-N1,N1,N7,N7-tetrapropyl-4-(2-(ethyldiethoxysilyl)ethyl)heptane-1,7-diamine,
4-(3-(dipropylamino)propyl)-N1,N1,N7,N7-tetrapropyl-4-(2-(dimethylethoxysilyl)ethyl)heptane-1,7-diamine,
4-(3-(dipropylamino)propyl)-N1,N1,N7,N7-tetrapropyl-4-(2-(diethylethoxysilyl)ethyl)heptane-1,7-diamine,
4-(3-(dipropylamino)propyl)-N1,N1,N7,N7-tetrapropyl-4-(2-(ethylmethylethoxysilyl)ethyl)heptane-1,7-diamine,
N1,N7-diethyl-4-(3-(ethyl(methyl)amino)propyl)-N1,N7-dimethyl-4-(2-(trimethoxysilyl)ethyl)heptane-1,7-diamine,
N1,N7-diethyl-4-(3-(ethyl(methyl)amino)propyl)-N1,N7-dimethyl-4-(2-(methyldimethoxysilyl)ethyl)heptane-1,7-diamine,
N1,N7-diethyl-4-(3-(ethyl(methyl)amino)propyl)-N1,N7-dimethyl-4-(2-(ethyldimethoxysilyl)ethyl)heptane-1,7-diamine,
N1,N7-diethyl-4-(3-(ethyl(methyl)amino)propyl)-N1,N7-dimethyl-4-(2-(dimethylmethoxysilyl)ethyl)heptane-1,7-diamine,
N1,N7-diethyl-4-(3-(ethyl(methyl)amino)propyl)-N1,N7-dimethyl-4-(2-(diethylmethoxysilyl)ethyl)heptane-1,7-diamine,
N1,N7-diethyl-4-(3-(ethyl(methyl)amino)propyl)-N1,N7-dimethyl-4-(2-(ethylmethylmethoxysilyl)ethyl)heptane-1,7-diamine,
N1,N7-diethyl-4-(3-(ethyl(methyl)amino)propyl)-N1,N7-dimethyl-4-(2-(triethoxysilyl)ethyl)heptane-1,7-diamine,
N1,N7-diethyl-4-(3-(ethyl(methyl)amino)propyl)-N1,N7-dimethyl-4-(2-(methyldiethoxysilyl)ethyl)heptane-1,7-diamine,
N1,N7-diethyl-4-(3-(ethyl(methyl)amino)propyl)-N1,N7-dimethyl-4-(2-(ethyldiethoxysilyl)ethyl)heptane-1,7-diamine,
N1,N7-diethyl-4-(3-(ethyl(methyl)amino)propyl)-N1,N7-dimethyl-4-(2-(dimethylethoxysilyl)ethyl)heptane-1,7-diamine,
N1,N7-diethyl-4-(3-(ethyl(methyl)amino)propyl)-N1,N7-dimethyl-4-(2-(diethylethoxysilyl)ethyl)heptane-1,7-diamine,
N1,N7-diethyl-4-(3-(ethyl(methyl)amino)propyl)-N1,N7-dimethyl-4-(2-(ethylmethylethoxysilyl)ethyl)heptane-1,7-diamine,
N1,N7-dimethyl-4-(3-(methyl(propyl)amino)propyl)-N1,N7-dipropyl-4-(2-(trimethoxysilyl)ethyl)heptane-1,7-diamine,
N1,N7-dimethyl-4-(3-(methyl(propyl)amino)propyl)-N1,N7-dipropyl-4-(2-(methyldimethoxysilyl)ethyl)heptane-1,7-diamine,
N1,N7-dimethyl-4-(3-(methyl(propyl)amino)propyl)-N1,N7-dipropyl-4-(2-(ethyldimethoxysilyl)ethyl)heptane-1,7-diamine,
N1,N7-dimethyl-4-(3-(methyl(propyl)amino)propyl)-N1,N7-dipropyl-4-(2-(dimethylmethoxysilyl)ethyl)heptane-1,7-diamine,
N1,N7-dimethyl-4-(3-(methyl(propyl)amino)propyl)-N1,N7-dipropyl-4-(2-(diethylmethoxysilyl)ethyl)heptane-1,7-diamine,
N1,N7-dimethyl-4-(3-(methyl(propyl)amino)propyl)-N1,N7-dipropyl-4-(2-(ethylmethylmethoxysilyl)ethyl)heptane-1,7-diamine,
N1,N7-dimethyl-4-(3-(methyl(propyl)amino)propyl)-N1,N7-dipropyl-4-(2-(triethoxysilyl)ethyl)heptane-1,7-diamine,
N1,N7-dimethyl-4-(3-(methyl(propyl)amino)propyl)-N1,N7-dipropyl-4-(2-(methyldiethoxysilyl)ethyl)heptane-1,7-diamine,
N1,N7-dimethyl-4-(3-(methyl(propyl)amino)propyl)-N1,N7-dipropyl-4-(2-(ethyldiethoxysilyl)ethyl)heptane-1,7-diamine,
N1,N7-dimethyl-4-(3-(methyl(propyl)amino)propyl)-N1,N7-dipropyl-4-(2-(dimethylethoxysilyl)ethyl)heptane-1,7-diamine,
N1,N7-dimethyl-4-(3-(methyl(propyl)amino)propyl)-N1,N7-dipropyl-4-(2-(diethylethoxysilyl)ethyl)heptane-1,7-diamine,
N1,N7-dimethyl-4-(3-(methyl(propyl)amino)propyl)-N1,N7-dipropyl-4-(2-(ethylmethylethoxysilyl)ethyl)heptane-1,7-diamine,
N1,N7-diethyl-4-(3-(ethyl(propyl)amino)propyl)-N1,N7-dipropyl-4-(2-(trimethoxysilyl)ethyl)heptane-1,7-diamine, N1,N7-diethyl-4-(3-(ethyl(propyl)amino)propyl)-N1,N7-dipropyl-4-(2-(methyldimethoxysilyl)ethyl)heptane-1,7-diamine,
N1,N7-diethyl-4-(3-(ethyl(propyl)amino)propyl)-N1,N7-dipropyl-4-(2-(ethyldimethoxysilyl)ethyl)heptane-1,7-diamine,
N1,N7-diethyl-4-(3-(ethyl(propyl)amino)propyl)-N1,N7-dipropyl-4-(2-(dimethylmethoxysilyl)ethyl)heptane-1,7-diamine,
N1,N7-diethyl-4-(3-(ethyl(propyl)amino)propyl)-N1,N7-dipropyl-4-(2-(diethylmethoxysilyl)ethyl)heptane-1,7-diamine,
N1,N7-diethyl-4-(3-(ethyl(propyl)amino)propyl)-N1,N7-dipropyl-4-(2-(ethylmethylmethoxysilyl)ethyl)heptane-1,7-diamine,
N1,N7-diethyl-4-(3-(ethyl(propyl)amino)propyl)-N1,N7-dipropyl-4-(2-(triethoxysilyl)ethyl)heptane-1,7-diamine,
N1,N7-diethyl-4-(3-(ethyl(propyl)amino)propyl)-N1,N7-dipropyl-4-(2-(methyldiethoxysilyl)ethyl)heptane-1,7-diamine,
N1,N7-diethyl-4-(3-(ethyl(propyl)amino)propyl)-N1,N7-dipropyl-4-(2-(ethyldiethoxysilyl)ethyl)heptane-1,7-diamine,
N1,N7-diethyl-4-(3-(ethyl(propyl)amino)propyl)-N1,N7-dipropyl-4-(2-(dimethylethoxysilyl)ethyl)heptane-1,7-diamine,
N1,N7-diethyl-4-(3-(ethyl(propyl)amino)propyl)-N1,N7-dipropyl-4-(2-(diethylethoxysilyl)ethyl)heptane-1,7-diamine,
N1,N7-diethyl-4-(3-(ethyl(propyl)amino)propyl)-N1,N7-dipropyl-4-(2-(ethylmethylethoxysilyl)ethyl)heptane-1,7-diamine,
3-(2-(dimethylamino)ethyl)-N1,N1,N5,N5-tetramethyl-3-((trimethoxysilyl)methyl)pentane-1,3-diamine,
3-(2-(dimethylamino)ethyl)-N1,N1,N5,N5-tetramethyl-3-((methyldimethoxysilyl)methyl)pentane-1,3-diamine,
3-(2-(dimethylamino)ethyl)-N1,N1,N5,N5-tetramethyl-3-((ethyldimethoxysilyl)methyl)pentane-1,3-diamine,
3-(2-(dimethylamino)ethyl)-N1,N1,N5,N5-tetramethyl-3-((dimethylmethoxysilyl)methyl)pentane-1,3-diamine,
3-(2-(dimethylamino)ethyl)-N1,N1,N5,N5-tetramethyl-3-((diethylmethoxysilyl)methyl)pentane-1,3-diamine,
3-(2-(dimethylamino)ethyl)-N1,N1,N5,N5-tetramethyl-3-((ethylmethylmethoxysilyl)methyl)pentane-1,3-diamine,
3-(2-(dimethylamino)ethyl)-N1,N1,N5,N5-tetramethyl-3-((triethoxysilyl)methyl)pentane-1,3-diamine,
3-(2-(dimethylamino)ethyl)-N1,N1,N5,N5-tetramethyl-3-((methyldiethoxysilyl)methyl)pentane-1,3-diamine,
3-(2-(dimethylamino)ethyl)-N1,N1,N5,N5-tetramethyl-3-((ethyldiethoxysilyl)methyl)pentane-1,3-diamine,
3-(2-(dimethylamino)ethyl)-N1,N1,N5,N5-tetramethyl-3-((dimethylethoxysilyl)methyl)pentane-1,3-diamine,
3-(2-(dimethylamino)ethyl)-N1,N1,N5,N5-tetramethyl-3-((diethylethoxysilyl)methyl)pentane-1,3-diamine,
3-(2-(dimethylamino)ethyl)-N1,N1,N5,N5-tetramethyl-3-((ethylmethylethoxysilyl)methyl)pentane-1,3-diamine,
3-(2-(diethylamino)ethyl)-N1,N1,N5,N5-tetraethyl-3-((trimethoxysilyl)methyl)pentane-1,3-diamine,
3-(2-(diethylamino)ethyl)-N1,N1,N5,N5-tetraethyl-3-((methyldimethoxysilyl)methyl)pentane-1,3-diamine,
3-(2-(diethylamino)ethyl)-N1,N1,N5,N5-tetraethyl-3-((ethyldimethoxysilyl)methyl)pentane-1,3-diamine,
3-(2-(diethylamino)ethyl)-N1,N1,N5,N5-tetraethyl-3-((dimethylmethoxysilyl)methyl)pentane-1,3-diamine,
3-(2-(diethylamino)ethyl)-N1,N1,N5,N5-tetraethyl-3-((diethylmethoxysilyl)methyl)pentane-1,3-diamine,
3-(2-(diethylamino)ethyl)-N1,N1,N5,N5-tetraethyl-3-((ethylmethylmethoxysilyl)methyl)pentane-1,3-diamine,
3-(2-(diethylamino)ethyl)-N1,N1,N5,N5-tetraethyl-3-((triethoxysilyl)methyl)pentane-1,3-diamine,
3-(2-(diethylamino)ethyl)-N1,N1,N5,N5-tetraethyl-3-((methyldiethoxysilyl)methyl)pentane-1,3-diamine,
3-(2-(diethylamino)ethyl)-N1,N1,N5,N5-tetraethyl-3-((ethyldiethoxysilyl)methyl)pentane-1,3-diamine,
3-(2-(diethylamino)ethyl)-N1,N1,N5,N5-tetraethyl-3-((dimethylethoxysilyl)methyl)pentane-1,3-diamine,
3-(2-(diethylamino)ethyl)-N1,N1,N5,N5-tetraethyl-3-((diethylethoxysilyl)methyl)pentane-1,3-diamine,
3-(2-(diethylamino)ethyl)-N1,N1,N5,N5-tetraethyl-3-((ethylmethylethoxysilyl)methyl)pentane-1,3-diamine,
3-(2-(dipropylamino)ethyl)-N1,N1,N5,N5-tetrapropyl-3-((trimethoxysilyl)methyl)pentane-1,3-diamine,
3-(2-(dipropylamino)ethyl)-N1,N1,N5,N5-tetrapropyl-3-((methyldimethoxysilyl)methyl)pentane-1,3-diamine,
3-(2-(dipropylamino)ethyl)-N1,N1,N5,N5-tetrapropyl-3-((ethyldimethoxysilyl)methyl)pentane-1,3-diamine,
3-(2-(dipropylamino)ethyl)-N1,N1,N5,N5-tetrapropyl-3-((dimethylmethoxysilyl)methyl)pentane-1,3-diamine,
3-(2-(dipropylamino)ethyl)-N1,N1,N5,N5-tetrapropyl-3-((diethylmethoxysilyl)methyl)pentane-1,3-diamine,
3-(2-(dipropylamino)ethyl)-N1,N1,N5,N5-tetrapropyl-3-((ethylmethylmethoxysilyl)methyl)pentane-1,3-diamine,
3-(2-(dipropylamino)ethyl)-N1,N1,N5,N5-tetrapropyl-3-((triethoxysilyl)methyl)pentane-1,3-diamine,
3-(2-(dipropylamino)ethyl)-N1,N1,N5,N5-tetrapropyl-3-((methyldiethoxysilyl)methyl)pentane-1,3-diamine,
3-(2-(dipropylamino)ethyl)-N1,N1,N5,N5-tetrapropyl-3-((ethyldiethoxysilyl)methyl)pentane-1,3-diamine,
3-(2-(dipropylamino)ethyl)-N1,N1,N5,N5-tetrapropyl-3-((dimethylethoxysilyl)methyl)pentane-1,3-diamine,
3-(2-(dipropylamino)ethyl)-N1,N1,N5,N5-tetrapropyl-3-((diethylethoxysilyl)methyl)pentane-1,3-diamine,
3-(2-(dipropylamino)ethyl)-N1,N1,N5,N5-tetrapropyl-3-((ethylmethylethoxysilyl)methyl)pentane-1,3-diamine,
N1,N5-diethyl-3-(2-(ethyl(methyl)amino)ethyl)-N1,N5-dimethyl-3-((trimethoxysilyl)methyl)pentane-1,3-diamine,
N1,N5-diethyl-3-(2-(ethyl(methyl)amino)ethyl)-N1,N5-dimethyl-3-((methyldimethoxysilyl)methyl)pentane-1,3-diamine,
N1,N5-diethyl-3-(2-(ethyl(methyl)amino)ethyl)-N1,N5-dimethyl-3-((ethyldimethoxysilyl)methyl)pentane-1,3-diamine,
N1,N5-diethyl-3-(2-(ethyl(methyl)amino)ethyl)-N1,N5-dimethyl-3-((dimethylmethoxysilyl)methyl)pentane-1,3-diamine,
N1,N5-diethyl-3-(2-(ethyl(methyl)amino)ethyl)-N1,N5-dimethyl-3-((diethylmethoxysilyl)methyl)pentane-1,3-diamine,
N1,N5-diethyl-3-(2-(ethyl(methyl)amino)ethyl)-N1,N5-dimethyl-3-((ethylmethylmethoxysilyl)methyl)pentane-1,3-diamine,
N1,N5-diethyl-3-(2-(ethyl(methyl)amino)ethyl)-N1,N5-dimethyl-3-((triethoxysilyl)methyl)pentane-1,3-diamine, N1,N5-diethyl-3-(2-(ethyl(methyl)amino)ethyl)-N1,N5-dimethyl-3-((methyldiethoxysilyl)methyl)pentane-1,3-diamine,
N1,N5-diethyl-3-(2-(ethyl(methyl)amino)ethyl)-N1,N5-dimethyl-3-((ethyldiethoxysilyl)methyl)pentane-1,3-diamine,
N1,N5-diethyl-3-(2-(ethyl(methyl)amino)ethyl)-N1,N5-dimethyl-3-((dimethylethoxysilyl)methyl)pentane-1,3-diamine,
N1,N5-diethyl-3-(2-(ethyl(methyl)amino)ethyl)-N1,N5-dimethyl-3-((diethylethoxysilyl)methyl)pentane-1,3-diamine,
N1,N5-diethyl-3-(2-(ethyl(methyl)amino)ethyl)-N1,N5-dimethyl-3-((ethylmethylethoxysilyl)methyl)pentane-1,3-diamine,
N1,N5-dimethyl-3-(2-(methyl(propyl)amino)ethyl)-N1,N5-dipropyl-3-((trimethoxysilyl)methyl)pentane-1,3-diamine,
N1,N5-dimethyl-3-(2-(methyl(propyl)amino)ethyl)-N1,N5-dipropyl-3-((methyldimethoxysilyl)methyl)pentane-1,3-diamine,
N1,N5-dimethyl-3-(2-(methyl(propyl)amino)ethyl)-N1,N5-dipropyl-3-((ethyldimethoxysilyl)methyl)pentane-1,3-diamine,
N1,N5-dimethyl-3-(2-(methyl(propyl)amino)ethyl)-N1,N5-dipropyl-3-((dimethylmethoxysilyl)methyl)pentane-1,3-diamine,
N1,N5-dimethyl-3-(2-(methyl(propyl)amino)ethyl)-N1,N5-dipropyl-3-((diethylmethoxysilyl)methyl)pentane-1,3-diamine,
N1,N5-dimethyl-3-(2-(methyl(propyl)amino)ethyl)-N1,N5-dipropyl-3-((ethylmethylmethoxysilyl)methyl)pentane-1,3-diamine,
N1,N5-dimethyl-3-(2-(methyl(propyl)amino)ethyl)-N1,N5-dipropyl-3-((triethoxysilyl)methyl)pentane-1,3-diamine,
N1,N5-dimethyl-3-(2-(methyl(propyl)amino)ethyl)-N1,N5-dipropyl-3-((methyldiethoxysilyl)methyl)pentane-1,3-diamine,
N1,N5-dimethyl-3-(2-(methyl(propyl)amino)ethyl)-N1,N5-dipropyl-3-((ethyldiethoxysilyl)methyl)pentane-1,3-diamine,
N1,N5-dimethyl-3-(2-(methyl(propyl)amino)ethyl)-N1,N5-dipropyl-3-((dimethylethoxysilyl)methyl)pentane-1,3-diamine,
N1,N5-dimethyl-3-(2-(methyl(propyl)amino)ethyl)-N1,N5-dipropyl-3-((diethylethoxysilyl)methyl)pentane-1,3-diamine,
N1,N5-dimethyl-3-(2-(methyl(propyl)amino)ethyl)-N1,N5-dipropyl-3-((ethylmethylethoxysilyl)methyl)pentane-1,3-diamine,
N1,N5-diethyl-3-(2-(ethyl(propyl)amino)ethyl)-N1,N5-dipropyl-3-((trimethoxysilyl)methyl)pentane-1,3-diamine,
N1,N5-diethyl-3-(2-(ethyl(propyl)amino)ethyl)-N1,N5-dipropyl-3-((methyldimethoxysilyl)methyl)pentane-1,3-diamine,
N1,N5-diethyl-3-(2-(ethyl(propyl)amino)ethyl)-N1,N5-dipropyl-3-((ethyldimethoxysilyl)methyl)pentane-1,3-diamine,
N1,N5-diethyl-3-(2-(ethyl(propyl)amino)ethyl)-N1,N5-dipropyl-3-((dimethylmethoxysilyl)methyl)pentane-1,3-diamine,
N1,N5-diethyl-3-(2-(ethyl(propyl)amino)ethyl)-N1,N5-dipropyl-3-((diethylmethoxysilyl)methyl)pentane-1,3-diamine,
N1,N5-diethyl-3-(2-(ethyl(propyl)amino)ethyl)-N1,N5-dipropyl-3-((ethylmethylmethoxysilyl)methyl)pentane-1,3-diamine,
N1,N5-diethyl-3-(2-(ethyl(propyl)amino)ethyl)-N1,N5-dipropyl-3-((triethoxysilyl)methyl)pentane-1,3-diamine,
N1,N5-diethyl-3-(2-(ethyl(propyl)amino)ethyl)-N1,N5-dipropyl-3-((methyldiethoxysilyl)methyl)pentane-1,3-diamine,
N1,N5-diethyl-3-(2-(ethyl(propyl)amino)ethyl)-N1,N5-dipropyl-3-((ethyldiethoxysilyl)methyl)pentane-1,3-diamine,
N1,N5-diethyl-3-(2-(ethyl(propyl)amino)ethyl)-N1,N5-dipropyl-3-((dimethylethoxysilyl)methyl)pentane-1,3-diamine,
N1,N5-diethyl-3-(2-(ethyl(propyl)amino)ethyl)-N1,N5-dipropyl-3-((diethylethoxysilyl)methyl)pentane-1,3-diamine,
N1,N5-diethyl-3-(2-(ethyl(propyl)amino)ethyl)-N1,N5-dipropyl-3-((ethylmethylethoxysilyl)methyl)pentane-1,3-diamine,
3-(2-(dimethylamino)ethyl)-N1,N1,N5,N5-tetramethyl-3-(2-(trimethoxysilyl)ethyl)pentane-1,3-diamine,
3-(2-(dimethylamino)ethyl)-N1,N1,N5,N5-tetramethyl-3-(2-(methyldimethoxysilyl)ethyl)pentane-1,3-diamine,
3-(2-(dimethylamino)ethyl)-N1,N1,N5,N5-tetramethyl-3-(2-(ethyldimethoxysilyl)ethyl)pentane-1,3-diamine,
3-(2-(dimethylamino)ethyl)-N1,N1,N5,N5-tetramethyl-3-(2-(dimethylmethoxysilyl)ethyl)pentane-1,3-diamine,
3-(2-(dimethylamino)ethyl)-N1,N1,N5,N5-tetramethyl-3-(2-(diethylmethoxysilyl)ethyl)pentane-1,3-diamine,
3-(2-(dimethylamino)ethyl)-N1,N1,N5,N5-tetramethyl-3-(2-(ethylmethylmethoxysilyl)ethyl)pentane-1,3-diamine,
3-(2-(dimethylamino)ethyl)-N1,N1,N5,N5-tetramethyl-3-(2-(triethoxysilyl)ethyl)pentane-1,3-diamine,
3-(2-(dimethylamino)ethyl)-N1,N1,N5,N5-tetramethyl-3-(2-(methyldiethoxysilyl)ethyl)pentane-1,3-diamine,
3-(2-(dimethylamino)ethyl)-N1,N1,N5,N5-tetramethyl-3-(2-(ethyldiethoxysilyl)ethyl)pentane-1,3-diamine,
3-(2-(dimethylamino)ethyl)-N1,N1,N5,N5-tetramethyl-3-(2-(dimethylethoxysilyl)ethyl)pentane-1,3-diamine,
3-(2-(dimethylamino)ethyl)-N1,N1,N5,N5-tetramethyl-3-(2-(diethylethoxysilyl)ethyl)pentane-1,3-diamine,
3-(2-(dimethylamino)ethyl)-N1,N1,N5,N5-tetramethyl-3-(2-(ethylmethylethoxysilyl)ethyl)pentane-1,3-diamine,
3-(2-(diethylamino)ethyl)-N1,N1,N5,N5-tetraethyl-3-(2-(trimethoxysilyl)ethyl)pentane-1,3-diamine,
3-(2-(diethylamino)ethyl)-N1,N1,N5,N5-tetraethyl-3-(2-(methyldimethoxysilyl)ethyl)pentane-1,3-diamine,
3-(2-(diethylamino)ethyl)-N1,N1,N5,N5-tetraethyl-3-(2-(ethyldimethoxysilyl)ethyl)pentane-1,3-diamine,
3-(2-(diethylamino)ethyl)-N1,N1,N5,N5-tetraethyl-3-(2-(dimethylmethoxysilyl)ethyl)pentane-1,3-diamine,
3-(2-(diethylamino)ethyl)-N1,N1,N5,N5-tetraethyl-3-(2-(diethylmethoxysilyl)ethyl)pentane-1,3-diamine,
3-(2-(diethylamino)ethyl)-N1,N1,N5,N5-tetraethyl-3-(2-(ethylmethylmethoxysilyl)ethyl)pentane-1,3-diamine,
3-(2-(diethylamino)ethyl)-N1,N1,N5,N5-tetraethyl-3-(2-(triethoxysilyl)ethyl)pentane-1,3-diamine,
3-(2-(diethylamino)ethyl)-N1,N1,N5,N5-tetraethyl-3-(2-(methyldiethoxysilyl)ethyl)pentane-1,3-diamine,
3-(2-(diethylamino)ethyl)-N1,N1,N5,N5-tetraethyl-3-(2-(ethyldiethoxysilyl)ethyl)pentane-1,3-diamine, 3-(2-(diethylamino)ethyl)-N1,N1,N5,N5-tetraethyl-3-(2-(dimethylethoxysilyl)ethyl)pentane-1,3-diamine,
3-(2-(diethylamino)ethyl)-N1,N1,N5,N5-tetraethyl-3-(2-(diethylethoxysilyl)ethyl)pentane-1,3-diamine,
3-(2-(diethylamino)ethyl)-N1,N1,N5,N5-tetraethyl-3-(2-(ethylmethylethoxysilyl)ethyl)pentane-1,3-diamine,
3-(2-(dipropylamino)ethyl)-N1,N1,N5,N5-tetrapropyl-3-(2-(trimethoxysilyl)ethyl)pentane-1,3-diamine,
3-(2-(dipropylamino)ethyl)-N1,N1,N5,N5-tetrapropyl-3-(2-(methyldimethoxysilyl)ethyl)pentane-1,3-diamine,
3-(2-(dipropylamino)ethyl)-N1,N1,N5,N5-tetrapropyl-3-(2-(ethyldimethoxysilyl)ethyl)pentane-1,3-diamine,
3-(2-(dipropylamino)ethyl)-N1,N1,N5,N5-tetrapropyl-3-(2-(dimethylmethoxysilyl)ethyl)pentane-1,3-diamine,
3-(2-(dipropylamino)ethyl)-N1,N1,N5,N5-tetrapropyl-3-(2-(diethylmethoxysilyl)ethyl)pentane-1,3-diamine,
3-(2-(dipropylamino)ethyl)-N1,N1,N5,N5-tetrapropyl-3-(2-(ethylmethylmethoxysilyl)ethyl)pentane-1,3-diamine,
3-(2-(dipropylamino)ethyl)-N1,N1,N5,N5-tetrapropyl-3-(2-(triethoxysilyl)ethyl)pentane-1,3-diamine,
3-(2-(dipropylamino)ethyl)-N1,N1,N5,N5-tetrapropyl-3-(2-(methyldiethoxysilyl)ethyl)pentane-1,3-diamine,
3-(2-(dipropylamino)ethyl)-N1,N1,N5,N5-tetrapropyl-3-(2-(ethyldiethoxysilyl)ethyl)pentane-1,3-diamine,
3-(2-(dipropylamino)ethyl)-N1,N1,N5,N5-tetrapropyl-3-(2-(dimethylethoxysilyl)ethyl)pentane-1,3-diamine,
3-(2-(dipropylamino)ethyl)-N1,N1,N5,N5-tetrapropyl-3-(2-(diethylethoxysilyl)ethyl)pentane-1,3-diamine,
3-(2-(dipropylamino)ethyl)-N1,N1,N5,N5-tetrapropyl-3-(2-(ethylmethylethoxysilyl)ethyl)pentane-1,3-diamine,
N1,N5-diethyl-3-(2-(ethyl(methyl)amino)ethyl)-N1,N5-dimethyl-3-(2-(trimethoxysilyl)ethyl)pentane-1,3-diamine,
N1,N5-diethyl-3-(2-(ethyl(methyl)amino)ethyl)-N1,N5-dimethyl-3-(2-(methyldimethoxysilyl)ethyl)pentane-1,3-diamine,
N1,N5-diethyl-3-(2-(ethyl(methyl)amino)ethyl)-N1,N5-dimethyl-3-(2-(ethyldimethoxysilyl)ethyl)pentane-1,3-diamine,
N1,N5-diethyl-3-(2-(ethyl(methyl)amino)ethyl)-N1,N5-dimethyl-3-(2-(dimethylmethoxysilyl)ethyl)pentane-1,3-diamine,
N1,N5-diethyl-3-(2-(ethyl(methyl)amino)ethyl)-N1,N5-dimethyl-3-(2-(diethylmethoxysilyl)ethyl)pentane-1,3-diamine,
N1,N5-diethyl-3-(2-(ethyl(methyl)amino)ethyl)-N1,N5-dimethyl-3-(2-(ethylmethylmethoxysilyl)ethyl)pentane-1,3-diamine,
N1,N5-diethyl-3-(2-(ethyl(methyl)amino)ethyl)-N1,N5-dimethyl-3-(2-(triethoxysilyl)ethyl)pentane-1,3-diamine,
N1,N5-diethyl-3-(2-(ethyl(methyl)amino)ethyl)-N1,N5-dimethyl-3-(2-(methyldiethoxysilyl)ethyl)pentane-1,3-diamine,
N1,N5-diethyl-3-(2-(ethyl(methyl)amino)ethyl)-N1,N5-dimethyl-3-(2-(ethyldiethoxysilyl)ethyl)pentane-1,3-diamine,
N1,N5-diethyl-3-(2-(ethyl(methyl)amino)ethyl)-N1,N5-dimethyl-3-(2-(dimethylethoxysilyl)ethyl)pentane-1,3-diamine,
N1,N5-diethyl-3-(2-(ethyl(methyl)amino)ethyl)-N1,N5-dimethyl-3-(2-(diethylethoxysilyl)ethyl)pentane-1,3-diamine,
N1,N5-diethyl-3-(2-(ethyl(methyl)amino)ethyl)-N1,N5-dimethyl-3-(2-(ethylmethylethoxysilyl)ethyl)pentane-1,3-diamine,
N1,N5-dimethyl-3-(2-(methyl(propyl)amino)ethyl)-N1,N5-dipropyl-3-(2-(trimethoxysilyl)ethyl)pentane-1,3-diamine,
N1,N5-dimethyl-3-(2-(methyl(propyl)amino)ethyl)-N1,N5-dipropyl-3-(2-(methyldimethoxysilyl)ethyl)pentane-1,3-diamine,
N1,N5-dimethyl-3-(2-(methyl(propyl)amino)ethyl)-N1,N5-dipropyl-3-(2-(ethyldimethoxysilyl)ethyl)pentane-1,3-diamine,
N1,N5-dimethyl-3-(2-(methyl(propyl)amino)ethyl)-N1,N5-dipropyl-3-(2-(dimethylmethoxysilyl)ethyl)pentane-1,3-diamine,
N1,N5-dimethyl-3-(2-(methyl(propyl)amino)ethyl)-N1,N5-dipropyl-3-(2-(diethylmethoxysilyl)ethyl)pentane-1,3-diamine,
N1,N5-dimethyl-3-(2-(methyl(propyl)amino)ethyl)-N1,N5-dipropyl-3-(2-(ethylmethylmethoxysilyl)ethyl)pentane-1,3-diamine,
N1,N5-dimethyl-3-(2-(methyl(propyl)amino)ethyl)-N1,N5-dipropyl-3-(2-(triethoxysilyl)ethyl)pentane-1,3-diamine,
N1,N5-dimethyl-3-(2-(methyl(propyl)amino)ethyl)-N1,N5-dipropyl-3-(2-(methyldiethoxysilyl)ethyl)pentane-1,3-diamine,
N1,N5-dimethyl-3-(2-(methyl(propyl)amino)ethyl)-N1,N5-dipropyl-3-(2-(ethyldiethoxysilyl)ethyl)pentane-1,3-diamine,
N1,N5-dimethyl-3-(2-(methyl(propyl)amino)ethyl)-N1,N5-dipropyl-3-(2-(dimethylethoxysilyl)ethyl)pentane-1,3-diamine,
N1,N5-dimethyl-3-(2-(methyl(propyl)amino)ethyl)-N1,N5-dipropyl-3-(2-(diethylethoxysilyl)ethyl)pentane-1,3-diamine,
N1,N5-dimethyl-3-(2-(methyl(propyl)amino)ethyl)-N1,N5-dipropyl-3-(2-(ethylmethylethoxysilyl)ethyl)pentane-1,3-diamine,
N1,N5-diethyl-3-(2-(ethyl(propyl)amino)ethyl)-N1,N5-dipropyl-3-(2-(trimethoxysilyl)ethyl)pentane-1,3-diamine,
N1,N5-diethyl-3-(2-(ethyl(propyl)amino)ethyl)-N1,N5-dipropyl-3-(2-(methyldimethoxysilyl)ethyl)pentane-1,3-diamine,
N1,N5-diethyl-3-(2-(ethyl(propyl)amino)ethyl)-N1,N5-dipropyl-3-(2-(ethyldimethoxysilyl)ethyl)pentane-1,3-diamine,
N1,N5-diethyl-3-(2-(ethyl(propyl)amino)ethyl)-N1,N5-dipropyl-3-(2-(dimethylmethoxysilyl)ethyl)pentane-1,3-diamine,
N1,N5-diethyl-3-(2-(ethyl(propyl)amino)ethyl)-N1,N5-dipropyl-3-(2-(diethylmethoxysilyl)ethyl)pentane-1,3-diamine,
N1,N5-diethyl-3-(2-(ethyl(propyl)amino)ethyl)-N1,N5-dipropyl-3-(2-(ethylmethylmethoxysilyl)ethyl)pentane-1,3-diamine,
N1,N5-diethyl-3-(2-(ethyl(propyl)amino)ethyl)-N1,N5-dipropyl-3-(2-(triethoxysilyl)ethyl)pentane-1,3-diamine,
N1,N5-diethyl-3-(2-(ethyl(propyl)amino)ethyl)-N1,N5-dipropyl-3-(2-(methyldiethoxysilyl)ethyl)pentane-1,3-diamine,
N1,N5-diethyl-3-(2-(ethyl(propyl)amino)ethyl)-N1,N5-dipropyl-3-(2-(ethyldiethoxysilyl)ethyl)pentane-1,3-diamine,
N1,N5-diethyl-3-(2-(ethyl(propyl)amino)ethyl)-N1,N5-dipropyl-3-(2-(dimethylethoxysilyl)ethyl)pentane-1,3-diamine, N1,N5-diethyl-3-(2-(ethyl(propyl)amino)ethyl)-N1,N5-dipropyl-3-(2-(diethylethoxysilyl)ethyl)pentane-1,3-diamine,
N1,N5-diethyl-3-(2-(ethyl(propyl)amino)ethyl)-N1,N5-dipropyl-3-(2-(ethylmethylethoxysilyl)ethyl)pentane-1,3-diamine,
2-((dimethylamino)methyl)-N1,N1,N3,N3-tetramethyl-2-((trimethoxysilyl)methyl)propane-1,3-diamine,
2-((dimethylamino)methyl)-N1,N1,N3,N3-tetramethyl-2-((methyldimethoxysilyl)methyl)propane-1,3-diamine,
2-((dimethylamino)methyl)-N1,N1,N3,N3-tetramethyl-2-((ethyldimethoxysilyl)methyl)propane-1,3-diamine,
2-((dimethylamino)methyl)-N1,N1,N3,N3-tetramethyl-2-((dimethylmethoxysilyl)methyl)propane-1,3-diamine,
2-((dimethylamino)methyl)-N1,N1,N3,N3-tetramethyl-2-((diethylmethoxysilyl)methyl)propane-1,3-diamine,
2-((dimethylamino)methyl)-N1,N1,N3,N3-tetramethyl-2-((ethylmethylmethoxysilyl)methyl)propane-1,3-diamine,
2-((dimethylamino)methyl)-N1,N1,N3,N3-tetramethyl-2-((triethoxysilyl)methyl)propane-1,3-diamine,
2-((dimethylamino)methyl)-N1,N1,N3,N3-tetramethyl-2-((methyldiethoxysilyl)methyl)propane-1,3-diamine,
2-((dimethylamino)methyl)-N1,N1,N3,N3-tetramethyl-2-((ethyldiethoxysilyl)methyl)propane-1,3-diamine,
2-((dimethylamino)methyl)-N1,N1,N3,N3-tetramethyl-2-((dimethylethoxysilyl)methyl)propane-1,3-diamine,
2-((dimethylamino)methyl)-N1,N1,N3,N3-tetramethyl-2-((diethylethoxysilyl)methyl)propane-1,3-diamine,
2-((dimethylamino)methyl)-N1,N1,N3,N3-tetramethyl-2-((ethylmethylethoxysilyl)methyl)propane-1,3-diamine,
2-((diethylamino)methyl)-N1,N1,N3,N3-tetraethyl-2-((trimethoxysilyl)methyl)propane-1,3-diamine,
2-((diethylamino)methyl)-N1,N1,N3,N3-tetraethyl-2-((methyldimethoxysilyl)methyl)propane-1,3-diamine,
2-((diethylamino)methyl)-N1,N1,N3,N3-tetraethyl-2-((ethyldimethoxysilyl)methyl)propane-1,3-diamine,
2-((diethylamino)methyl)-N1,N1,N3,N3-tetraethyl-2-((dimethylmethoxysilyl)methyl)propane-1,3-diamine,
2-((diethylamino)methyl)-N1,N1,N3,N3-tetraethyl-2-((diethylmethoxysilyl)methyl)propane-1,3-diamine,
2-((diethylamino)methyl)-N1,N1,N3,N3-tetraethyl-2-((ethylmethylmethoxysilyl)methyl)propane-1,3-diamine,
2-((diethylamino)methyl)-N1,N1,N3,N3-tetraethyl-2-((triethoxysilyl)methyl)propane-1,3-diamine,
2-((diethylamino)methyl)-N1,N1,N3,N3-tetraethyl-2-((methyldiethoxysilyl)methyl)propane-1,3-diamine,
2-((diethylamino)methyl)-N1,N1,N3,N3-tetraethyl-2-((ethyldiethoxysilyl)methyl)propane-1,3-diamine,
2-((diethylamino)methyl)-N1,N1,N3,N3-tetraethyl-2-((dimethylethoxysilyl)methyl)propane-1,3-diamine,
2-((diethylamino)methyl)-N1,N1,N3,N3-tetraethyl-2-((diethylethoxysilyl)methyl)propane-1,3-diamine,
2-((diethylamino)methyl)-N1,N1,N3,N3-tetraethyl-2-((ethylmethylethoxysilyl)methyl)propane-1,3-diamine,
2-((dipropylamino)methyl)-N1,N1,N3,N3-tetrapropyl-2-((trimethoxysilyl)methyl)propane-1,3-diamine,
2-((dipropylamino)methyl)-N1,N1,N3,N3-tetrapropyl-2-((methyldimethoxysilyl)methyl)propane-1,3-diamine,
2-((dipropylamino)methyl)-N1,N1,N3,N3-tetrapropyl-2-((ethyldimethoxysilyl)methyl)propane-1,3-diamine,
2-((dipropylamino)methyl)-N1,N1,N3,N3-tetrapropyl-2-((dimethylmethoxysilyl)methyl)propane-1,3-diamine,
2-((dipropylamino)methyl)-N1,N1,N3,N3-tetrapropyl-2-((diethylmethoxysilyl)methyl)propane-1,3-diamine,
2-((dipropylamino)methyl)-N1,N1,N3,N3-tetrapropyl-2-((ethylmethylmethoxysilyl)methyl)propane-1,3-diamine,
2-((dipropylamino)methyl)-N1,N1,N3,N3-tetrapropyl-2-((triethoxysilyl)methyl)propane-1,3-diamine,
2-((dipropylamino)methyl)-N1,N1,N3,N3-tetrapropyl-2-((methyldiethoxysilyl)methyl)propane-1,3-diamine,
2-((dipropylamino)methyl)-N1,N1,N3,N3-tetrapropyl-2-((ethyldiethoxysilyl)methyl)propane-1,3-diamine,
2-((dipropylamino)methyl)-N1,N1,N3,N3-tetrapropyl-2-((dimethylethoxysilyl)methyl)propane-1,3-diamine,
2-((dipropylamino)methyl)-N1,N1,N3,N3-tetrapropyl-2-((diethylethoxysilyl)methyl)propane-1,3-diamine,
2-((dipropylamino)methyl)-N1,N1,N3,N3-tetrapropyl-2-((ethylmethylethoxysilyl)methyl)propane-1,3-diamine,
N1,N3-diethyl-2-((ethyl(methyl)amino)methyl)-N1,N3-dimethyl-2-((trimethoxysilyl)methyl)propane-1,3-diamine,
N1,N3-diethyl-2-((ethyl(methyl)amino)methyl)-N1,N3-dimethyl-2-((methyldimethoxysilyl)methyl)propane-1,3-diamine,
N1,N3-diethyl-2-((ethyl(methyl)amino)methyl)-N1,N3-dimethyl-2-((ethyldimethoxysilyl)methyl)propane-1,3-diamine,
N1,N3-diethyl-2-((ethyl(methyl)amino)methyl)-N1,N3-dimethyl-2-((dimethylmethoxysilyl)methyl)propane-1,3-diamine,
N1,N3-diethyl-2-((ethyl(methyl)amino)methyl)-N1,N3-dimethyl-2-((diethylmethoxysilyl)methyl)propane-1,3-diamine,
N1,N3-diethyl-2-((ethyl(methyl)amino)methyl)-N1,N3-dimethyl-2-((ethylmethylmethoxysilyl)methyl)propane-1,3-diamine,
N1,N3-diethyl-2-((ethyl(methyl)amino)methyl)-N1,N3-dimethyl-2-((triethoxysilyl)methyl)propane-1,3-diamine,
N1,N3-diethyl-2-((ethyl(methyl)amino)methyl)-N1,N3-dimethyl-2-((methyldiethoxysilyl)methyl)propane-1,3-diamine,
N1,N3-diethyl-2-((ethyl(methyl)amino)methyl)-N1,N3-dimethyl-2-((ethyldiethoxysilyl)methyl)propane-1,3-diamine,
N1,N3-diethyl-2-((ethyl(methyl)amino)methyl)-N1,N3-dimethyl-2-((dimethylethoxysilyl)methyl)propane-1,3-diamine,
N1,N3-diethyl-2-((ethyl(methyl)amino)methyl)-N1,N3-dimethyl-2-((diethylethoxysilyl)methyl)propane-1,3-diamine,
N1,N3-diethyl-2-((ethyl(methyl)amino)methyl)-N1,N3-dimethyl-2-((ethylmethylethoxysilyl)methyl)propane-1,3-diamine,
N1,N3-dimethyl-2-((methyl(propyl)amino)methyl)-N1,N3-dipropyl-2-((trimethoxysilyl)methyl)propane-1,3-diamine,
N1,N3-dimethyl-2-((methyl(propyl)amino)methyl)-N1,N3-dipropyl-2-((methyldimethoxysilyl)methyl)propane-1,3-diamine,
N1,N3-dimethyl-2-((methyl(propyl)amino)methyl)-N1,N3-dipropyl-2-((ethyldimethoxysilyl)methyl)propane-1,3-diamine,
N1,N3-dimethyl-2-((methyl(propyl)amino)methyl)-N1,N3-dipropyl-2-((dimethylmethoxysilyl)methyl)propane-1,3-diamine, N1,N3-dimethyl-2-((methyl(propyl)amino)methyl)-N1,N3-dipropyl-2-((diethylmethoxysilyl)methyl)propane-1,3-diamine,
N1,N3-dimethyl-2-((methyl(propyl)amino)methyl)-N1,N3-dipropyl-2-((ethylmethylmethoxysilyl)methyl)propane-1,3-diamine,
N1,N3-dimethyl-2-((methyl(propyl)amino)methyl)-N1,N3-dipropyl-2-((triethoxysilyl)methyl)propane-1,3-diamine,
N1,N3-dimethyl-2-((methyl(propyl)amino)methyl)-N1,N3-dipropyl-2-((methyldiethoxysilyl)methyl)propane-1,3-diamine,
N1,N3-dimethyl-2-((methyl(propyl)amino)methyl)-N1,N3-dipropyl-2-((ethyldiethoxysilyl)methyl)propane-1,3-diamine,
N1,N3-dimethyl-2-((methyl(propyl)amino)methyl)-N1,N3-dipropyl-2-((dimethylethoxysilyl)methyl)propane-1,3-diamine,
N1,N3-dimethyl-2-((methyl(propyl)amino)methyl)-N1,N3-dipropyl-2-((diethylethoxysilyl)methyl)propane-1,3-diamine,
N1,N3-dimethyl-2-((methyl(propyl)amino)methyl)-N1,N3-dipropyl-2-((ethylmethylethoxysilyl)methyl)propane-1,3-diamine,
N1,N3-diethyl-2-((ethyl(propyl)amino)methyl)-N1,N3-dipropyl-2-((trimethoxysilyl)methyl)propane-1,3-diamine,
N1,N3-diethyl-2-((ethyl(propyl)amino)methyl)-N1,N3-dipropyl-2-((methyldimethoxysilyl)methyl)propane-1,3-diamine,
N1,N3-diethyl-2-((ethyl(propyl)amino)methyl)-N1,N3-dipropyl-2-((ethyldimethoxysilyl)methyl)propane-1,3-diamine,
N1,N3-diethyl-2-((ethyl(propyl)amino)methyl)-N1,N3-dipropyl-2-((dimethylmethoxysilyl)methyl)propane-1,3-diamine,
N1,N3-diethyl-2-((ethyl(propyl)amino)methyl)-N1,N3-dipropyl-2-((diethylmethoxysilyl)methyl)propane-1,3-diamine,
N1,N3-diethyl-2-((ethyl(propyl)amino)methyl)-N1,N3-dipropyl-2-((ethylmethylmethoxysilyl)methyl)propane-1,3-diamine,
N1,N3-diethyl-2-((ethyl(propyl)amino)methyl)-N1,N3-dipropyl-2-((triethoxysilyl)methyl)propane-1,3-diamine,
N1,N3-diethyl-2-((ethyl(propyl)amino)methyl)-N1,N3-dipropyl-2-((methyldiethoxysilyl)methyl)propane-1,3-diamine,
N1,N3-diethyl-2-((ethyl(propyl)amino)methyl)-N1,N3-dipropyl-2-((ethyldiethoxysilyl)methyl)propane-1,3-diamine,
N1,N3-diethyl-2-((ethyl(propyl)amino)methyl)-N1,N3-dipropyl-2-((dimethylethoxysilyl)methyl)propane-1,3-diamine,
N1,N3-diethyl-2-((ethyl(propyl)amino)methyl)-N1,N3-dipropyl-2-((diethylethoxysilyl)methyl)propane-1,3-diamine,
N1,N3-diethyl-2-((ethyl(propyl)amino)methyl)-N1,N3-dipropyl-2-((ethylmethylethoxysilyl)methyl)propane-1,3-diamine,
2-((dimethylamino)methyl)-N1,N1,N3,N3-tetramethyl-2-(2-(trimethoxysilyl)ethyl)propane-1,3-diamine,
2-((dimethylamino)methyl)-N1,N1,N3,N3-tetramethyl-2-(2-(methyldimethoxysilyl)ethyl)propane-1,3-diamine,
2-((dimethylamino)methyl)-N1,N1,N3,N3-tetramethyl-2-(2-(ethyldimethoxysilyl)ethyl)propane-1,3-diamine,
2-((dimethylamino)methyl)-N1,N1,N3,N3-tetramethyl-2-(2-(dimethylmethoxysilyl)ethyl)propane-1,3-diamine,
2-((dimethylamino)methyl)-N1,N1,N3,N3-tetramethyl-2-(2-(diethylmethoxysilyl)ethyl)propane-1,3-diamine,
2-((dimethylamino)methyl)-N1,N1,N3,N3-tetramethyl-2-(2-(ethylmethylmethoxysilyl)ethyl)propane-1,3-diamine,
2-((dimethylamino)methyl)-N1,N1,N3,N3-tetramethyl-2-(2-(triethoxysilyl)ethyl)propane-1,3-diamine,
2-((dimethylamino)methyl)-N1,N1,N3,N3-tetramethyl-2-(2-(methyldiethoxysilyl)ethyl)propane-1,3-diamine,
2-((dimethylamino)methyl)-N1,N1,N3,N3-tetramethyl-2-(2-(ethyldiethoxysilyl)ethyl)propane-1,3-diamine,
2-((dimethylamino)methyl)-N1,N1,N3,N3-tetramethyl-2-(2-(dimethylethoxysilyl)ethyl)propane-1,3-diamine,
2-((dimethylamino)methyl)-N1,N1,N3,N3-tetramethyl-2-(2-(diethylethoxysilyl)ethyl)propane-1,3-diamine,
2-((dimethylamino)methyl)-N1,N1,N3,N3-tetramethyl-2-(2-(ethylmethylethoxysilyl)ethyl)propane-1,3-diamine,
2-((diethylamino)methyl)-N1,N1,N3,N3-tetraethyl-2-(2-(trimethoxysilyl)ethyl)propane-1,3-diamine,
2-((diethylamino)methyl)-N1,N1,N3,N3-tetraethyl-2-(2-(methyldimethoxysilyl)ethyl)propane-1,3-diamine,
2-((diethylamino)methyl)-N1,N1,N3,N3-tetraethyl-2-(2-(ethyldimethoxysilyl)ethyl)propane-1,3-diamine,
2-((diethylamino)methyl)-N1,N1,N3,N3-tetraethyl-2-(2-(dimethylmethoxysilyl)ethyl)propane-1,3-diamine,
2-((diethylamino)methyl)-N1,N1,N3,N3-tetraethyl-2-(2-(diethylmethoxysilyl)ethyl)propane-1,3-diamine,
2-((diethylamino)methyl)-N1,N1,N3,N3-tetraethyl-2-(2-(ethylmethylmethoxysilyl)ethyl)propane-1,3-diamine,
2-((diethylamino)methyl)-N1,N1,N3,N3-tetraethyl-2-(2-(triethoxysilyl)ethyl)propane-1,3-diamine,
2-((diethylamino)methyl)-N1,N1,N3,N3-tetraethyl-2-(2-(methyldiethoxysilyl)ethyl)propane-1,3-diamine,
2-((diethylamino)methyl)-N1,N1,N3,N3-tetraethyl-2-(2-(ethyldiethoxysilyl)ethyl)propane-1,3-diamine,
2-((diethylamino)methyl)-N1,N1,N3,N3-tetraethyl-2-(2-(dimethylethoxysilyl)ethyl)propane-1,3-diamine,
2-((diethylamino)methyl)-N1,N1,N3,N3-tetraethyl-2-(2-(diethylethoxysilyl)ethyl)propane-1,3-diamine,
2-((diethylamino)methyl)-N1,N1,N3,N3-tetraethyl-2-(2-(ethylmethylethoxysilyl)ethyl)propane-1,3-diamine,
2-((dipropylamino)methyl)-N1,N1,N3,N3-tetrapropyl-2-(2-(trimethoxysilyl)ethyl)propane-1,3-diamine,
2-((dipropylamino)methyl)-N1,N1,N3,N3-tetrapropyl-2-(2-(methyldimethoxysilyl)ethyl)propane-1,3-diamine,
2-((dipropylamino)methyl)-N1,N1,N3,N3-tetrapropyl-2-(2-(ethyldimethoxysilyl)ethyl)propane-1,3-diamine,
2-((dipropylamino)methyl)-N1,N1,N3,N3-tetrapropyl-2-(2-(dimethylmethoxysilyl)ethyl)propane-1,3-diamine,
2-((dipropylamino)methyl)-N1,N1,N3,N3-tetrapropyl-2-(2-(diethylmethoxysilyl)ethyl)propane-1,3-diamine,
2-((dipropylamino)methyl)-N1,N1,N3,N3-tetrapropyl-2-(2-(ethylmethylmethoxysilyl)ethyl)propane-1,3-diamine,
2-((dipropylamino)methyl)-N1,N1,N3,N3-tetrapropyl-2-(2-(triethoxysilyl)ethyl)propane-1,3-diamine,
2-((dipropylamino)methyl)-N1,N1,N3,N3-tetrapropyl-2-(2-(methyldiethoxysilyl)ethyl)propane-1,3-diamine,
2-((dipropylamino)methyl)-N1,N1,N3,N3-tetrapropyl-2-(2-(ethyldiethoxysilyl)ethyl)propane-1,3-diamine,
2-((dipropylamino)methyl)-N1,N1,N3,N3-tetrapropyl-2-(2-(dimethylethoxysilyl)ethyl)propane-1,3-diamine, 2-((dipropylamino)methyl)-N1,N1,N3,N3-tetrapropyl-2-(2-(diethylethoxysilyl)ethyl)propane-1,3-diamine, 2-((dipropylamino)methyl)-N1,N1,N3,N3-tetrapropyl-2-(2-(ethylmethylethoxysilyl)ethyl)propane-1,3-diamine, N1,N3-diethyl-2-(2-(ethyl(methyl)amino)methyl)-N1,N3-dimethyl-2-(2-(trimethoxysilyl)ethyl)propane-1,3-diamine, N1,N3-diethyl-2-(2-(ethyl(methyl)amino)methyl)-N1,N3-dimethyl-2-(2-(methyldimethoxysilyl)ethyl)propane-1,3-diamine, N1,N3-diethyl-2-(2-(ethyl(methyl)amino)methyl)-N1,N3-dimethyl-2-(2-(ethyldimethoxysilyl)ethyl)propane-1,3-diamine, N1,N3-diethyl-2-(2-(ethyl(methyl)amino)methyl)-N1,N3-dimethyl-2-(2-(dimethylmethoxysilyl)ethyl)propane-1,3-diamine, N1,N3-diethyl-2-(2-(ethyl(methyl)amino)methyl)-N1,N3-dimethyl-2-(2-(diethylmethoxysilyl)ethyl)propane-1,3-diamine, N1,N3-diethyl-2-(2-(ethyl(methyl)amino)methyl)-N1,N3-dimethyl-2-(2-(ethylmethylmethoxysilyl)ethyl)propane-1,3-diamine, N1,N3-diethyl-2-(2-(ethyl(methyl)amino)methyl)-N1,N3-dimethyl-2-(2-(triethoxysilyl)ethyl)propane-1,3-diamine, N1,N3-diethyl-2-(2-(ethyl(methyl)amino)methyl)-N1,N3-dimethyl-2-(2-(methyldiethoxysilyl)ethyl)propane-1,3-diamine, N1,N3-diethyl-2-(2-(ethyl(methyl)amino)methyl)-N1,N3-dimethyl-2-(2-(ethyldiethoxysilyl)ethyl)propane-1,3-diamine, N1,N3-diethyl-2-(2-(ethyl(methyl)amino)methyl)-N1,N3-dimethyl-2-(2-(dimethylethoxysilyl)ethyl)propane-1,3-diamine, N1,N3-diethyl-2-(2-(ethyl(methyl)amino)methyl)-N1,N3-dimethyl-2-(2-(diethylethoxysilyl)ethyl)propane-1,3-diamine, N1,N3-diethyl-2-(2-(ethyl(methyl)amino)methyl)-N1,N3-dimethyl-2-(2-(ethylmethylethoxysilyl)ethyl)propane-1,3-diamine, N1,N3-dimethyl-2-(2-(methyl(propyl)amino)methyl)-N1,N3-dipropyl-2-(2-(trimethoxysilyl)ethyl)propane-1,3-diamine, N1,N3-dimethyl-2-(2-(methyl(propyl)amino)methyl)-N1,N3-dipropyl-2-(2-(methyldimethoxysilyl)ethyl)propane-1,3-diamine, N1,N3-dimethyl-2-(2-(methyl(propyl)amino)methyl)-N1,N3-dipropyl-2-(2-(ethyldimethoxysilyl)ethyl)propane-1,3-diamine, N1,N3-dimethyl-2-(2-(methyl(propyl)amino)methyl)-N1,N3-dipropyl-2-(2-(dimethylmethoxysilyl)ethyl)propane-1,3-diamine, N1,N3-dimethyl-2-(2-(methyl(propyl)amino)methyl)-N1,N3-dipropyl-2-(2-(diethylmethoxysilyl)ethyl)propane-1,3-diamine, N1,N3-dimethyl-2-(2-(methyl(propyl)amino)methyl)-N1,N3-dipropyl-2-(2-(ethylmethylmethoxysilyl)ethyl)propane-1,3-diamine, N1,N3-dimethyl-2-(2-(methyl(propyl)amino)methyl)-N1,N3-dipropyl-2-(2-(triethoxysilyl)ethyl)propane-1,3-diamine, N1,N3-dimethyl-2-(2-(methyl(propyl)amino)methyl)-N1,N3-dipropyl-2-(2-(methyldiethoxysilyl)ethyl)propane-1,3-diamine, N1,N3-dimethyl-2-(2-(methyl(propyl)amino)methyl)-N1,N3-dipropyl-2-(2-(ethyldiethoxysilyl)ethyl)propane-1,3-diamine, N1,N3-dimethyl-2-(2-(methyl(propyl)amino)methyl)-N1,N3-dipropyl-2-(2-(dimethylethoxysilyl)ethyl)propane-1,3-diamine, N1,N3-dimethyl-2-(2-(methyl(propyl)amino)methyl)-N1,N3-dipropyl-2-(2-(diethylethoxysilyl)ethyl)propane-1,3-diamine, N1,N3-dimethyl-2-(2-(methyl(propyl)amino)methyl)-N1,N3-dipropyl-2-(2-(ethylmethylethoxysilyl)ethyl)propane-1,3-diamine, N1,N3-diethyl-2-(2-(ethyl(propyl)amino)methyl)-N1,N3-dipropyl-2-(2-(trimethoxysilyl)ethyl)propane-1,3-diamine, N1,N3-diethyl-2-(2-(ethyl(propyl)amino)methyl)-N1,N3-dipropyl-2-(2-(methyldimethoxysilyl)ethyl)propane-1,3-diamine, N1,N3-diethyl-2-(2-(ethyl(propyl)amino)methyl)-N1,N3-dipropyl-2-(2-(ethyldimethoxysilyl)ethyl)propane-1,3-diamine, N1,N3-diethyl-2-(2-(ethyl(propyl)amino)methyl)-N1,N3-dipropyl-2-(2-(dimethylmethoxysilyl)ethyl)propane-1,3-diamine, N1,N3-diethyl-2-(2-(ethyl(propyl)amino)methyl)-N1,N3-dipropyl-2-(2-(diethylmethoxysilyl)ethyl)propane-1,3-diamine, N1,N3-diethyl-2-(2-(ethyl(propyl)amino)methyl)-N1,N3-dipropyl-2-(2-(ethylmethylmethoxysilyl)ethyl)propane-1,3-diamine, N1,N3-diethyl-2-(2-(ethyl(propyl)amino)methyl)-N1,N3-dipropyl-2-(2-(triethoxysilyl)ethyl)propane-1,3-diamine, N1,N3-diethyl-2-(2-(ethyl(propyl)amino)methyl)-N1,N3-dipropyl-2-(2-(methyldiethoxysilyl)ethyl)propane-1,3-diamine, N1,N3-diethyl-2-(2-(ethyl(propyl)amino)methyl)-N1,N3-dipropyl-2-(2-(ethyldiethoxysilyl)ethyl)propane-1,3-diamine, N1,N3-diethyl-2-(2-(ethyl(propyl)amino)methyl)-N1,N3-dipropyl-2-(2-(dimethylethoxysilyl)ethyl)propane-1,3-diamine, N1,N3-diethyl-2-(2-(ethyl(propyl)amino)methyl)-N1,N3-dipropyl-2-(2-(diethylethoxysilyl)ethyl)propane-1,3-diamine, and N1,N3-diethyl-2-(2-(ethyl(propyl)amino)methyl)-N1,N3-dipropyl-2-(2-(ethylmethylethoxysilyl)ethyl)propane-1,3-diamine.

8. The terminal modifier of claim 2, wherein the terminal modifier represented by Formula 1c is selected from the group consisting of:

N1-(3-(dimethylamino)propyl)-N3,N3-dimethyl-N1-(3-(trimethoxysilyl)propyl)propane-1,3-diamine, N1-(3-(dimethylamino)propyl)-N3,N3-dimethyl-N1-(3-(methyldimethoxysilyl)propyl)propane-1,3-diamine, N1-(3-(dimethylamino)propyl)-N3,N3-dimethyl-N1-(3-(ethyldimethoxysilyl)propyl)propane-1,3-diamine, N1-(3-(dimethylamino)propyl)-N3,N3-dimethyl-N1-(3-(dimethylmethoxysilyl)propyl)propane-1,3-diamine, N1-(3-(dimethylamino)propyl)-N3,N3-dimethyl-N1-(3-(diethylmethoxysilyl)propyl)propane-1,3-diamine, N1-(3-(dimethylamino)propyl)-N3,N3-dimethyl-N1-(3-(ethylmethylmethoxysilyl)propyl)propane-1,3-diamine, N1-(3-(dimethylamino)propyl)-N3,N3-dimethyl-N1-(3-(triethoxysilyl)propyl)propane-1,3-diamine, N1-(3-(dimethylamino)propyl)-N3,N3-dimethyl-N1-(3-(methyldiethoxysilyl)propyl)propane-1,3-diamine, N1-(3-(dimethylamino)propyl)-N3,N3-dimethyl-N1-(3-(ethyldiethoxysilyl)propyl)propane-1,3-diamine, N1-(3-(dimethylamino)propyl)-N3,N3-dimethyl-N1-(3-(dimethylethoxysilyl)propyl)propane-1,3-diamine,
N1-(3-(dimethylamino)propyl)-N3,N3-dimethyl-N1-(3-(diethylethoxysilyl)propyl)propane-1,3-diamine,
N1-(3-(dimethylamino)propyl)-N3,N3-dimethyl-N1-(3-(ethylmethylethoxysilyl)propyl)propane-1,3-diamine,
N1-(3-(diethylamino)propyl)-N3,N3-diethyl-N1-(3-(trimethoxysilyl)propyl)propane-1,3-diamine,
N1-(3-(diethylamino)propyl)-N3,N3-diethyl-N1-(3-(methyldimethoxysilyl)propyl)propane-1,3-diamine,
N1-(3-(diethylamino)propyl)-N3,N3-diethyl-N1-(3-(ethyldimethoxysilyl)propyl)propane-1,3-diamine,
N1-(3-(diethylamino)propyl)-N3,N3-diethyl-N1-(3-(dimethylmethoxysilyl)propyl)propane-1,3-diamine,
N1-(3-(diethylamino)propyl)-N3,N3-diethyl-N1-(3-(diethylmethoxysilyl)propyl)propane-1,3-diamine,
N1-(3-(diethylamino)propyl)-N3,N3-diethyl-N1-(3-(ethylmethylmethoxysilyl)propyl)propane-1,3-diamine,
N1-(3-(diethylamino)propyl)-N3,N3-diethyl-N1-(3-(triethoxysilyl)propyl)propane-1,3-diamine,
N1-(3-(diethylamino)propyl)-N3,N3-diethyl-N1-(3-(methyldiethoxysilyl)propyl)propane-1,3-diamine,
N1-(3-(diethylamino)propyl)-N3,N3-diethyl-N1-(3-(ethyldiethoxysilyl)propyl)propane-1,3-diamine,
N1-(3-(diethylamino)propyl)-N3,N3-diethyl-N1-(3-(dimethylethoxysilyl)propyl)propane-1,3-diamine,
N1-(3-(diethylamino)propyl)-N3,N3-diethyl-N1-(3-(diethylethoxysilyl)propyl)propane-1,3-diamine,
N1-(3-(diethylamino)propyl)-N3,N3-diethyl-N1-(3-(ethylmethylethoxysilyl)propyl)propane-1,3-diamine,
N1-(3-(dipropylamino)propyl)-N3,N3-dipropyl-N1-(3-(trimethoxysilyl)propyl)propane-1,3-diamine,
N1-(3-(dipropylamino)propyl)-N3,N3-dipropyl-N1-(3-(methyldimethoxysilyl)propyl)propane-1,3-diamine,
N1-(3-(dipropylamino)propyl)-N3,N3-dipropyl-N1-(3-(ethyldimethoxysilyl)propyl)propane-1,3-diamine,
N1-(3-(dipropylamino)propyl)-N3,N3-dipropyl-N1-(3-(dimethylmethoxysilyl)propyl)propane-1,3-diamine,
N1-(3-(dipropylamino)propyl)-N3,N3-dipropyl-N1-(3-(diethylmethoxysilyl)propyl)propane-1,3-diamine,
N1-(3-(dipropylamino)propyl)-N3,N3-dipropyl-N1-(3-(ethylmethylmethoxysilyl)propyl)propane-1,3-diamine,
N1-(3-(dipropylamino)propyl)-N3,N3-dipropyl-N1-(3-(triethoxysilyl)propyl)propane-1,3-diamine,
N1-(3-(dipropylamino)propyl)-N3,N3-dipropyl-N1-(3-(methyldiethoxysilyl)propyl)propane-1,3-diamine,
N1-(3-(dipropylamino)propyl)-N3,N3-dipropyl-N1-(3-(ethyldiethoxysilyl)propyl)propane-1,3-diamine,
N1-(3-(dipropylamino)propyl)-N3,N3-dipropyl-N1-(3-(dimethylethoxysilyl)propyl)propane-1,3-diamine,
N1-(3-(dipropylamino)propyl)-N3,N3-dipropyl-N1-(3-(diethylethoxysilyl)propyl)propane-1,3-diamine,
N1-(3-(dipropylamino)propyl)-N3,N3-dipropyl-N1-(3-(ethylmethylethoxysilyl)propyl)propane-1,3-diamine,
N1-ethyl-N3-(3-(ethylmethylamino)propyl)-N1-methyl-N3-(3-(trimethoxysilyl)propyl)propane-1,3-diamine,
N1-ethyl-N3-(3-(ethylmethylamino)propyl)-N1-methyl-N3-(3-(methyldimethoxysilyl)propyl)propane-1,3-diamine,
N1-ethyl-N3-(3-(ethylmethylamino)propyl)-N1-methyl-N3-(3-(ethyldimethoxysilyl)propyl)propane-1,3-diamine,
N1-ethyl-N3-(3-(ethylmethylamino)propyl)-N1-methyl-N3-(3-(dimethylmethoxysilyl)propyl)propane-1,3-diamine,
N1-ethyl-N3-(3-(ethylmethylamino)propyl)-N1-methyl-N3-(3-(diethylmethoxysilyl)propyl)propane-1,3-diamine,
N1-ethyl-N3-(3-(ethylmethylamino)propyl)-N1-methyl-N3-(3-(ethylmethylmethoxysilyl)propyl)propane-1,3-diamine,
N1-ethyl-N3-(3-(ethylmethylamino)propyl)-N1-methyl-N3-(3-(triethoxysilyl)propyl)propane-1,3-diamine,
N1-ethyl-N3-(3-(ethylmethylamino)propyl)-N1-methyl-N3-(3-(methyldiethoxysilyl)propyl)propane-1,3-diamine,
N1-ethyl-N3-(3-(ethylmethylamino)propyl)-N1-methyl-N3-(3-(ethyldiethoxysilyl)propyl)propane-1,3-diamine,
N1-ethyl-N3-(3-(ethylmethylamino)propyl)-N1-methyl-N3-(3-(dimethylethoxysilyl)propyl)propane-1,3-diamine,
N1-ethyl-N3-(3-(ethylmethylamino)propyl)-N1-methyl-N3-(3-(diethylethoxysilyl)propyl)propane-1,3-diamine,
N1-ethyl-N3-(3-(ethylmethylamino)propyl)-N1-methyl-N3-(3-(ethylmethylethoxysilyl)propyl)propane-1,3-diamine,
N1-methyl-N3-(3-(methylpropylamino)propyl)-N1-propyl-N3-(3-(trimethoxysilyl)propyl)propane-1,3-diamine,
N1-methyl-N3-(3-(methylpropylamino)propyl)-N1-propyl-N3-(3-(methyldimethoxysilyl)propyl)propane-1,3-diamine,
N1-methyl-N3-(3-(methylpropylamino)propyl)-N1-propyl-N3-(3-(ethyldimethoxysilyl)propyl)propane-1,3-diamine,
N1-methyl-N3-(3-(methylpropylamino)propyl)-N1-propyl-N3-(3-(dimethylmethoxysilyl)propyl)propane-1,3-diamine,
N1-methyl-N3-(3-(methylpropylamino)propyl)-N1-propyl-N3-(3-(diethylmethoxysilyl)propyl)propane-1,3-diamine,
N1-methyl-N3-(3-(methylpropylamino)propyl)-N1-propyl-N3-(3-(ethylmethylmethoxysilyl)propyl)propane-1,3-diamine,
N1-methyl-N3-(3-(methylpropylamino)propyl)-N1-propyl-N3-(3-(triethoxysilyl)propyl)propane-1,3-diamine,
N1-methyl-N3-(3-(methylpropylamino)propyl)-N1-propyl-N3-(3-(methyldiethoxysilyl)propyl)propane-1,3-diamine,
N1-methyl-N3-(3-(methylpropylamino)propyl)-N1-propyl-N3-(3-(ethyldiethoxysilyl)propyl)propane-1,3-diamine,
N1-methyl-N3-(3-(methylpropylamino)propyl)-N1-propyl-N3-(3-(dimethylethoxysilyl)propyl)propane-1,3-diamine,
N1-methyl-N3-(3-(methylpropylamino)propyl)-N1-propyl-N3-(3-(diethylethoxysilyl)propyl)propane-1,3-diamine,
N1-methyl-N3-(3-(methylpropylamino)propyl)-N1-propyl-N3-(3-(ethylmethylethoxysilyl)propyl)propane-1,3-diamine,
N1-ethyl-N3-(3-(ethylpropylamino)propyl)-N1-propyl-N3-(3-(trimethoxysilyl)propyl)propane-1,3-diamine,
N1-ethyl-N3-(3-(ethylpropylamino)propyl)-N1-propyl-N3-(3-(methyldimethoxysilyl)propyl)propane-1,3-diamine,
N1-ethyl-N3-(3-(ethylpropylamino)propyl)-N1-propyl-N3-(3-(ethyldimethoxysilyl)propyl)propane-1,3-diamine, N1-ethyl-N3-(3-(ethylpropylamino)propyl)-N1-propyl-N3-(3-(dimethylmethoxysilyl)propyl)propane-1,3-diamine,
N1-ethyl-N3-(3-(ethylpropylamino)propyl)-N1-propyl-N3-(3-(diethylmethoxysilyl)propyl)propane-1,3-diamine,
N1-ethyl-N3-(3-(ethylpropylamino)propyl)-N1-propyl-N3-(3-(ethylmethylmethoxysilyl)propyl)propane-1,3-diamine,
N1-ethyl-N3-(3-(ethylpropylamino)propyl)-N1-propyl-N3-(3-(triethoxysilyl)propyl)propane-1,3-diamine,
N1-ethyl-N3-(3-(ethylpropylamino)propyl)-N1-propyl-N3-(3-(methyldiethoxysilyl)propyl)propane-1,3-diamine,
N1-ethyl-N3-(3-(ethylpropylamino)propyl)-N1-propyl-N3-(3-(ethyldiethoxysilyl)propyl)propane-1,3-diamine,
N1-ethyl-N3-(3-(ethylpropylamino)propyl)-N1-propyl-N3-(3-(dimethylethoxysilyl)propyl)propane-1,3-diamine,
N1-ethyl-N3-(3-(ethylpropylamino)propyl)-N1-propyl-N3-(3-(diethylethoxysilyl)propyl)propane-1,3-diamine,
N1-ethyl-N3-(3-(ethylpropylamino)propyl)-N1-propyl-N3-(3-(ethylmethylethoxysilyl)propyl)propane-1,3-diamine,
N1-(3-(dimethylamino)propyl)-N3,N3-dimethyl-N1-(2-(trimethoxysilyl)ethyl)propane-1,3-diamine,
N1-(3-(dimethylamino)propyl)-N3,N3-dimethyl-N1-(2-(methyldimethoxysilyl)ethyl)propane-1,3-diamine,
N1-(3-(dimethylamino)propyl)-N3,N3-dimethyl-N1-(2-(ethyldimethoxysilyl)ethyl)propane-1,3-diamine,
N1-(3-(dimethylamino)propyl)-N3,N3-dimethyl-N1-(2-(dimethylmethoxysilyl)ethyl)propane-1,3-diamine,
N1-(3-(dimethylamino)propyl)-N3,N3-dimethyl-N1-(2-(diethylmethoxysilyl)ethyl)propane-1,3-diamine,
N1-(3-(dimethylamino)propyl)-N3,N3-dimethyl-N1-(2-(ethylmethylmethoxysilyl)ethyl)propane-1,3-diamine,
N1-(3-(dimethylamino)propyl)-N3,N3-dimethyl-N1-(2-(triethoxysilyl)ethyl)propane-1,3-diamine,
N1-(3-(dimethylamino)propyl)-N3,N3-dimethyl-N1-(2-(methyldiethoxysilyl)ethyl)propane-1,3-diamine,
N1-(3-(dimethylamino)propyl)-N3,N3-dimethyl-N1-(2-(ethyldiethoxysilyl)ethyl)propane-1,3-diamine,
N1-(3-(dimethylamino)propyl)-N3,N3-dimethyl-N1-(2-(dimethylethoxysilyl)ethyl)propane-1,3-diamine,
N1-(3-(dimethylamino)propyl)-N3,N3-dimethyl-N1-(2-(diethylethoxysilyl)ethyl)propane-1,3-diamine,
N1-(3-(dimethylamino)propyl)-N3,N3-dimethyl-N1-(2-(ethylmethylethoxysilyl)ethyl)propane-1,3-diamine,
N1-(3-(diethylamino)propyl)-N3,N3-diethyl-N1-(2-(trimethoxysilyl)ethyl)propane-1,3-diamine,
N1-(3-(diethylamino)propyl)-N3,N3-diethyl-N1-(2-(methyldimethoxysilyl)ethyl)propane-1,3-diamine,
N1-(3-(diethylamino)propyl)-N3,N3-diethyl-N1-(2-(ethyldimethoxysilyl)ethyl)propane-1,3-diamine,
N1-(3-(diethylamino)propyl)-N3,N3-diethyl-N1-(2-(dimethylmethoxysilyl)ethyl)propane-1,3-diamine,
N1-(3-(diethylamino)propyl)-N3,N3-diethyl-N1-(2-(diethylmethoxysilyl)ethyl)propane-1,3-diamine,
N1-(3-(diethylamino)propyl)-N3,N3-diethyl-N1-(2-(ethylmethylmethoxysilyl)ethyl)propane-1,3-diamine,
N1-(3-(diethylamino)propyl)-N3,N3-diethyl-N1-(2-(triethoxysilyl)ethyl)propane-1,3-diamine,
N1-(3-(diethylamino)propyl)-N3,N3-diethyl-N1-(2-(methyldiethoxysilyl)ethyl)propane-1,3-diamine,
N1-(3-(diethylamino)propyl)-N3,N3-diethyl-N1-(2-(ethyldiethoxysilyl)ethyl)propane-1,3-diamine,
N1-(3-(diethylamino)propyl)-N3,N3-diethyl-N1-(2-(dimethylethoxysilyl)ethyl)propane-1,3-diamine,
N1-(3-(diethylamino)propyl)-N3,N3-diethyl-N1-(2-(diethylethoxysilyl)ethyl)propane-1,3-diamine,
N1-(3-(diethylamino)propyl)-N3,N3-diethyl-N1-(2-(ethylmethylethoxysilyl)ethyl)propane-1,3-diamine,
N1-(3-(dipropylamino)propyl)-N3,N3-dipropyl-N1-(2-(trimethoxysilyl)ethyl)propane-1,3-diamine,
N1-(3-(dipropylamino)propyl)-N3,N3-dipropyl-N1-(2-(methyldimethoxysilyl)ethyl)propane-1,3-diamine,
N1-(3-(dipropylamino)propyl)-N3,N3-dipropyl-N1-(2-(ethyldimethoxysilyl)ethyl)propane-1,3-diamine,
N1-(3-(dipropylamino)propyl)-N3,N3-dipropyl-N1-(2-(dimethylmethoxysilyl)ethyl)propane-1,3-diamine,
N1-(3-(dipropylamino)propyl)-N3,N3-dipropyl-N1-(2-(diethylmethoxysilyl)ethyl)propane-1,3-diamine,
N1-(3-(dipropylamino)propyl)-N3,N3-dipropyl-N1-(2-(ethylmethylmethoxysilyl)ethyl)propane-1,3-diamine,
N1-(3-(dipropylamino)propyl)-N3,N3-dipropyl-N1-(2-(triethoxysilyl)ethyl)propane-1,3-diamine,
N1-(3-(dipropylamino)propyl)-N3,N3-dipropyl-N1-(2-(methyldiethoxysilyl)ethyl)propane-1,3-diamine,
N1-(3-(dipropylamino)propyl)-N3,N3-dipropyl-N1-(2-(ethyldiethoxysilyl)ethyl)propane-1,3-diamine,
N1-(3-(dipropylamino)propyl)-N3,N3-dipropyl-N1-(2-(dimethylethoxysilyl)ethyl)propane-1,3-diamine,
N1-(3-(dipropylamino)propyl)-N3,N3-dipropyl-N1-(2-(diethylethoxysilyl)ethyl)propane-1,3-diamine,
N1-(3-(dipropylamino)propyl)-N3,N3-dipropyl-N1-(2-(ethylmethylethoxysilyl)ethyl)propane-1,3-diamine,
N1-ethyl-N3-(3-(ethylmethylamino)propyl)-N1-methyl-N3-(2-(trimethoxysilyl)ethyl)propane-1,3-diamine,
N1-ethyl-N3-(3-(ethylmethylamino)propyl)-N1-methyl-N3-(2-(methyldimethoxysilyl)ethyl)propane-1,3-diamine,
N1-ethyl-N3-(3-(ethylmethylamino)propyl)-N1-methyl-N3-(2-(ethyldimethoxysilyl)ethyl)propane-1,3-diamine,
N1-ethyl-N3-(3-(ethylmethylamino)propyl)-N1-methyl-N3-(2-(dimethylmethoxysilyl)ethyl)propane-1,3-diamine,
N1-ethyl-N3-(3-(ethylmethylamino)propyl)-N1-methyl-N3-(2-(diethylmethoxysilyl)ethyl)propane-1,3-diamine,
N1-ethyl-N3-(3-(ethylmethylamino)propyl)-N1-methyl-N3-(2-(ethylmethylmethoxysilyl)ethyl)propane-1,3-diamine,
N1-ethyl-N3-(3-(ethylmethylamino)propyl)-N1-methyl-N3-(2-(triethoxysilyl)ethyl)propane-1,3-diamine,
N1-ethyl-N3-(3-(ethylmethylamino)propyl)-N1-methyl-N3-(2-(methyldiethoxysilyl)ethyl)propane-1,3-diamine,
N1-ethyl-N3-(3-(ethylmethylamino)propyl)-N1-methyl-N3-(2-(ethyldiethoxysilyl)ethyl)propane-1,3-diamine,
N1-ethyl-N3-(3-(ethylmethylamino)propyl)-N1-methyl-N3-(2-(dimethylethoxysilyl)ethyl)propane-1,3-diamine,
N1-ethyl-N3-(3-(ethylmethylamino)propyl)-N1-methyl-N3-(2-(diethylethoxysilyl)ethyl)propane-1,3-diamine,
N1-ethyl-N3-(3-(ethylmethylamino)propyl)-N1-methyl-N3-(2-(ethylmethylethoxysilyl)ethyl)propane-1,3-diamine,
N1-methyl-N3-(3-(methylpropylamino)propyl)-N1-propyl-N3-(2-(trimethoxysilyl)ethyl)propane-1,3-diamine, N1-methyl-N3-(3-(methylpropylamino)propyl)-N1-propyl-N3-(2-(methyldimethoxysilyl)ethyl)propane-1,3-diamine,
N1-methyl-N3-(3-(methylpropylamino)propyl)-N1-propyl-N3-(2-(ethyldimethoxysilyl)ethyl)propane-1,3-diamine,
N1-methyl-N3-(3-(methylpropylamino)propyl)-N1-propyl-N3-(2-(dimethylmethoxysilyl)ethyl)propane-1,3-diamine,
N1-methyl-N3-(3-(methylpropylamino)propyl)-N1-propyl-N3-(2-(diethylmethoxysilyl)ethyl)propane-1,3-diamine,
N1-methyl-N3-(3-(methylpropylamino)propyl)-N1-propyl-N3-(2-(ethylmethylmethoxysilyl)ethyl)propane-1,3-diamine,
N1-methyl-N3-(3-(methylpropylamino)propyl)-N1-propyl-N3-(2-(triethoxysilyl)ethyl)propane-1,3-diamine,
N1-methyl-N3-(3-(methylpropylamino)propyl)-N1-propyl-N3-(2-(methyldiethoxysilyl)ethyl)propane-1,3-diamine,
N1-methyl-N3-(3-(methylpropylamino)propyl)-N1-propyl-N3-(2-(ethyldiethoxysilyl)ethyl)propane-1,3-diamine,
N1-methyl-N3-(3-(methylpropylamino)propyl)-N1-propyl-N3-(2-(dimethylethoxysilyl)ethyl)propane-1,3-diamine,
N1-methyl-N3-(3-(methylpropylamino)propyl)-N1-propyl-N3-(2-(diethylethoxysilyl)ethyl)propane-1,3-diamine,
N1-methyl-N3-(3-(methylpropylamino)propyl)-N1-propyl-N3-(2-(ethylmethylethoxysilyl)ethyl)propane-1,3-diamine,
N1-ethyl-N3-(3-(ethylpropylamino)propyl)-N1-propyl-N3-(2-(trimethoxysilyl)ethyl)propane-1,3-diamine,
N1-ethyl-N3-(3-(ethylpropylamino)propyl)-N1-propyl-N3-(2-(methyldimethoxysilyl)ethyl)propane-1,3-diamine,
N1-ethyl-N3-(3-(ethylpropylamino)propyl)-N1-propyl-N3-(2-(ethyldimethoxysilyl)ethyl)propane-1,3-diamine,
N1-ethyl-N3-(3-(ethylpropylamino)propyl)-N1-propyl-N3-(2-(dimethylmethoxysilyl)ethyl)propane-1,3-diamine,
N1-ethyl-N3-(3-(ethylpropylamino)propyl)-N1-propyl-N3-(2-(diethylmethoxysilyl)ethyl)propane-1,3-diamine,
N1-ethyl-N3-(3-(ethylpropylamino)propyl)-N1-propyl-N3-(2-(ethylmethylmethoxysilyl)ethyl)propane-1,3-diamine,
N1-ethyl-N3-(3-(ethylpropylamino)propyl)-N1-propyl-N3-(2-(triethoxysilyl)ethyl)propane-1,3-diamine,
N1-ethyl-N3-(3-(ethylpropylamino)propyl)-N1-propyl-N3-(2-(methyldiethoxysilyl)ethyl)propane-1,3-diamine,
N1-ethyl-N3-(3-(ethylpropylamino)propyl)-N1-propyl-N3-(2-(ethyldiethoxysilyl)ethyl)propane-1,3-diamine,
N1-ethyl-N3-(3-(ethylpropylamino)propyl)-N1-propyl-N3-(2-(dimethylethoxysilyl)ethyl)propane-1,3-diamine,
N1-ethyl-N3-(3-(ethylpropylamino)propyl)-N1-propyl-N3-(2-(diethylethoxysilyl)ethyl)propane-1,3-diamine,
N1-ethyl-N3-(3-(ethylpropylamino)propyl)-N1-propyl-N3-(2-(ethylmethylethoxysilyl)ethyl)propane-1,3-diamine,
N1-(3-(dimethylamino)propyl)-N3,N3-dimethyl-N1-((trimethoxysilyl)methyl)propane-1,3-diamine,
N1-(3-(dimethylamino)propyl)-N3,N3-dimethyl-N1-((methyldimethoxysilyl)methyl)propane-1,3-diamine,
N1-(3-(dimethylamino)propyl)-N3,N3-dimethyl-N1-((ethyldimethoxysilyl)methyl)propane-1,3-diamine,
N1-(3-(dimethylamino)propyl)-N3,N3-dimethyl-N1-((dimethylmethoxysilyl)methyl)propane-1,3-diamine,
N1-(3-(dimethylamino)propyl)-N3,N3-dimethyl-N1-((diethylmethoxysilyl)methyl)propane-1,3-diamine,
N1-(3-(dimethylamino)propyl)-N3,N3-dimethyl-N1-((ethylmethylmethoxysilyl)methyl)propane-1,3-diamine,
N1-(3-(dimethylamino)propyl)-N3,N3-dimethyl-N1-((triethoxysilyl)methyl)propane-1,3-diamine,
N1-(3-(dimethylamino)propyl)-N3,N3-dimethyl-N1-((methyldiethoxysilyl)methyl)propane-1,3-diamine,
N1-(3-(dimethylamino)propyl)-N3,N3-dimethyl-N1-((ethyldiethoxysilyl)methyl)propane-1,3-diamine,
N1-(3-(dimethylamino)propyl)-N3,N3-dimethyl-N1-((dimethylethoxysilyl)methyl)propane-1,3-diamine,
N1-(3-(dimethylamino)propyl)-N3,N3-dimethyl-N1-((diethylethoxysilyl)methyl)propane-1,3-diamine,
N1-(3-(dimethylamino)propyl)-N3,N3-dimethyl-N1-((ethylmethylethoxysilyl)methyl)propane-1,3-diamine,
N1-(3-(diethylamino)propyl)-N3,N3-diethyl-N1-((trimethoxysilyl)methyl)propane-1,3-diamine,
N1-(3-(diethylamino)propyl)-N3,N3-diethyl-N1-((methyldimethoxysilyl)methyl)propane-1,3-diamine,
N1-(3-(diethylamino)propyl)-N3,N3-diethyl-N1-((ethyldimethoxysilyl)methyl)propane-1,3-diamine,
N1-(3-(diethylamino)propyl)-N3,N3-diethyl-N1-((dimethylmethoxysilyl)methyl)propane-1,3-diamine,
N1-(3-(diethylamino)propyl)-N3,N3-diethyl-N1-((diethylmethoxysilyl)methyl)propane-1,3-diamine,
N1-(3-(diethylamino)propyl)-N3,N3-diethyl-N1-((ethylmethylmethoxysilyl)methyl)propane-1,3-diamine,
N1-(3-(diethylamino)propyl)-N3,N3-diethyl-N1-((triethoxysilyl)methyl)propane-1,3-diamine,
N1-(3-(diethylamino)propyl)-N3,N3-diethyl-N1-((methyldiethoxysilyl)methyl)propane-1,3-diamine,
N1-(3-(diethylamino)propyl)-N3,N3-diethyl-N1-((ethyldiethoxysilyl)methyl)propane-1,3-diamine,
N1-(3-(diethylamino)propyl)-N3,N3-diethyl-N1-((dimethylethoxysilyl)methyl)propane-1,3-diamine,
N1-(3-(diethylamino)propyl)-N3,N3-diethyl-N1-((diethylethoxysilyl)methyl)propane-1,3-diamine,
N1-(3-(diethylamino)propyl)-N3,N3-diethyl-N1-((ethylmethylethoxysilyl)methyl)propane-1,3-diamine,
N1-(3-(dipropylamino)propyl)-N3,N3-dipropyl-N1-((trimethoxysilyl)methyl)propane-1,3-diamine,
N1-(3-(dipropylamino)propyl)-N3,N3-dipropyl-N1-((methyldimethoxysilyl)methyl)propane-1,3-diamine,
N1-(3-(dipropylamino)propyl)-N3,N3-dipropyl-N1-((ethyldimethoxysilyl)methyl)propane-1,3-diamine,
N1-(3-(dipropylamino)propyl)-N3,N3-dipropyl-N1-((dimethylmethoxysilyl)methyl)propane-1,3-diamine,
N1-(3-(dipropylamino)propyl)-N3,N3-dipropyl-N1-((diethylmethoxysilyl)methyl)propane-1,3-diamine,
N1-(3-(dipropylamino)propyl)-N3,N3-dipropyl-N1-((ethylmethylmethoxysilyl)methyl)propane-1,3-diamine,
N1-(3-(dipropylamino)propyl)-N3,N3-dipropyl-N1-((triethoxysilyl)methyl)propane-1,3-diamine,
N1-(3-(dipropylamino)propyl)-N3,N3-dipropyl-N1-((methyldiethoxysilyl)methyl)propane-1,3-diamine,
N1-(3-(dipropylamino)propyl)-N3,N3-dipropyl-N1-((ethyldiethoxysilyl)methyl)propane-1,3-diamine, N1-(3-(dipropylamino)propyl)-N3,N3-dipropyl-N1-((dimethylethoxysilyl)methyl)propane-1,3-diamine,
N1-(3-(dipropylamino)propyl)-N3,N3-dipropyl-N1-((diethylethoxysilyl)methyl)propane-1,3-diamine,
N1-(3-(dipropylamino)propyl)-N3,N3-dipropyl-N1-((ethylmethylethoxysilyl)methyl)propane-1,3-diamine,
N1-ethyl-N3-(3-(ethylmethylamino)propyl)-N1-methyl-N3-((trimethoxysilyl)methyl)propane-1,3-diamine,
N1-ethyl-N3-(3-(ethylmethylamino)propyl)-N1-methyl-N3-((methyldimethoxysilyl)methyl)propane-1,3-diamine,
N1-ethyl-N3-(3-(ethylmethylamino)propyl)-N1-methyl-N3-((ethyldimethoxysilyl)methyl)propane-1,3-diamine,
N1-ethyl-N3-(3-(ethylmethylamino)propyl)-N1-methyl-N3-((dimethylmethoxysilyl)methyl)propane-1,3-diamine,
N1-ethyl-N3-(3-(ethylmethylamino)propyl)-N1-methyl-N3-((diethylmethoxysilyl)methyl)propane-1,3-diamine,
N1-ethyl-N3-(3-(ethylmethylamino)propyl)-N1-methyl-N3-((ethylmethylmethoxysilyl)methyl)propane-1,3-diamine,
N1-ethyl-N3-(3-(ethylmethylamino)propyl)-N1-methyl-N3-((triethoxysilyl)methyl)propane-1,3-diamine,
N1-ethyl-N3-(3-(ethylmethylamino)propyl)-N1-methyl-N3-((methyldiethoxysilyl)methyl)propane-1,3-diamine,
N1-ethyl-N3-(3-(ethylmethylamino)propyl)-N1-methyl-N3-((ethyldiethoxysilyl)methyl)propane-1,3-diamine,
N1-ethyl-N3-(3-(ethylmethylamino)propyl)-N1-methyl-N3-((dimethylethoxysilyl)methyl)propane-1,3-diamine,
N1-ethyl-N3-(3-(ethylmethylamino)propyl)-N1-methyl-N3-((diethylethoxysilyl)methyl)propane-1,3-diamine,
N1-ethyl-N3-(3-(ethylmethylamino)propyl)-N1-methyl-N3-((ethylmethylethoxysilyl)methyl)propane-1,3-diamine,
N1-methyl-N3-(3-(methylpropylamino)propyl)-N1-propyl-N3-((trimethoxysilyl)methyl)propane-1,3-diamine,
N1-methyl-N3-(3-(methylpropylamino)propyl)-N1-propyl-N3-((methyldimethoxysilyl)methyl)propane-1,3-diamine,
N1-methyl-N3-(3-(methylpropylamino)propyl)-N1-propyl-N3-((ethyldimethoxysilyl)methyl)propane-1,3-diamine,
N1-methyl-N3-(3-(methylpropylamino)propyl)-N1-propyl-N3-((dimethylmethoxysilyl)methyl)propane-1,3-diamine,
N1-methyl-N3-(3-(methylpropylamino)propyl)-N1-propyl-N3-((diethylmethoxysilyl)methyl)propane-1,3-diamine,
N1-methyl-N3-(3-(methylpropylamino)propyl)-N1-propyl-N3-((ethylmethylmethoxysilyl)methyl)propane-1,3-diamine,
N1-methyl-N3-(3-(methylpropylamino)propyl)-N1-propyl-N3-((triethoxysilyl)methyl)propane-1,3-diamine,
N1-methyl-N3-(3-(methylpropylamino)propyl)-N1-propyl-N3-((methyldiethoxysilyl)methyl)propane-1,3-diamine,
N1-methyl-N3-(3-(methylpropylamino)propyl)-N1-propyl-N3-((ethyldiethoxysilyl)methyl)propane-1,3-diamine,
N1-methyl-N3-(3-(methylpropylamino)propyl)-N1-propyl-N3-((dimethylethoxysilyl)methyl)propane-1,3-diamine,
N1-methyl-N3-(3-(methylpropylamino)propyl)-N1-propyl-N3-((diethylethoxysilyl)methyl)propane-1,3-diamine,
N1-methyl-N3-(3-(methylpropylamino)propyl)-N1-propyl-N3-((ethylmethylethoxysilyl)methyl)propane-1,3-diamine,
N1-ethyl-N3-(3-(ethylpropylamino)propyl)-N1-propyl-N3-((trimethoxysilyl)methyl)propane-1,3-diamine,
N1-ethyl-N3-(3-(ethylpropylamino)propyl)-N1-propyl-N3-((methyldimethoxysilyl)methyl)propane-1,3-diamine,
N1-ethyl-N3-(3-(ethylpropylamino)propyl)-N1-propyl-N3-((ethyldimethoxysilyl)methyl)propane-1,3-diamine,
N1-ethyl-N3-(3-(ethylpropylamino)propyl)-N1-propyl-N3-((dimethylmethoxysilyl)methyl)propane-1,3-diamine,
N1-ethyl-N3-(3-(ethylpropylamino)propyl)-N1-propyl-N3-((diethylmethoxysilyl)methyl)propane-1,3-diamine,
N1-ethyl-N3-(3-(ethylpropylamino)propyl)-N1-propyl-N3-((ethylmethylmethoxysilyl)methyl)propane-1,3-diamine,
N1-ethyl-N3-(3-(ethylpropylamino)propyl)-N1-propyl-N3-((triethoxysilyl)methyl)propane-1,3-diamine,
N1-ethyl-N3-(3-(ethylpropylamino)propyl)-N1-propyl-N3-((methyldiethoxysilyl)methyl)propane-1,3-diamine,
N1-ethyl-N3-(3-(ethylpropylamino)propyl)-N1-propyl-N3-((ethyldiethoxysilyl)methyl)propane-1,3-diamine,
N1-ethyl-N3-(3-(ethylpropylamino)propyl)-N1-propyl-N3-((dimethylethoxysilyl)methyl)propane-1,3-diamine,
N1-ethyl-N3-(3-(ethylpropylamino)propyl)-N1-propyl-N3-((diethylethoxysilyl)methyl)propane-1,3-diamine, and
N1-ethyl-N3-(3-(ethylpropylamino)propyl)-N1-propyl-N3-((ethylmethylethoxysilyl)methyl)propane-1,3-diamine.

9. A terminally modified, conjugated diene polymer, being coupled at a terminus thereof with the terminal modifier of any one of claims 1 to 8.

10. The terminally modified, conjugated diene polymer of claim 9, represented by the following Formula 2:

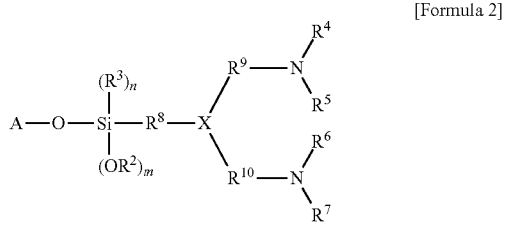

[Formula 2]

wherein A represents a conjugated diene polymer; $R^1$, $R^3$, $R^4$, $R^5$, $R^6$, $R^7$, $R^8$, $R^9$, $R^{10}$, m, and n are respectively the same as defined in claim 1; and $R^2$ represents a monovalent saturated or unsaturated hydrocarbon chain of 1 to 20 carbon atoms or another conjugated diene polymer A.

11. The terminally modified, conjugated diene polymer of claim 10, wherein A is either a homopolymer of conjugated diene monomers, or a copolymer of conjugated diene monomers and aromatic vinyl monomers.

12. A polymer composition for a tire, comprising:
the terminally modified, conjugated diene polymer of claim 9; and
an inorganic reinforcing agent.

13. The polymer composition of claim 12, the inorganic reinforcing agent is selected from the group consisting of carbon black and silica.

14. The polymer composition of claim 12, wherein the inorganic reinforcing agent is used in an amount of from 50 to 100 parts by weight based on 100 parts by weight of the terminally modified, conjugated diene polymer.

* * * * *